US012603343B2

(12) United States Patent
Anattasakul

(10) Patent No.: US 12,603,343 B2
(45) Date of Patent: Apr. 14, 2026

(54) COMPONENT LAYOUT OF LIQUID COOLING COMPONENTS IN ELECTRIC WORK VEHICLE

(71) Applicant: KUBOTA CORPORATION, Osaka (JP)

(72) Inventor: Roatchanatam Anattasakul, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 385 days.

(21) Appl. No.: 18/532,168

(22) Filed: Dec. 7, 2023

(65) Prior Publication Data

US 2025/0140959 A1     May 1, 2025

Related U.S. Application Data

(60) Provisional application No. 63/546,292, filed on Oct. 30, 2023.

(51) Int. Cl.
  *B60L 58/24*      (2019.01)
  *A01D 69/02*     (2006.01)
  *H01M 10/613*   (2014.01)
  *H01M 10/625*   (2014.01)

(52) U.S. Cl.
  CPC .......... *H01M 10/613* (2015.04); *A01D 69/02* (2013.01); *H01M 10/625* (2015.04)

(58) Field of Classification Search
  CPC .. H01M 10/613; H01M 10/625; A01D 69/02; B60L 58/24; B60L 58/26; B60K 11/02; B60K 11/04; B60K 2001/003; B60K 2001/005
  See application file for complete search history.

(56) References Cited

U.S. PATENT DOCUMENTS

| | | | | | |
|---|---|---|---|---|---|
| 5,624,003 | A | * | 4/1997 | Matsuki | ............. B60H 1/00278 180/68.5 |
| 5,834,132 | A | * | 11/1998 | Hasegawa | ........... H01M 10/657 429/62 |
| 6,467,286 | B2 | * | 10/2002 | Hasebe | ............... H01M 10/625 165/41 |
| 11,414,134 | B2 | * | 8/2022 | Timofeev | ................. B60K 1/00 |
| 2012/0244403 | A1 | * | 9/2012 | Maskew | ................. B60L 50/16 429/99 |
| 2012/0285757 | A1 | * | 11/2012 | Atarashi | ................ B60K 11/04 903/903 |

(Continued)

*Primary Examiner* — Travis Ruby
(74) *Attorney, Agent, or Firm* — Keating & Bennett, LLP

(57) ABSTRACT

An electric work vehicle includes a chassis, a battery housing to house a plurality of battery modules, a liquid cooling system, at least one electric motor, and at least one inverter. The liquid cooling system includes a pump, a radiator, and a fan. The battery housing is supported by the chassis. The at least one inverter is electrically connected to the plurality of battery modules and the at least one electric motor. The pump is attached to a back surface of the battery housing. The radiator and the fan are attached on a front surface of the battery housing. The at least one inverter is attached to a side surface of the battery housing that faces a width direction. The at least one inverter and the at least one electric motor are mounted between the fan and the pump in a front-rear direction.

20 Claims, 60 Drawing Sheets

(56)     References Cited

U.S. PATENT DOCUMENTS

| | | | |
|---|---|---|---|
| 2015/0167532 A1* | 6/2015 | Kim | F25B 6/02 |
| | | | 165/41 |
| 2015/0224869 A1* | 8/2015 | Matano | F16F 15/04 |
| | | | 180/68.4 |
| 2017/0226715 A1* | 8/2017 | Ota | B60K 6/40 |
| 2018/0226704 A1* | 8/2018 | Shimoike | E02F 9/0858 |
| 2021/0129915 A1* | 5/2021 | Timofeev | B62D 25/12 |
| 2022/0258568 A1* | 8/2022 | Sadakata | B60H 1/00571 |
| 2022/0306204 A1* | 9/2022 | Sato | B60R 16/0215 |
| 2022/0379703 A1* | 12/2022 | Tottori | B60K 11/06 |
| 2022/0379970 A1* | 12/2022 | Nakayama | B60K 1/04 |
| 2023/0132970 A1* | 5/2023 | Hashimoto | B60L 15/20 |
| | | | 180/65.6 |
| 2023/0211705 A1* | 7/2023 | Zeamer | B60L 50/64 |
| 2023/0311707 A1* | 10/2023 | Lee | B60K 1/00 |
| | | | 220/501 |

* cited by examiner

REAR   LEFT

RIGHT   FRONT

1

430L  400

490

2L

120

491

4L

4R

FRONT      RIGHT

LEFT      REAR

REAR ← → FRONT

FRONT ←——→ REAR

FRONT ←——→ REAR

REAR ←——→ FRONT

FRONT ◄──────► REAR

REAR ◄────────► FRONT

6

66

RIGHT

REAR

FRONT

LEFT

66

103-R

10

103-L

RIGHT

FRONT ← → REAR

LEFT

210

220    230

13-4

13-7

12-2

3

13-1

13-3

13-6

12-3    12-1

12-1    5

FRONT    RIGHT

LEFT    REAR

FRONT ◄---------► REAR

REAR ◄────► FRONT

1

320

310

4L

330

2R

4R

FRONT

LEFT

RIGHT

REAR

330

320

315

310

5

FRONT

LEFT

REAR

RIGHT

310

312

FRONT

LEFT

RIGHT

REAR

FRONT ◄────► REAR

REAR ◄————► FRONT

FRONT ◄────► REAR

402F 8F    402    8 (30)    400

10

2L 8 (34)

FRONT ←——→ REAR

FRONT ◄────► REAR

UP

FRONT ◄———► REAR

DOWN

COMPONENT LAYOUT OF LIQUID COOLING COMPONENTS IN ELECTRIC WORK VEHICLE

BACKGROUND OF THE INVENTION

1. Field of the Invention

The present invention is directed to an electric vehicle (EV) such as an electric tractor.

2. Description of the Related Art

Electric vehicles (EVs) are becoming more prevalent as the industry moves from internal combustion engines towards fully electrically powered motors running on battery systems.

SUMMARY OF THE INVENTION

Preferred embodiments of the present invention provide an electric work vehicle such as an EV tractor.

Preferred embodiments of the present invention provide an electric vehicle.

An electric work vehicle includes a chassis, a battery housing to house a plurality of battery modules, a liquid cooling system, at least one electric motor, and at least one inverter. The liquid cooling system includes a pump, a radiator, and a fan. The battery housing is supported by the chassis. The at least one inverter is electrically connected to the plurality of battery modules and the at least one electric motor. The pump is attached to a back surface of the battery housing. The radiator and the fan are attached on a front surface of the battery housing. The at least one inverter is attached to a side surface of the battery housing that faces a width direction of the electric work vehicle. The at least one inverter and the at least one electric motor are mounted between the fan and the pump in a front-rear direction of the electric work vehicle. The pump outputs coolant to cool the at least one electric motor and the at least one inverter. After passing to the at least one electric motor and the at least one inverter, the coolant is received by the radiator. After passing to the radiator, the coolant returns to the pump.

The fan can be operable to direct air in a forward direction.

The radiator and the fan can be supported by posts mounted to the chassis. The radiator and the fan can be supported by brackets mounted to the battery housing.

The liquid cooling system can include a surge tank on the front surface of the battery housing. The surge tank can be located at a side of the fan in the width direction of the electric work vehicle.

The electric work vehicle can further include a first coolant line to distribute the coolant from the liquid cooling system and a second coolant line to return the coolant to the liquid cooling system. The first coolant line can be connected to a distribution hydraulic manifold, and the second coolant line can be connected to a return hydraulic manifold. A pressure drop in the first coolant line can be equal or substantially equal to a pressure drop in the second coolant line.

The liquid cooling system can include a heat exchanger attached to the front surface of the battery housing. The heat exchanger can be located at a side of the fan in the width direction of the electric work vehicle.

The heat exchanger can be an oil heat exchanger. The oil heat exchanger can be connected to at least one hydraulic oil line. The electric work vehicle can further include at least one oil line connected to a steering system of the electric work vehicle. The electric work vehicle can further include at least one oil line connected to a braking system of the electric work vehicle. The electric work vehicle can further include at least one oil line connected to a drivetrain gearing of the electric work vehicle.

The electric work vehicle can further include a condenser. The radiator can be located between the condenser and the fan. The fan is located forward of the condenser in the front-rear direction of the electric work vehicle. The condenser can be located between the battery housing and the radiator.

The liquid cooling system can include a surge tank and a heat exchanger. The surge tank and the heat exchanger can be located on opposite sides of the fan in the width direction of the electric work vehicle.

According to preferred embodiments of the present disclosure, it is possible to provide an electric vehicle.

The above and other features, elements, steps, configurations, characteristics, and advantages of the present invention will become more apparent from the following detailed description of preferred embodiments of the present invention with reference to the attached drawings.

DETAILED DESCRIPTION OF PREFERRED EMBODIMENTS

Electric vehicles according to preferred embodiments of the present invention may be a tractor or other agricultural vehicle, but any desirable type of electric vehicle is applicable to and usable with preferred embodiments of the present invention.

Figure 1A:
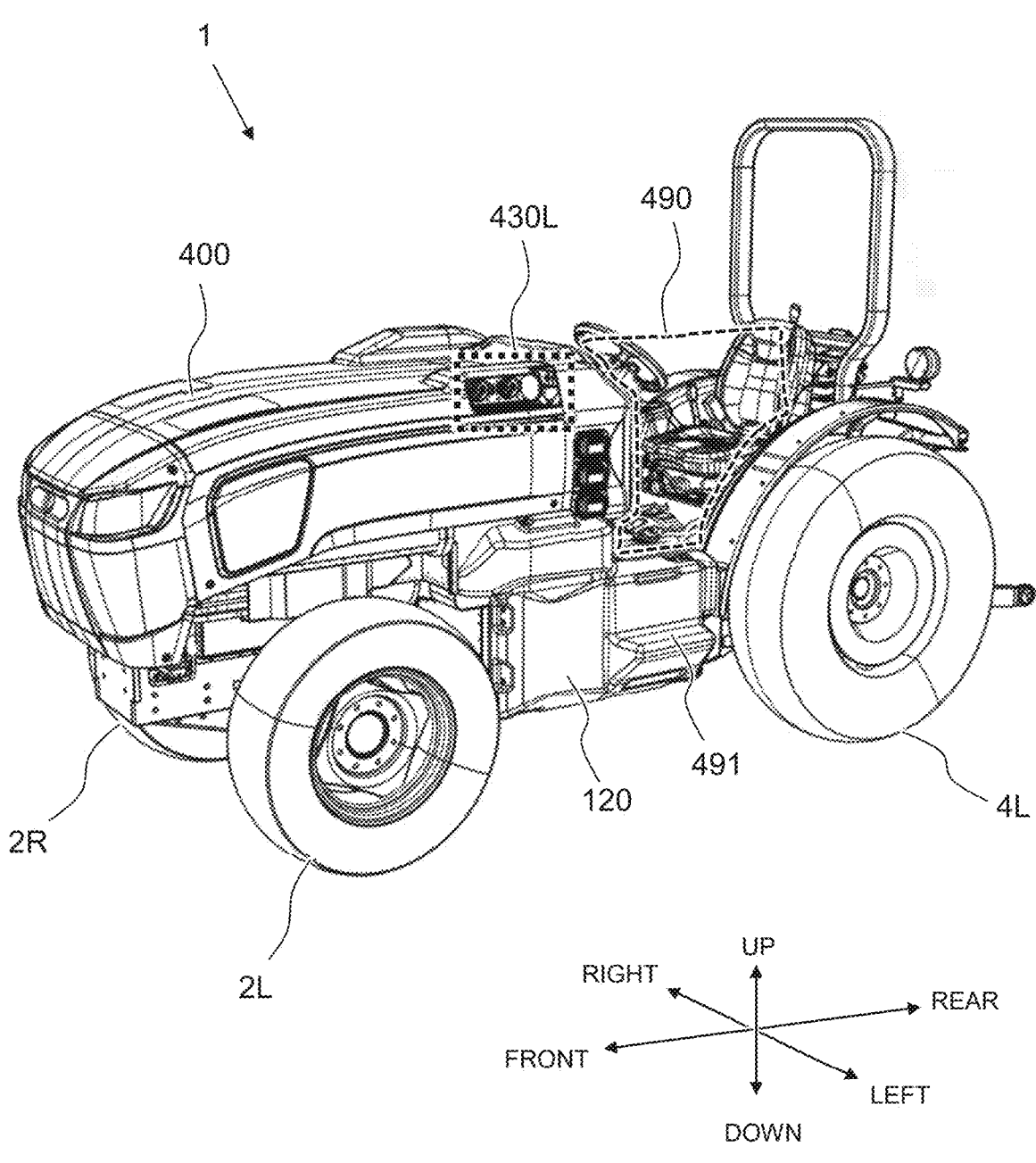
FIG. 1A shows a perspective left-front view of an electric vehicle according to a preferred embodiment of the present invention.
Figure 1B:
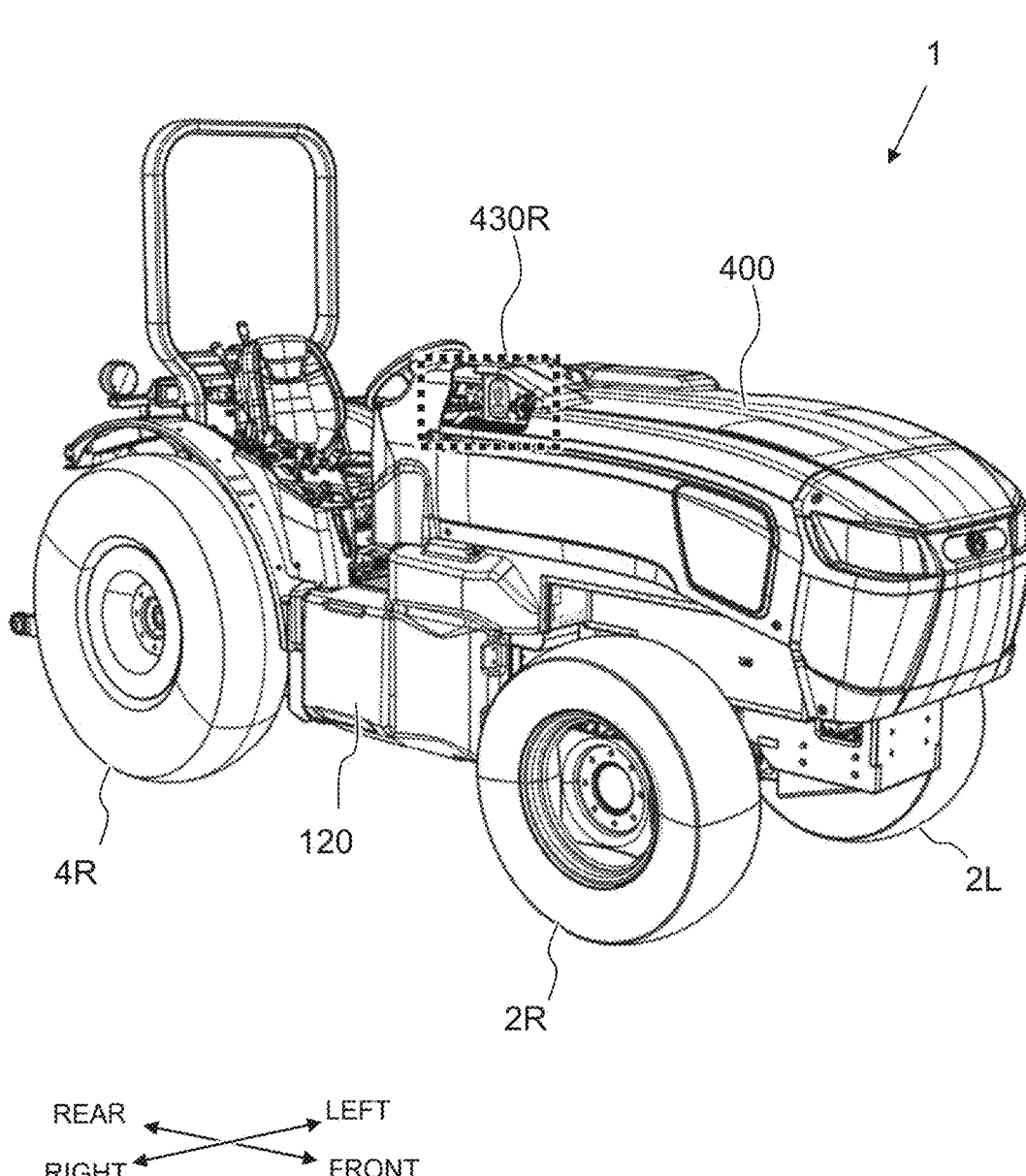
FIG. 1B shows a perspective right-front view of an electric vehicle according to a preferred embodiment of the present invention.
Figure 1C:
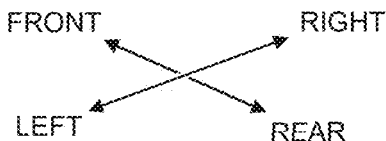
FIG. 1C shows a perspective left-rear view of an electric vehicle according to a preferred embodiment of the present invention.
Figure 1D:
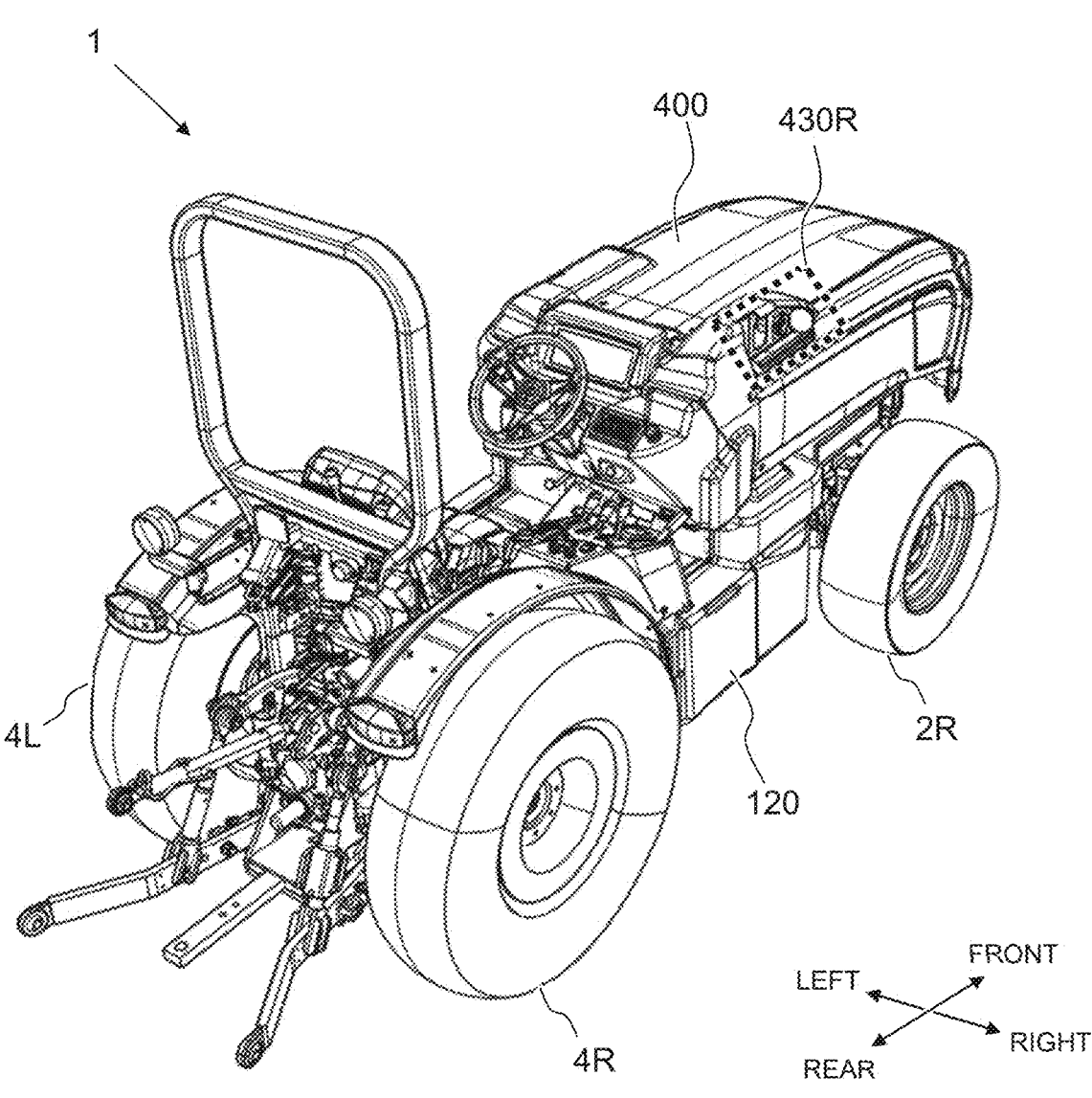
FIG. 1D shows a perspective right-rear view of an electric vehicle according to a preferred embodiment of the present invention.
Figure 1E:
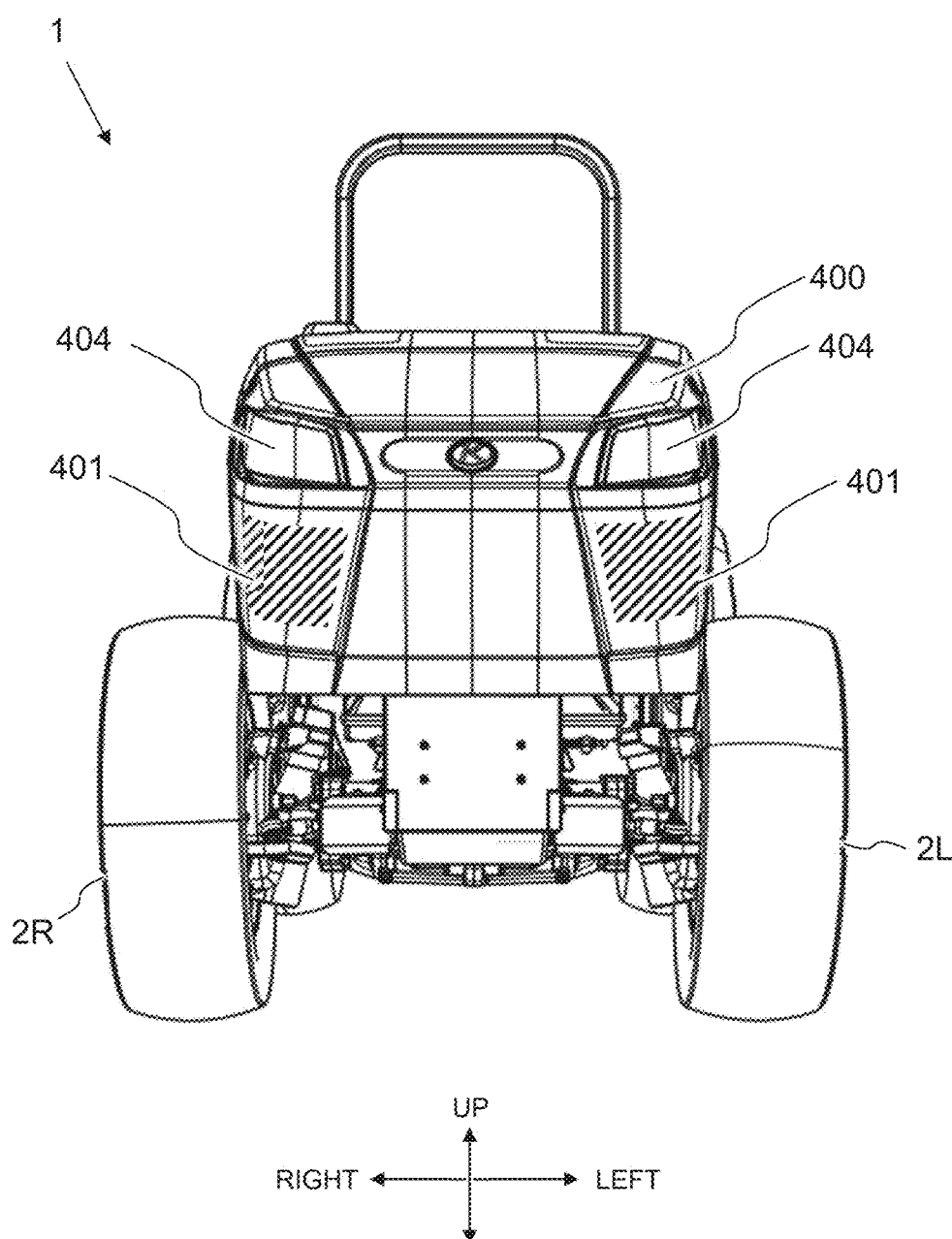
FIG. 1E shows a front view of an electric vehicle according to a preferred embodiment of the present invention.
Figure 1F:
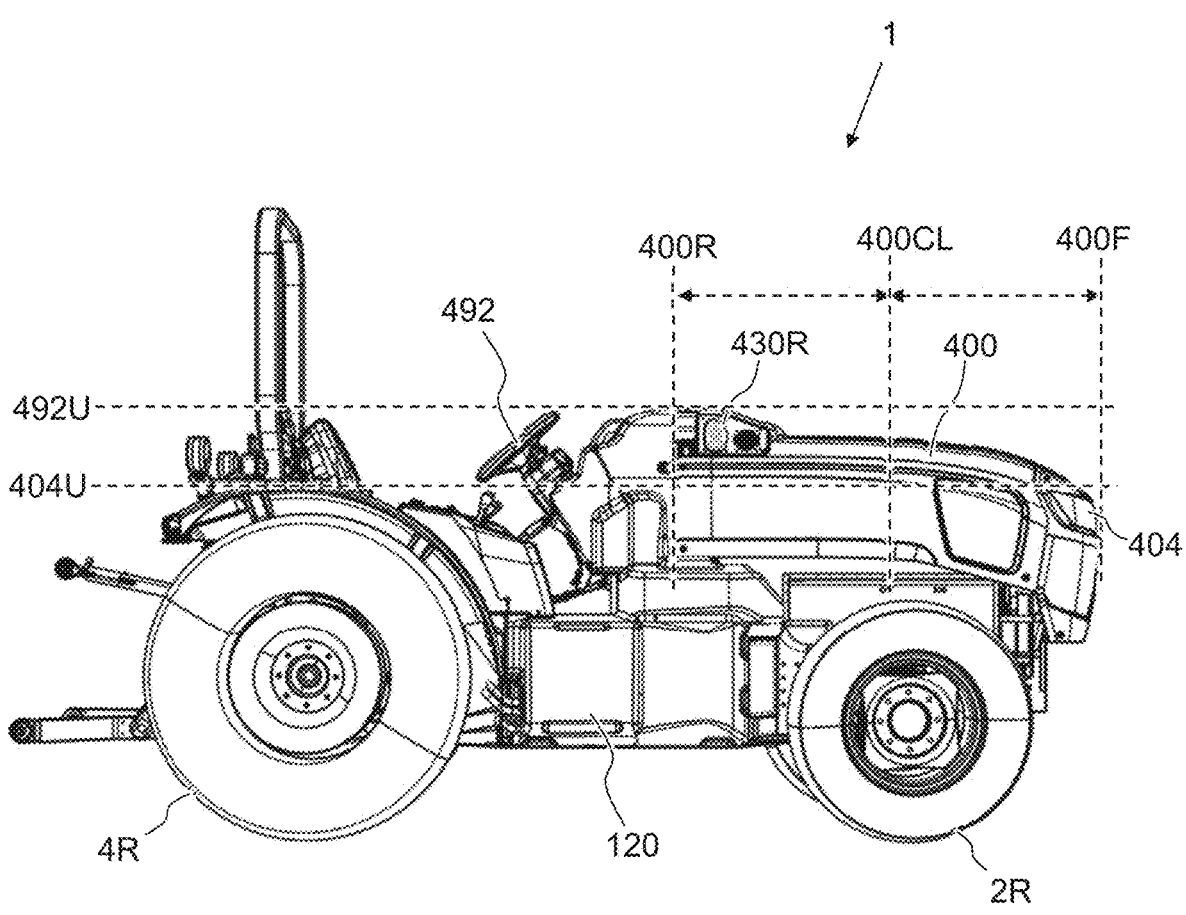
FIG. 1F shows a right side view of an electric vehicle according to a preferred embodiment of the present invention.
Figure 1G:
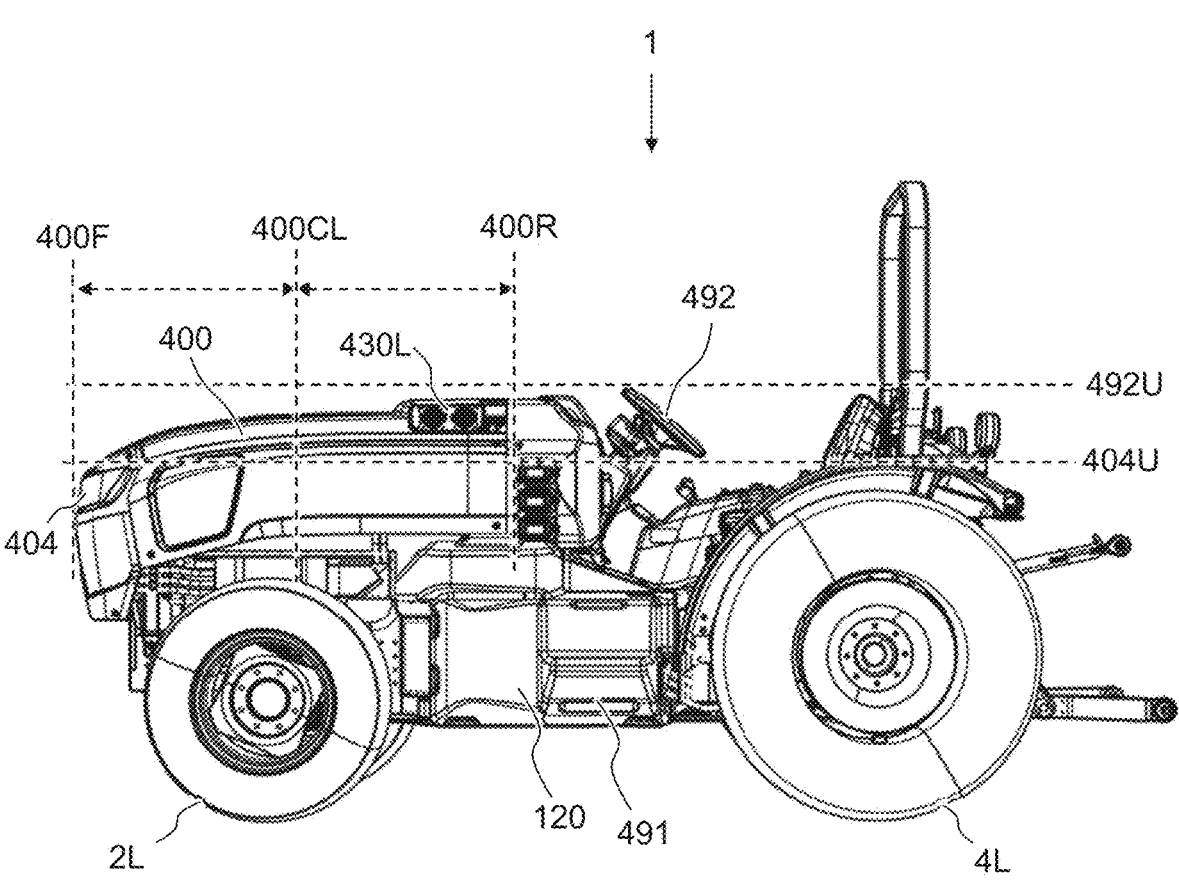
FIG. 1G shows a left side view of an electric vehicle according to a preferred embodiment of the present invention.
Figure 1H:
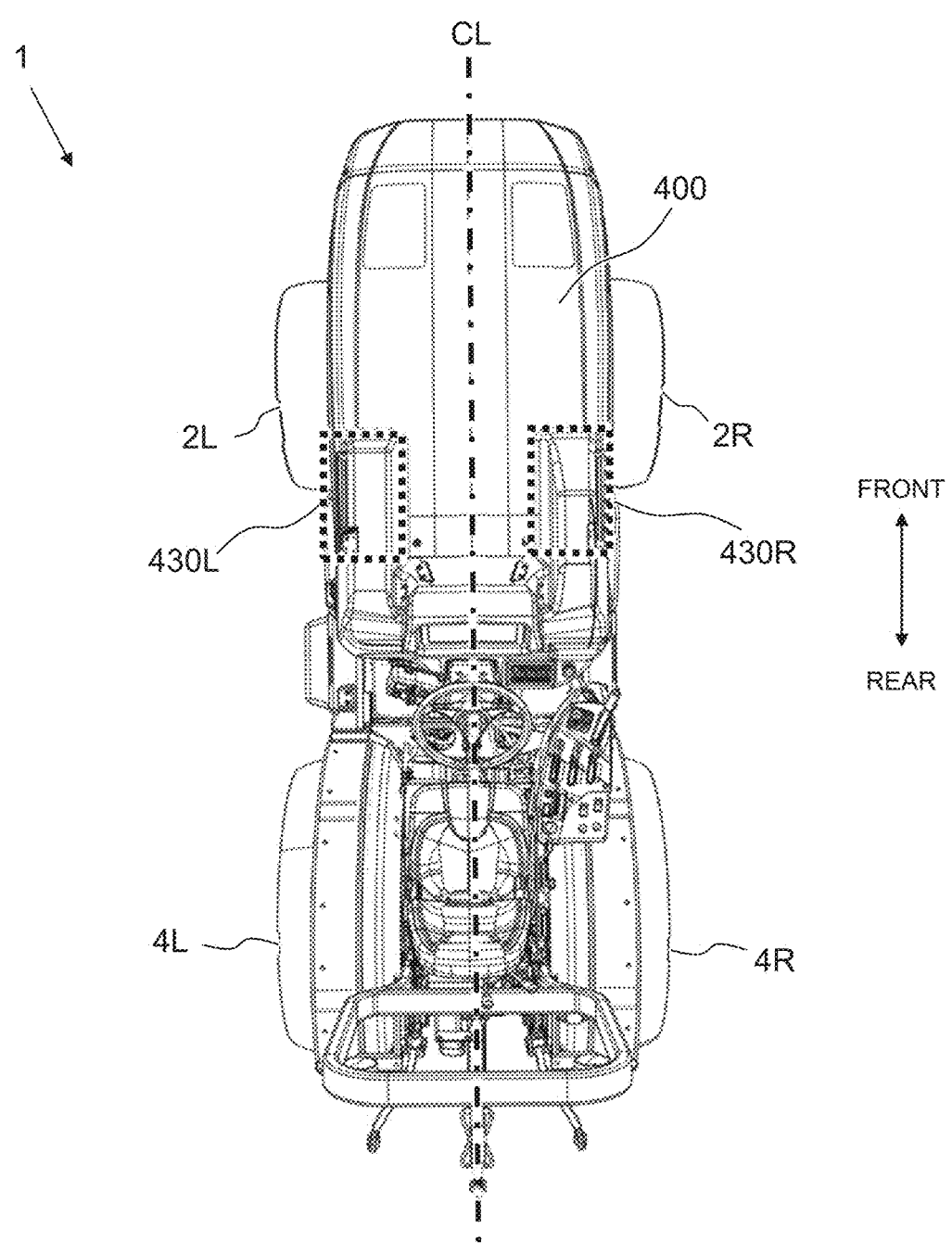
FIG. 1H shows a top view of an electric vehicle according to a preferred embodiment of the present invention.
Figure 1I:
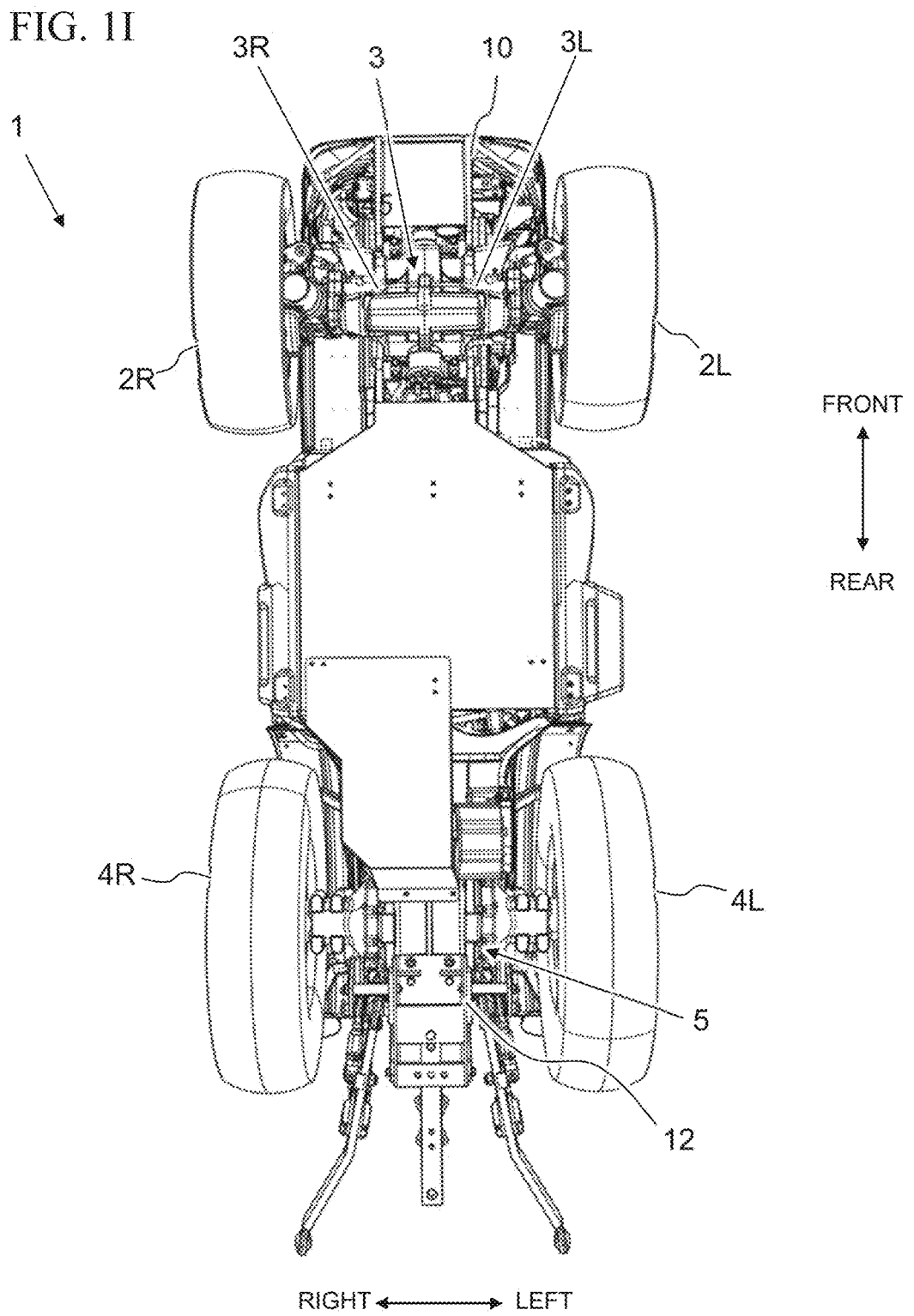
FIG. 1I shows a bottom view of an electric vehicle according to a preferred embodiment of the present invention.

FIG. 1A to 1I show an electric vehicle 1 according to a preferred embodiment of the present invention. FIGS. 1A and 1B show perspective views from left and right front ends of the vehicle 1, respectively. FIG. 1C shows an isometric view from a left rear end of the vehicle 1. FIG. 1D shows an isometric view from a right rear end of the vehicle 1. FIG. 1E shows a front view of the vehicle 1. FIGS. 1F and 1G are side views of the vehicle 1. FIGS. 1H and 1I are top and bottom views of the vehicle 1, respectively.

In a preferred embodiment of the present invention, as shown, for example, in FIGS. 1A-1H, the vehicle 1 includes a left front wheel 2L, a right front wheel 2R, a left rear wheel 4L, and a right rear wheel 4R. However, a vehicle according to the preferred embodiments of the present invention is not specifically limited to four wheels, and may include any appropriate number of wheels. For example, a vehicle according to the preferred embodiments may include only three wheels by removing one of the aforementioned four wheels, a fifth wheel (e.g., an additional wheel provided in line with a pair of one of the aforementioned four wheels or a wheel provided at a front or rear of the vehicle, etc.), six total wheels by including a pair of center wheels, and the like. In an alternative preferred embodiment, tracks can be used instead of wheels.

Figure 2:
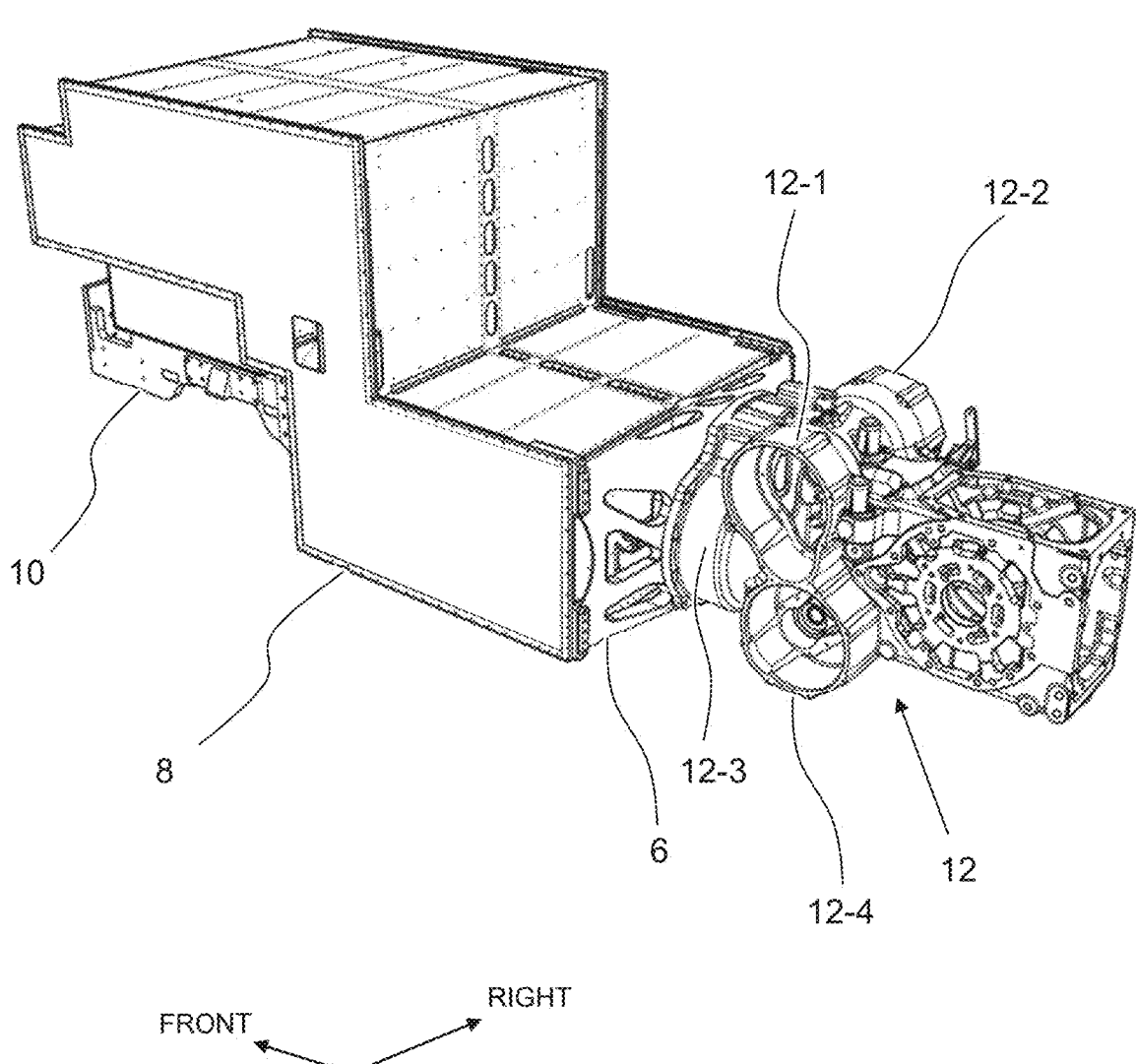
FIG. 2 shows a rear perspective view of an intermediate frame, a battery housing, a front frame, and a rear frame of an electric vehicle according to a preferred embodiment of the present invention.

In a preferred embodiment of the present invention, the vehicle 1 includes an intermediate frame 6, a battery housing 8 attached to a front portion of the intermediate frame 6, a front frame 10 attached to the battery housing 8, and a rear frame 12 attached a rear portion of the intermediate frame 6, as shown in FIG. 2, for example. In a preferred embodiment, a front axle 3 connected to the left front wheel 2L and a right front wheel 2R is connected to and supports the front frame 10, and a rear axle 5 connected to the left rear wheel 4L and the right rear wheel 4R is connected to and supported by the rear frame 12, as shown in FIG. 1I, for example.

In a preferred embodiment of the present invention, the front axle 3 includes a left axle housing 3L and a right axle housing 3R, as shown in FIG. 1I. The left axle housing 3L houses a first electric motor 14 (a left-front-wheel electric motor) that is connected to a first gearing 15 to drive the left front wheel 2L, and the right axle housing 3R houses a second electric motor 16 (a right-front-wheel electric motor) that is connected to a second gearing 17 to drive the right front wheel 2R. The first electric motor 14, the second electric motor 16, the first gearing 15, and the second gearing 17 are shown, for example, in FIG. 1J in which the left axle housing 3L and the right axle housing 3R have been removed for illustrative purposes.

Figure 1J:
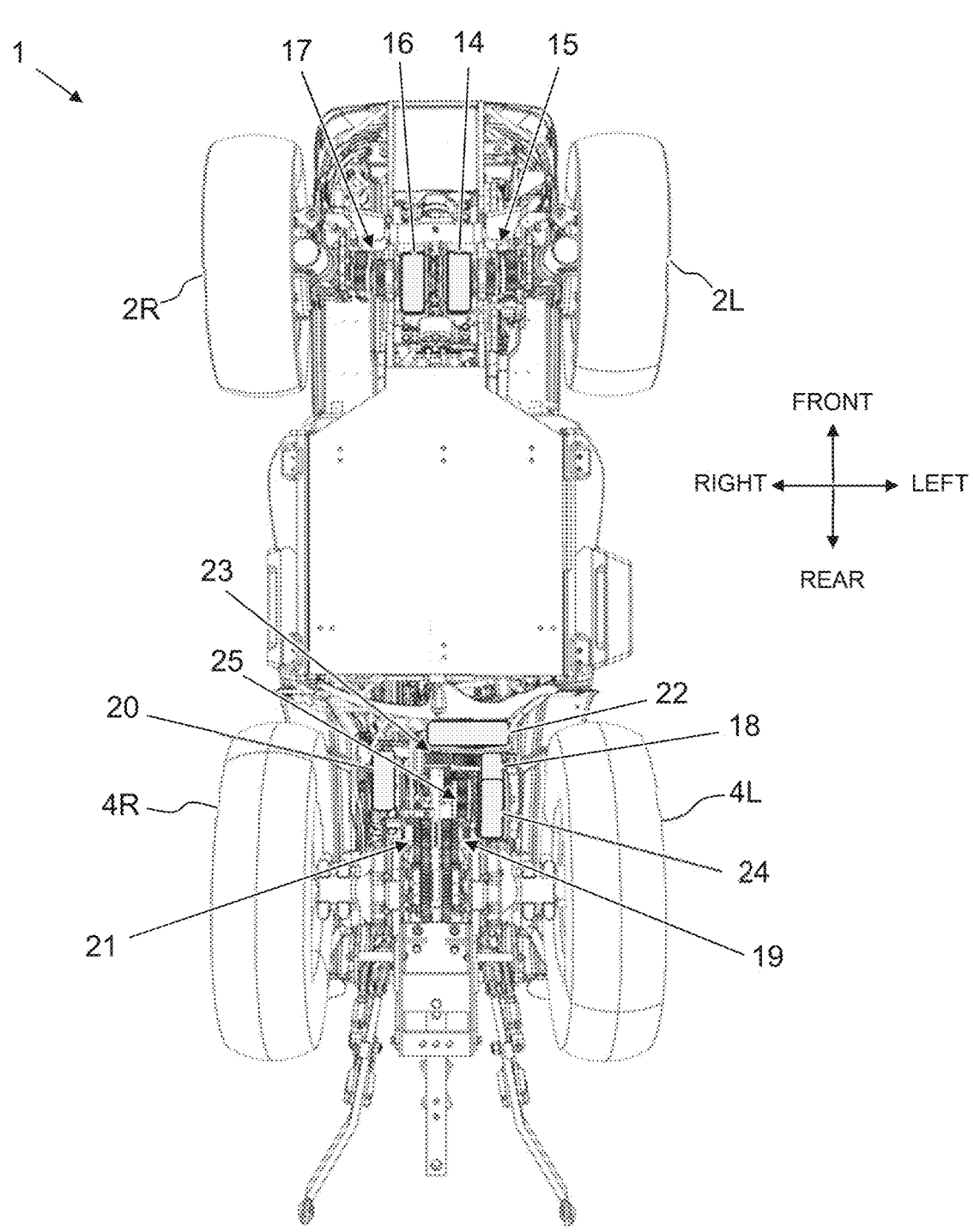
FIG. 1J shows a bottom view of an electric vehicle according to a preferred embodiment of the present invention in which certain elements have been removed for illustrative purposes.

In a preferred embodiment of the present invention, the rear frame 12 includes a first motor housing portion 12-1 to house a third electric motor 18 (a left-rear-wheel electric motor) that is connected to a third gearing 19 to drive the left rear wheel 4L, and a second motor housing portion 12-2 to house a fourth electric motor 20 (a right-rear-wheel electric motor) that is connected to a fourth gearing 21 to drive the right rear wheel 4R. Preferably, the rear frame 12 also includes a third motor housing portion 12-3 to house a fifth electric motor 22 that is connected to a fifth gearing 23 to drive a first electric vehicle component (e.g., a power take-off (PTO)), and a fourth motor housing portion 12-4 to house a sixth electric motor 24 that is connected to a sixth gearing 25 to drive a second electric vehicle component (e.g., a hydraulic system), as shown in FIGS. 1J and 2, for example. The third electric motor 18, the fourth electric motor 20, the fifth electric motor 22, and the sixth electric motor 24 are shown, for example, in FIG. 1J in which elements including the rear frame 12 have been removed for illustrative purposes. In the bottom view of FIG. 1J, the sixth electric motor 24 overlaps the third electric motor 18.

Figure 3:
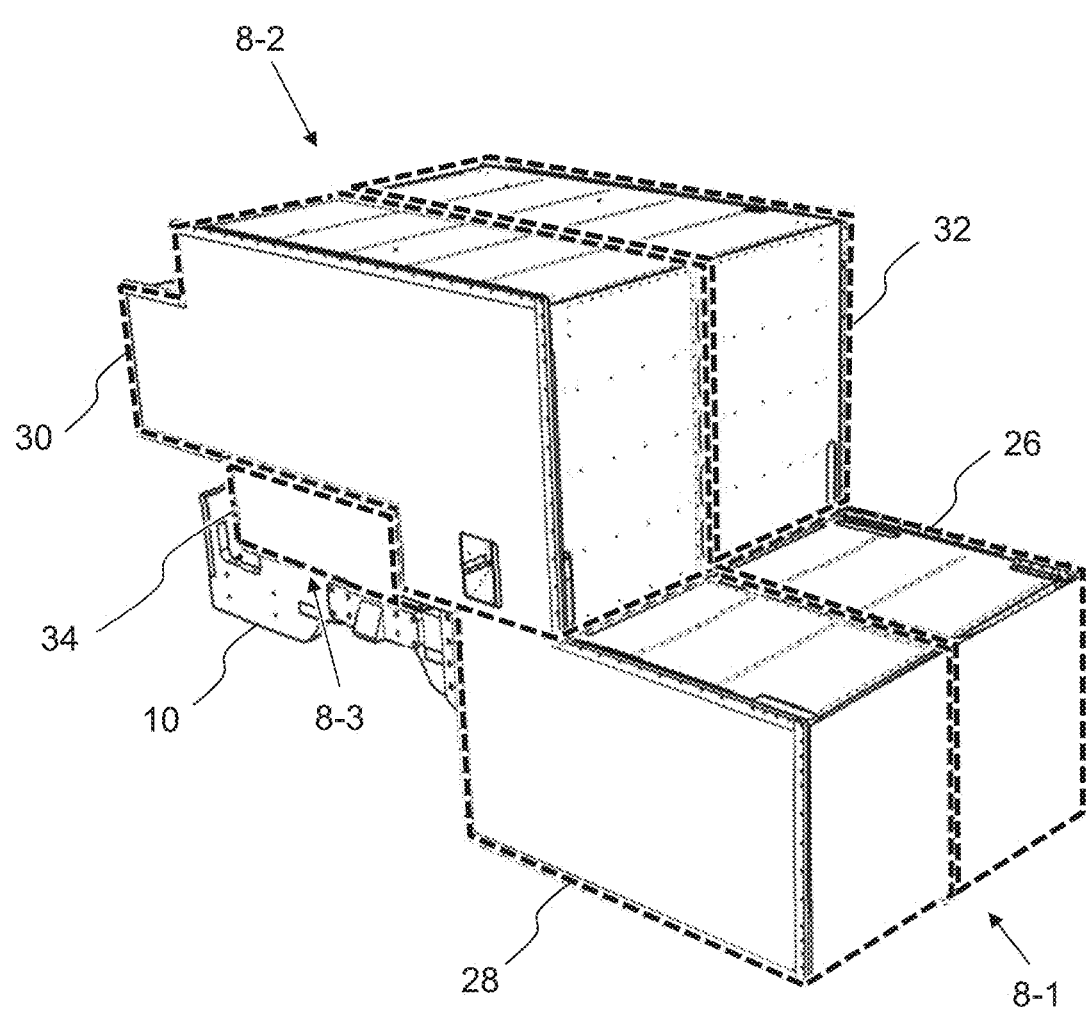
FIG. 3 shows a rear perspective view of a battery housing and a front frame of an electric vehicle according to a preferred embodiment of the present invention.
Figure 3:
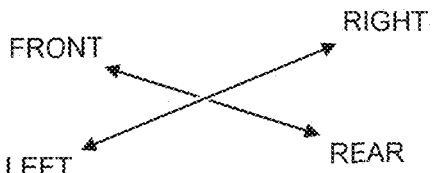
Figure 4:
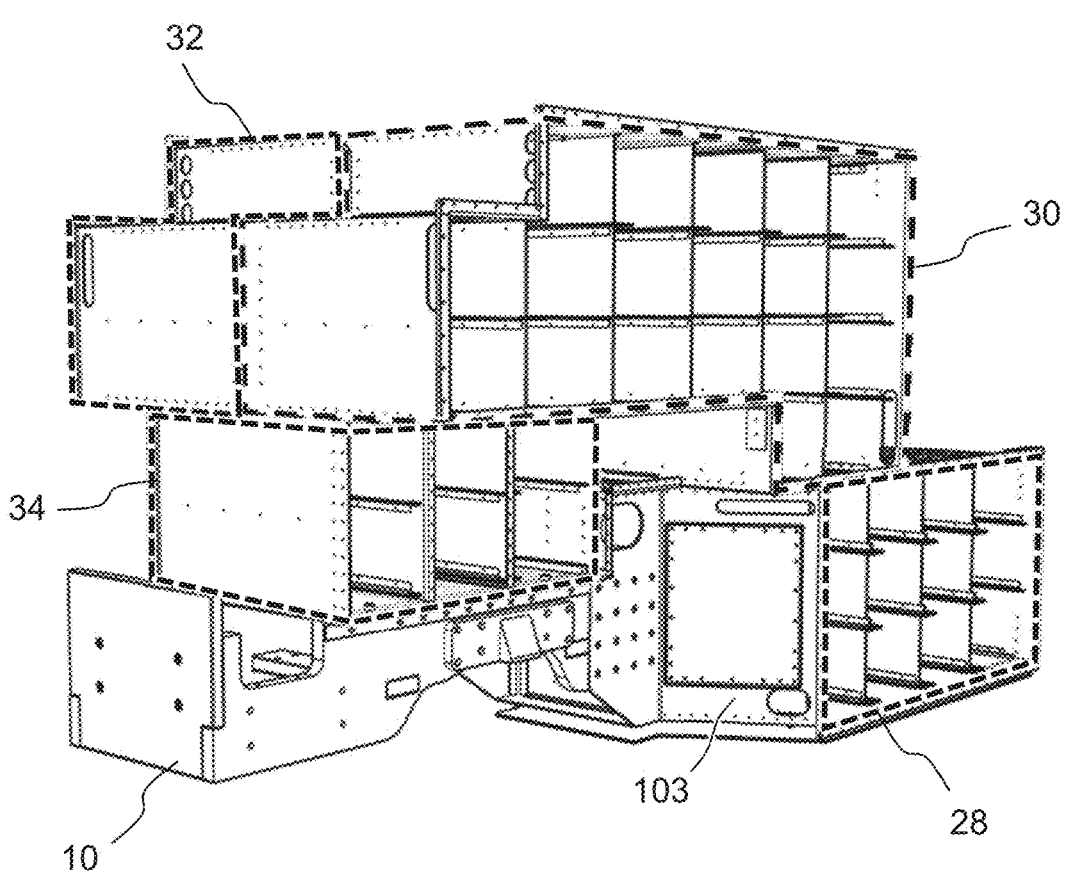
FIG. 4 shows a front perspective view of a battery housing according to a preferred embodiment of the present invention.
Figure 5A:
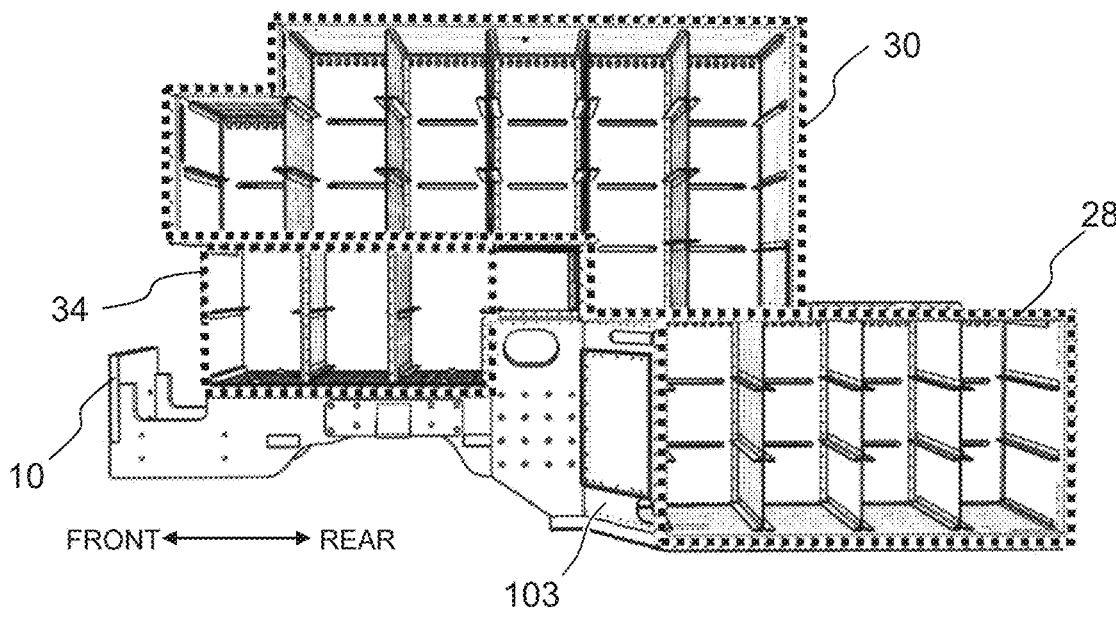
FIG. 5A shows a left side view of a battery housing according to a preferred embodiment of the present invention.
Figure 5B:
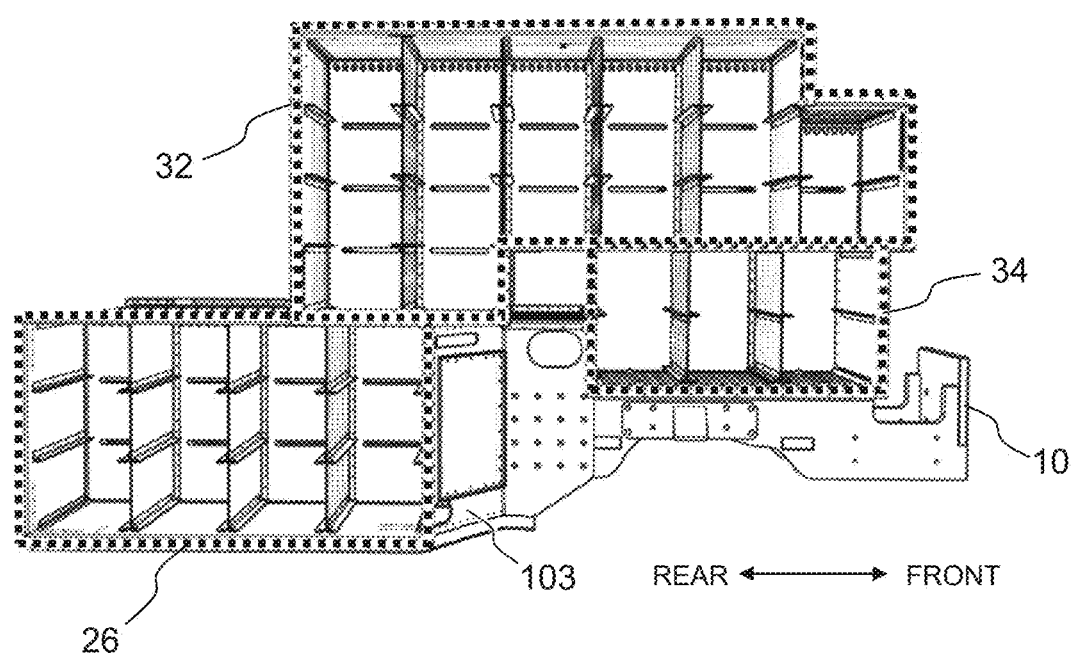
FIG. 5B shows a right side view of a battery housing according to a preferred embodiment of the present invention.

In a preferred embodiment of the present invention, the battery housing 8 includes a first battery housing portion 26, a second battery housing portion 28, a third battery housing portion 30, a fourth battery housing portion 32, and a fifth battery housing portion 34, each of which is shown in FIG. 3 using dashed lines. In a preferred embodiment, the first battery housing portion 26 and the second battery housing portion 28 are adjacent to each other in a width direction of the vehicle, and the third battery housing portion 30 and the fourth battery housing portion 32 are adjacent to each other in a width direction of the vehicle. In a preferred embodiment, a width of each of the first battery housing portion 26, the second battery housing portion 28, the third battery housing portion 30, the fourth battery housing portion 32, and the fifth battery housing portion 34 in a width direction of the vehicle is equal or substantially equal. FIGS. 4, 5A, and 5B show the battery housing 8 with the battery housing portion covers removed for illustrative purposes.

In a preferred embodiment of the present invention, the first battery housing portion 26 and the second battery housing portion 28 are included in a first battery housing section 8-1 (a rear battery housing section), the third battery housing portion 30 and the fourth battery housing portion 32 are included in a second battery housing section 8-2 (a forward-upper battery housing section), and the fifth battery housing portion 34 is included in a third battery housing section 8-3 (a forward-lower battery housing section), as shown in FIG. 3, for example. In a preferred embodiment, a width of the first battery housing section 8-1 is equal or substantially equal to a width of the second battery housing section 8-2, and a width of the third battery housing section 8-3 is less than a width of the first battery housing section 8-1 and a width of the second battery housing section 8-2.

Preferably, a rear surface of the third battery housing section 8-3 is spaced away from a front surface of the first battery housing section 8-1. In a preferred embodiment, a rear surface of the second battery housing section 8-2 intersects a middle portion of the first battery housing section 8-1 in a front-rear direction of the electric vehicle in a top view and a side view.

As shown in FIGS. 4, 5A, and 5B, each of the first battery housing portion 26, the second battery housing portion 28, the third battery housing portion 30, the fourth battery housing portion 32, and the fifth battery housing portion 34 includes a plurality of battery housing module compartments, which are each to receive a battery module. In a preferred embodiment, each of the third battery housing portion 30 and the fourth battery housing portion 32 includes more battery housing module compartments than each of the first battery housing portion 26 and the second battery housing portion 28. Preferably, the fifth battery housing portion 34 includes less battery housing module compartments than each of the first battery housing portion 26 and the second battery housing portion 28.

Figure 6A:
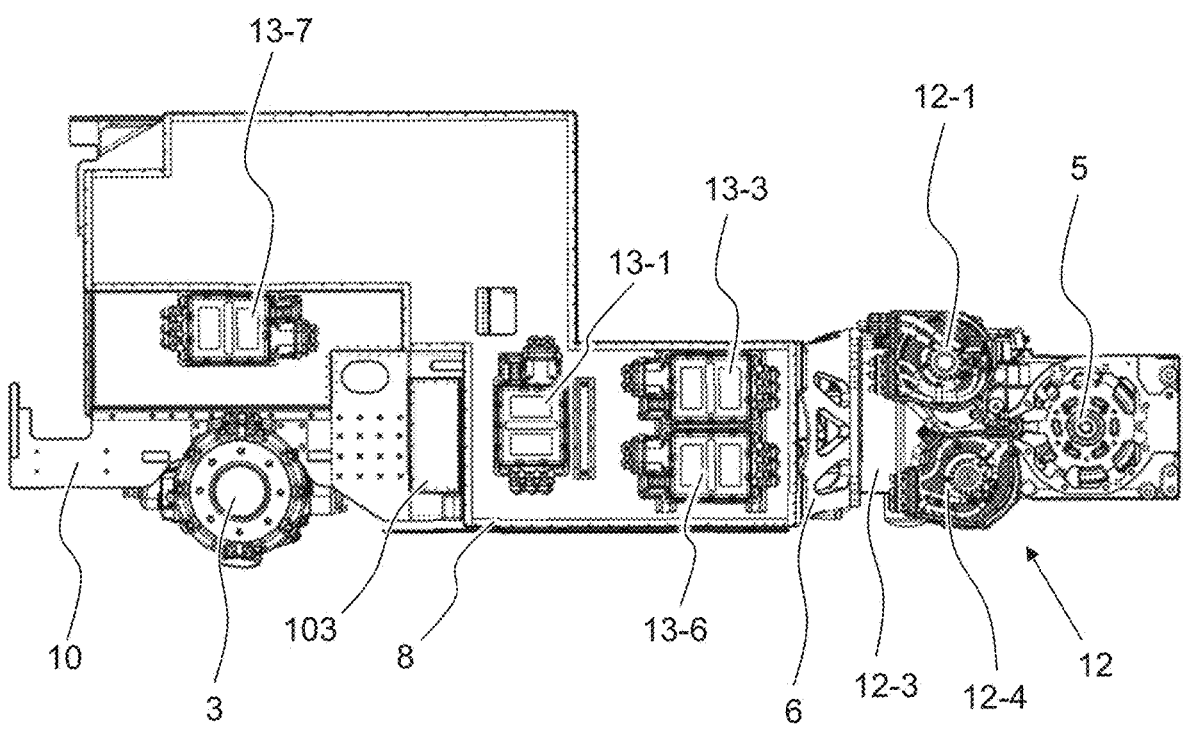
FIG. 6A shows a left side view of an intermediate frame, a battery housing, a front frame, and a rear frame of an electric vehicle according to a preferred embodiment of the present invention.
Figure 6B:
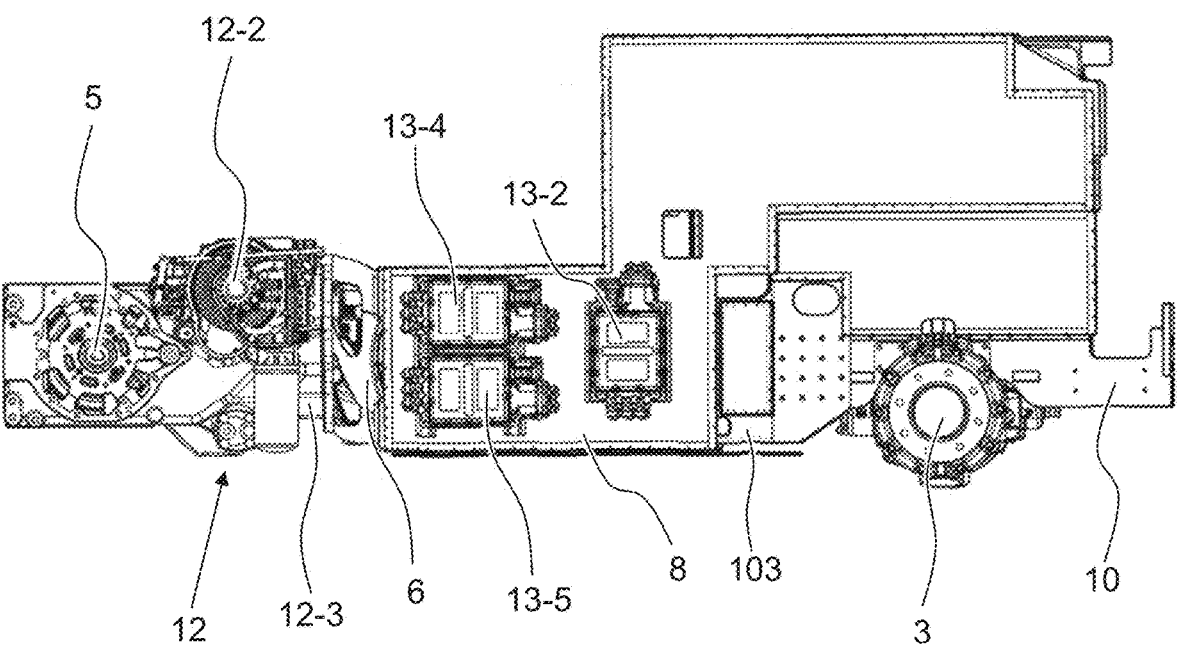
FIG. 6B shows a right side view of an intermediate frame, a battery housing, a front frame, and a rear frame of an electric vehicle according to a preferred embodiment of the present invention.

FIGS. 6A and 6B show, respectively, left and right side views of the intermediate frame 6, the battery housing 8, the front frame 10, and the rear frame 12 shown in FIG. 2, for example. A front portion of the intermediate frame 6 is attached to a rear portion of the battery housing 8, and a rear portion of the intermediate frame 6 is attached to a front portion of the rear frame 12. As shown in FIGS. 6A and 6B, the intermediate frame 6 is located between the battery housing 8 and the rear axle 5 in the front-rear direction of the vehicle 1. A chassis of the vehicle 1 can include the intermediate frame 6 and the front frame 10.

As described above, the rear frame 12 can include the first motor housing portion 12-1 to house the third electric motor 18, the second motor housing portion 12-2 to house the fourth electric motor 20, the third motor housing portion 12-3 to house the fifth electric motor 22, and the fourth motor housing portion 12-4 to house the sixth electric motor 24. In a preferred embodiment of the present invention, as shown, for example, in FIGS. 6A and 6B, the first motor housing portion 12-1, the second motor housing portion 12-2, the third motor housing portion 12-3, and the fourth motor housing portion 12-4 are preferably located in a rearward direction of the intermediate frame 6. Accordingly, each of the third electric motor 18, the fourth electric motor 20, the fifth electric motor 22, and the sixth electric motor 24 are preferably located rearwardly of the intermediate frame 6 in a front-rear direction of the vehicle 1.

In a preferred embodiment of the present invention, as shown, for example, in FIGS. 6A and 6B, one or more inverters 13 are connected to, attached on, or supported by the battery housing 8. For example, the one or more inverters 13 can include a first inverter 13-1, a second inverter 13-2, a third inverter 13-3, a fourth inverter 13-4, a fifth inverter 13-5, a sixth inverter 13-6, and a seventh inverter 13-7. Preferably, as shown in FIG. 6A, the first inverter 13-1, the third inverter 13-3, the sixth inverter 13-6, and the seventh inverter 13-7 are located on a left side of the battery housing 8. Preferably, as shown in FIG. 6B, the second inverter 13-2, the fourth inverter 13-4, and the fifth inverter 13-5 are located on a right side of the battery housing 8. More specifically, as shown in FIGS. 6A and 6B, the seventh inverter 13-7 can be attached to a left side cover of the fifth battery housing portion 34, each of the first inverter 13-1, the third inverter 13-3, and the sixth inverter 13-6 can be attached to a left side cover of the second battery housing portion 28, and each of the second inverter 13-2, the fourth inverter 13-4, and the fifth inverter 13-5 can be attached to a right side cover of the first battery housing portion 26. However, the total number of the inverters 13 is not limited, and the inverters 13 may be provided at other locations within the vehicle 1.

In preferred embodiment of the present invention, the first inverter 13-1 can provide electric power to the first electric motor 14, the second inverter 13-2 can provide electric power to the second electric motor 16, the third inverter 13-3 can provide electric power to the third electric motor 18, the fourth inverter 13-4 can provide electric power to the fourth electric motor 20, the fifth inverter 13-5 can provide electric power to the fifth electric motor 22, and the sixth inverter 13-6 can provide electric power to the sixth electric motor 24. The seventh inverter 13-7 can provide electric power to other components of the electric vehicle 1, for example, a cooling structure such as a 111 shown in FIG. 13 and discussed in further detail herein.

In a preferred embodiment of the present invention, the first inverter 13-1 and the second inverter 13-2 can be located symmetrically about a centerline of the vehicle 1. In a preferred embodiment of the present invention, the third inverter 13-3 and the fourth inverter 13-4 can be located symmetrically about the centerline of the vehicle 1. In a preferred embodiment of the present invention, the fifth inverter 13-5 and the sixth inverter 13-6 can be located symmetrically about the centerline of the vehicle 1.

In a preferred embodiment of the present invention, the first motor housing portion 12-1 and the second motor housing portion 12-2 can be located symmetrically about a centerline of the vehicle 1. Accordingly, the third electric motor 18 and the fourth electric motor 20 can be located symmetrically about a centerline of the vehicle 1.

Figure 7A:
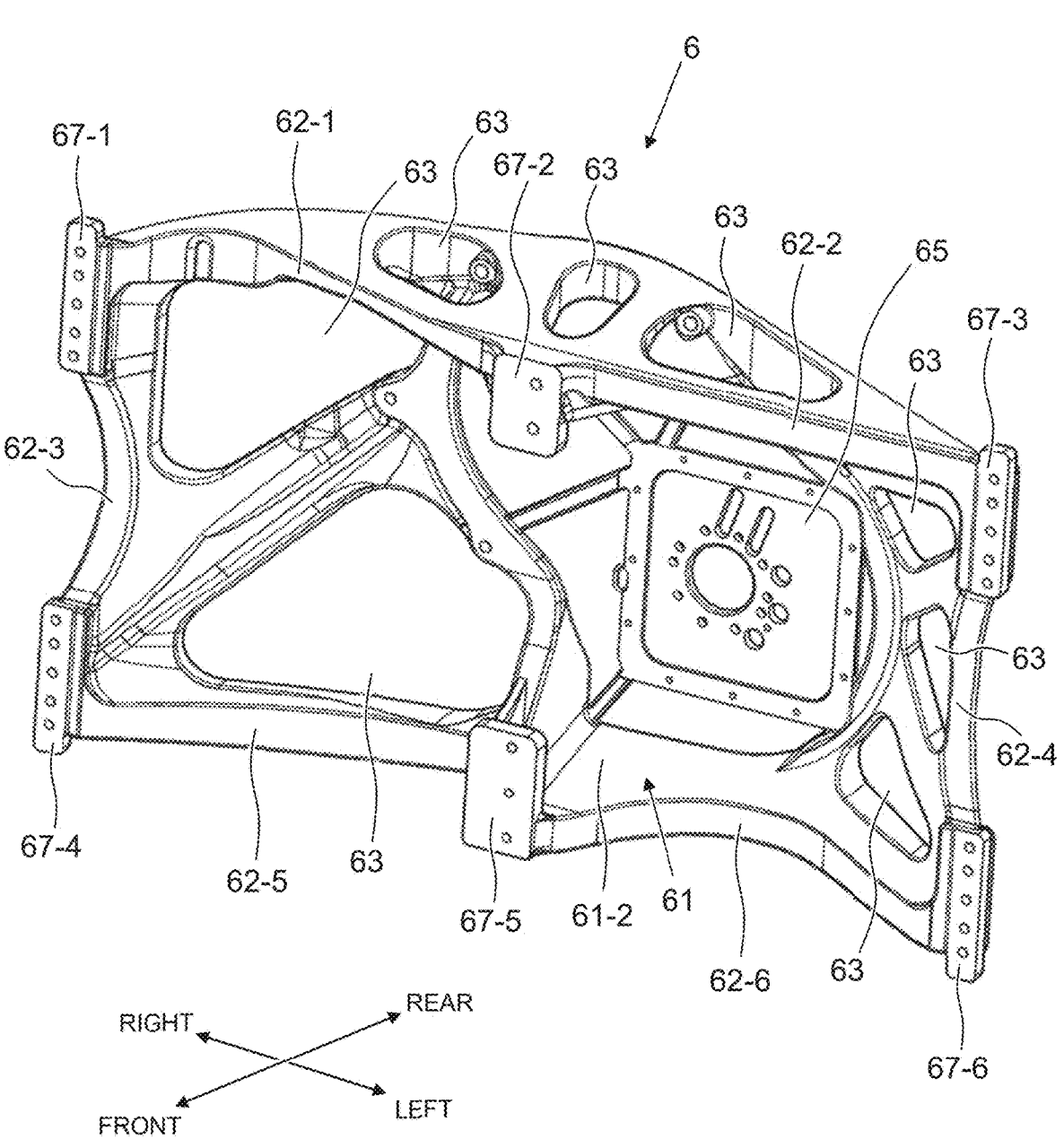
FIG. 7A shows a perspective left-front view of an intermediate frame of an electric vehicle according to a preferred embodiment of the present invention.
Figure 7B:
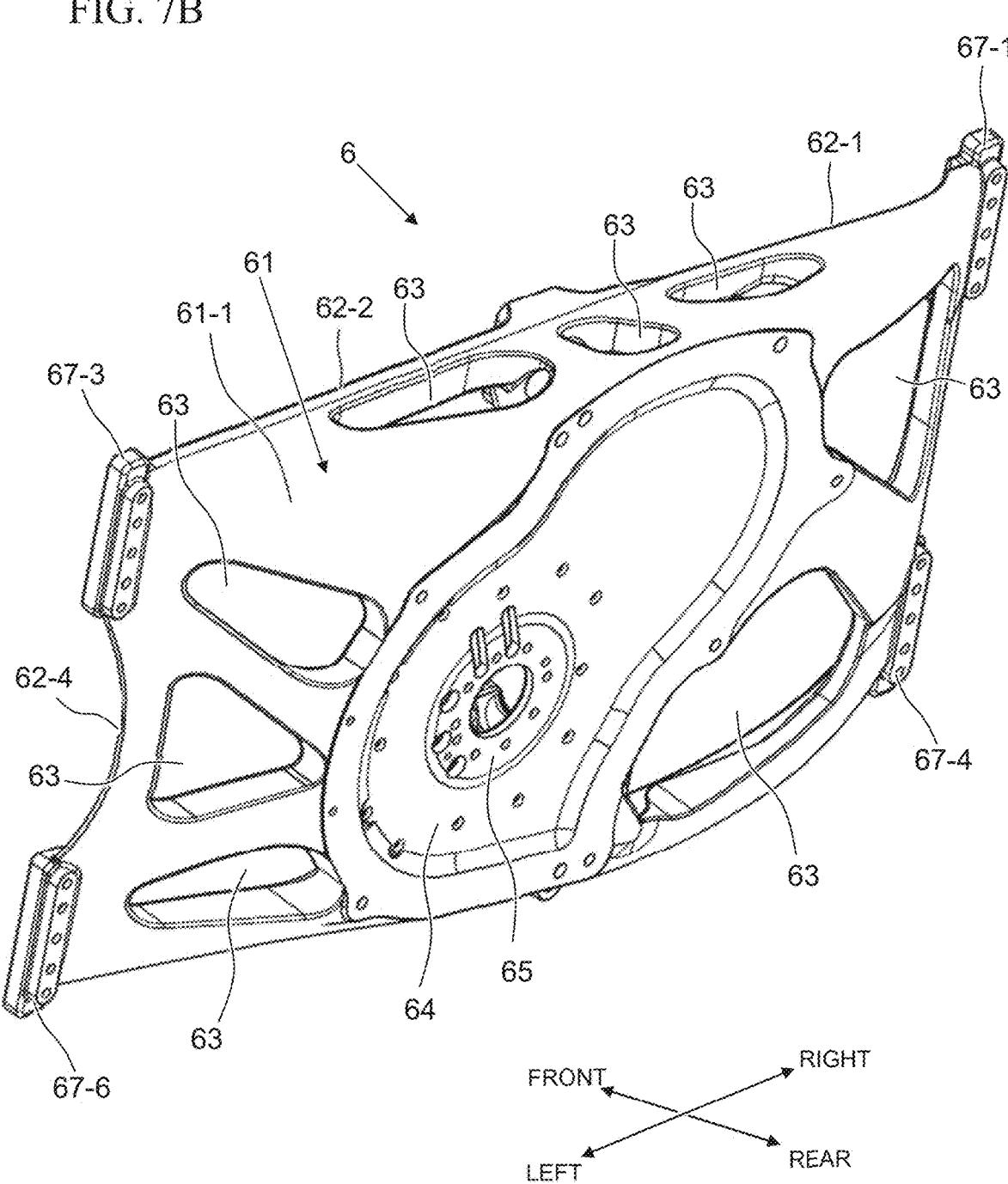
FIG. 7B shows a perspective left-rear view of an intermediate frame of an electric vehicle according to a preferred embodiment of the present invention.
Figure 8A:
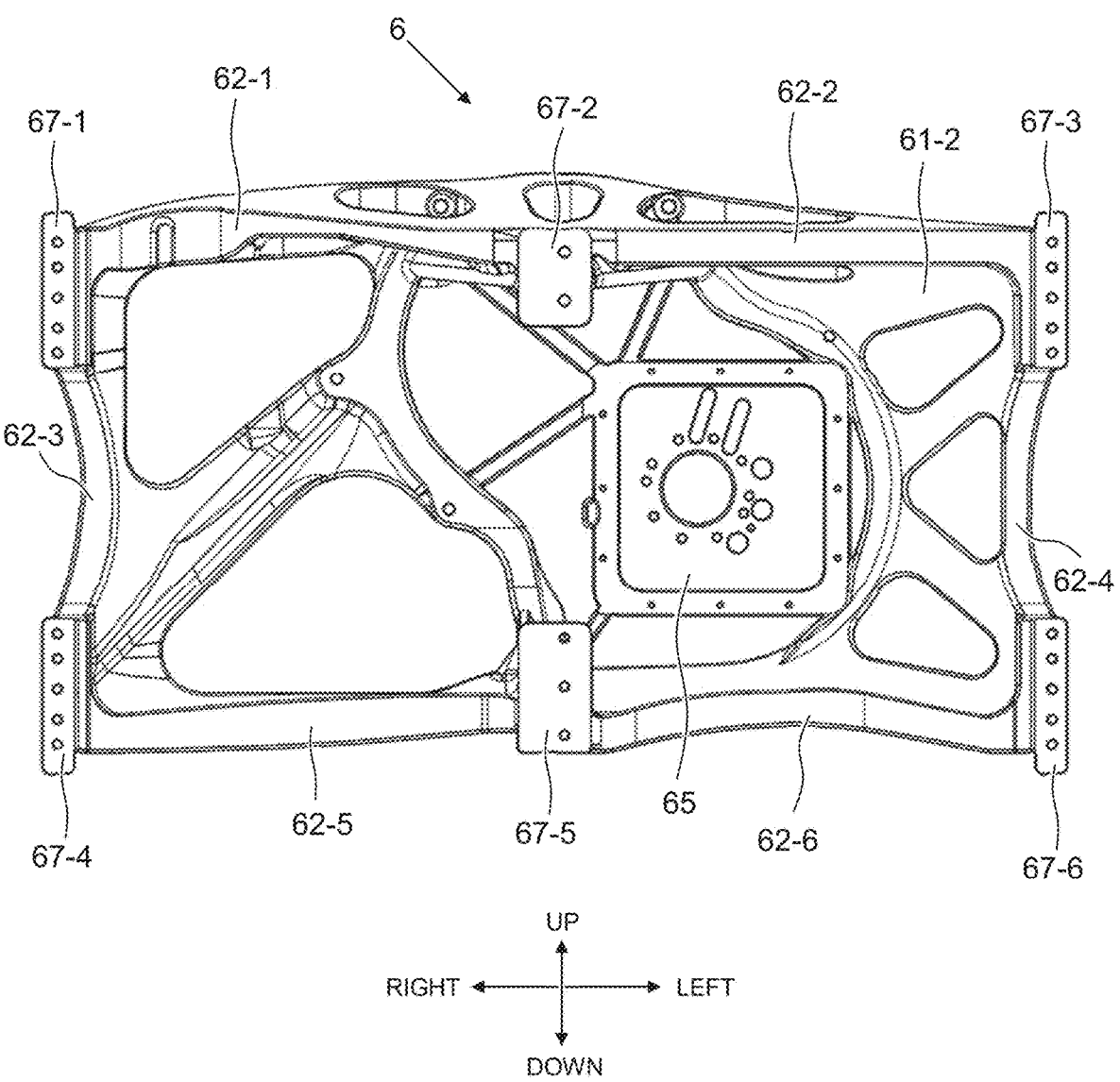
FIG. 8A shows a front view of an intermediate frame of an electric vehicle according to a preferred embodiment of the present invention.
Figure 8B:
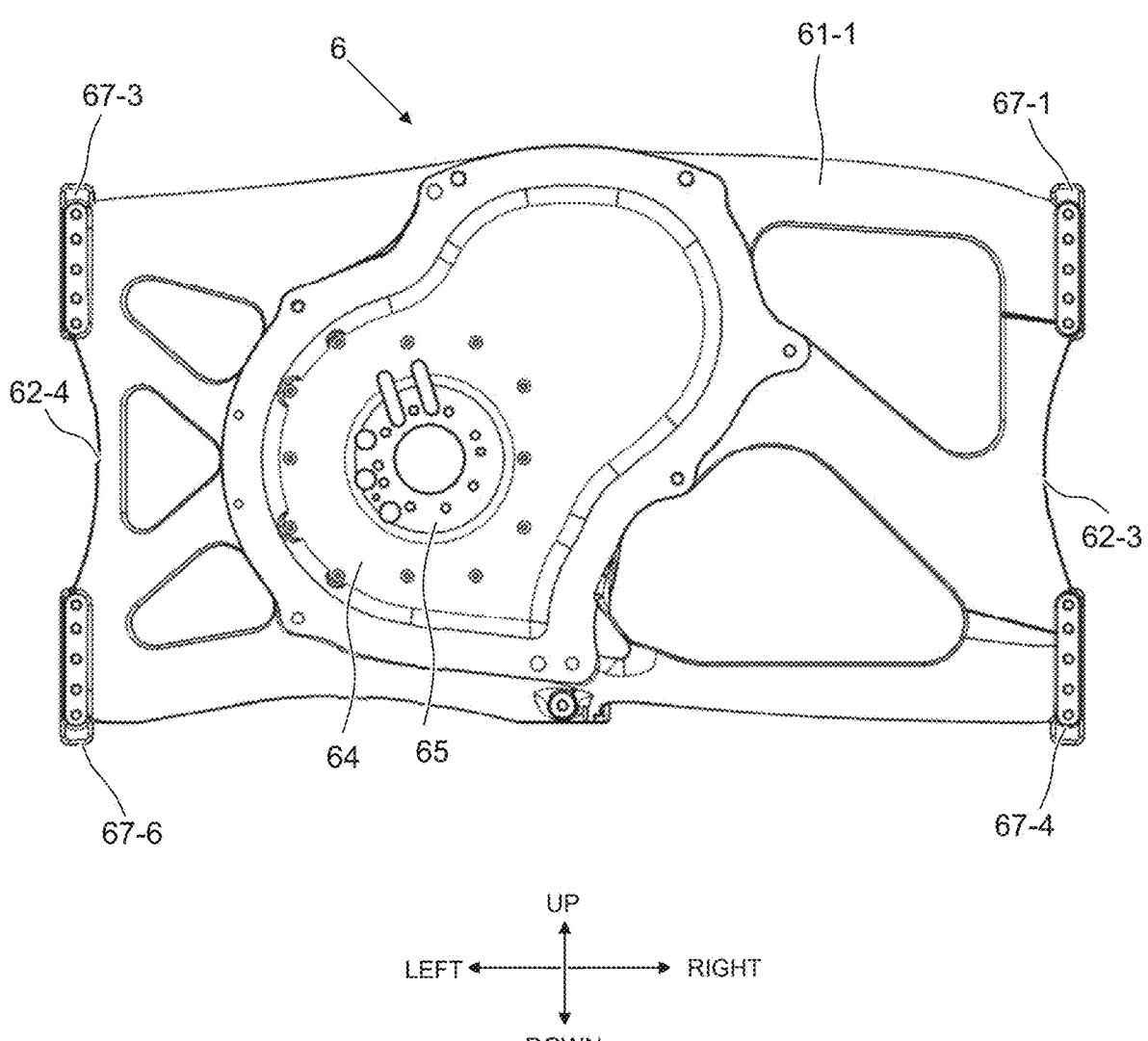
FIG. 8B shows a rear view of an intermediate frame of an electric vehicle according to a preferred embodiment of the present invention.
Figure 8C:
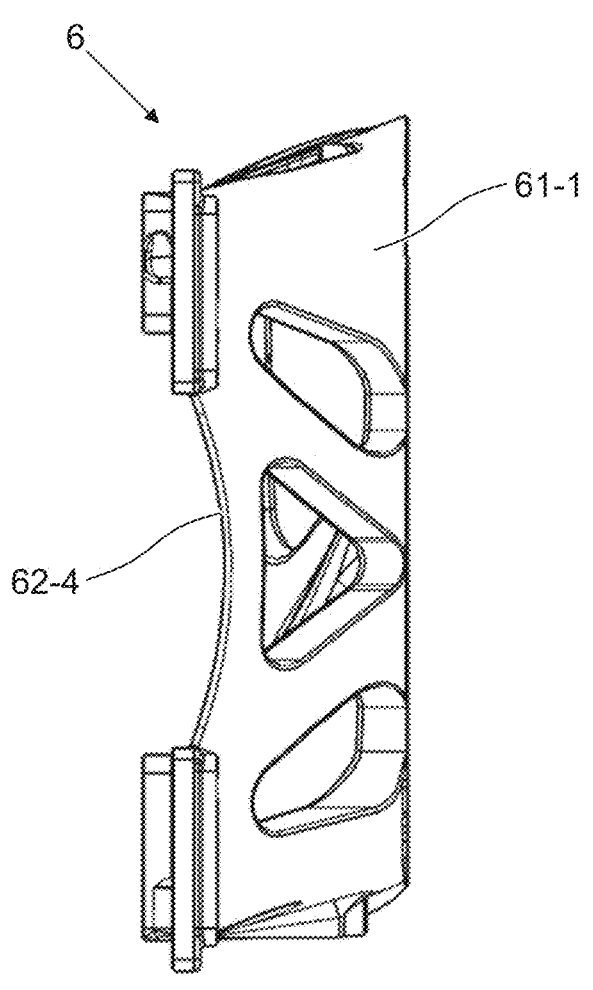
FIG. 8C shows a left side view of an intermediate frame of an electric vehicle according to a preferred embodiment of the present invention.
Figure 8C:
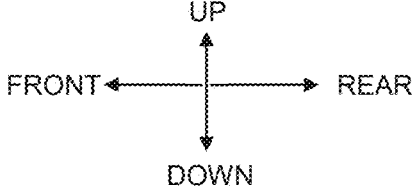
Figure 8D:
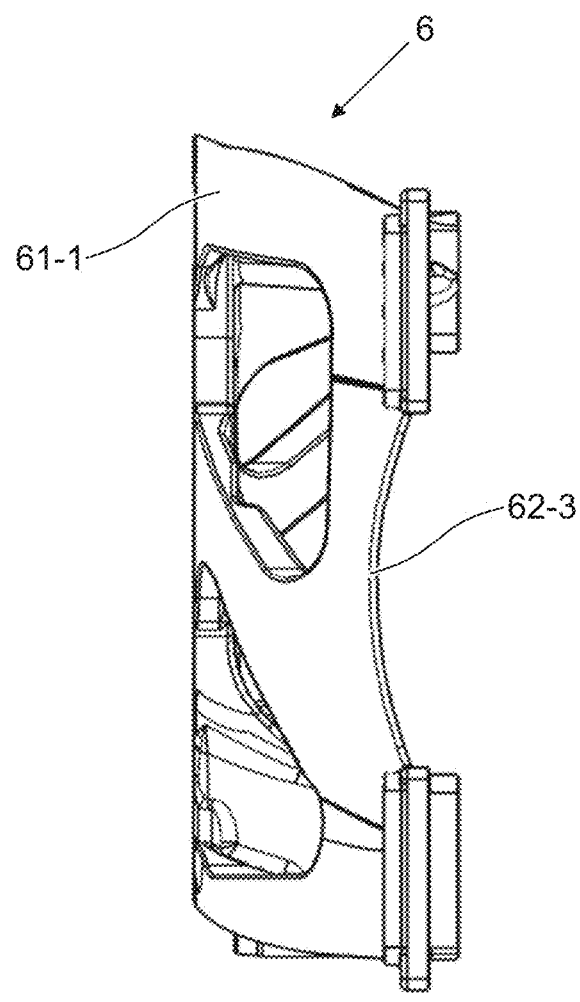
FIG. 8D shows a right side view of an intermediate frame of an electric vehicle according to a preferred embodiment of the present invention.
Figure 8D:
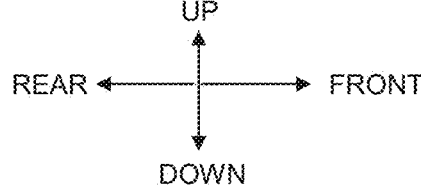
Figure 8E:
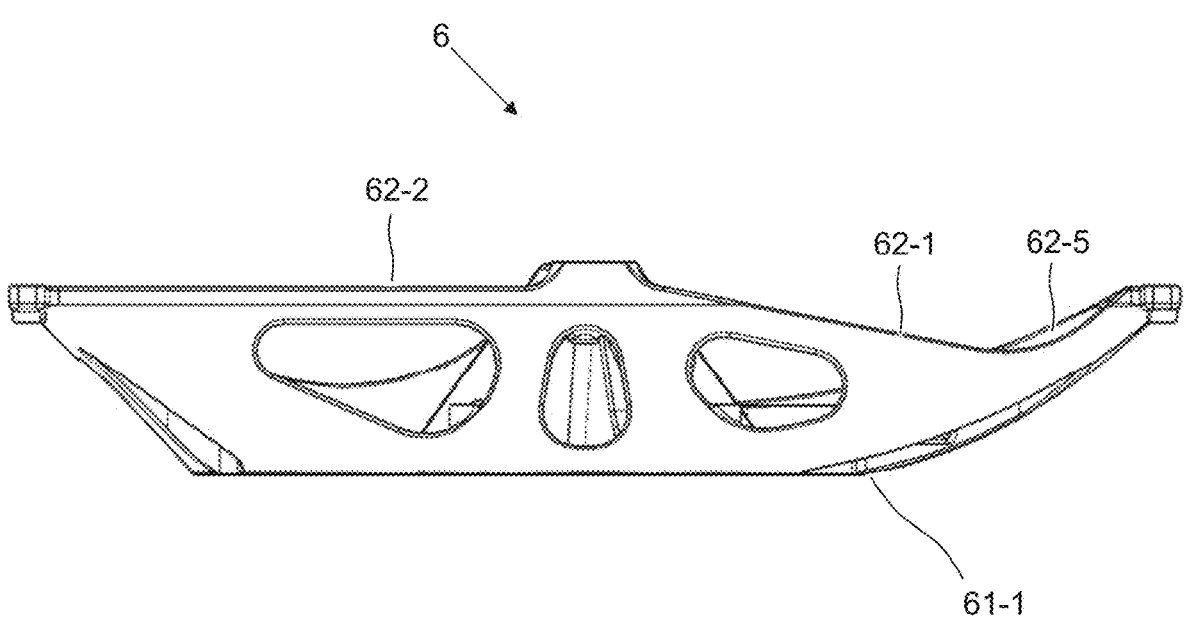
FIG. 8E shows a top view of an intermediate frame of an electric vehicle according to a preferred embodiment of the present invention.
Figure 8E:
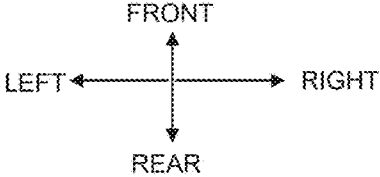
Figure 8F:
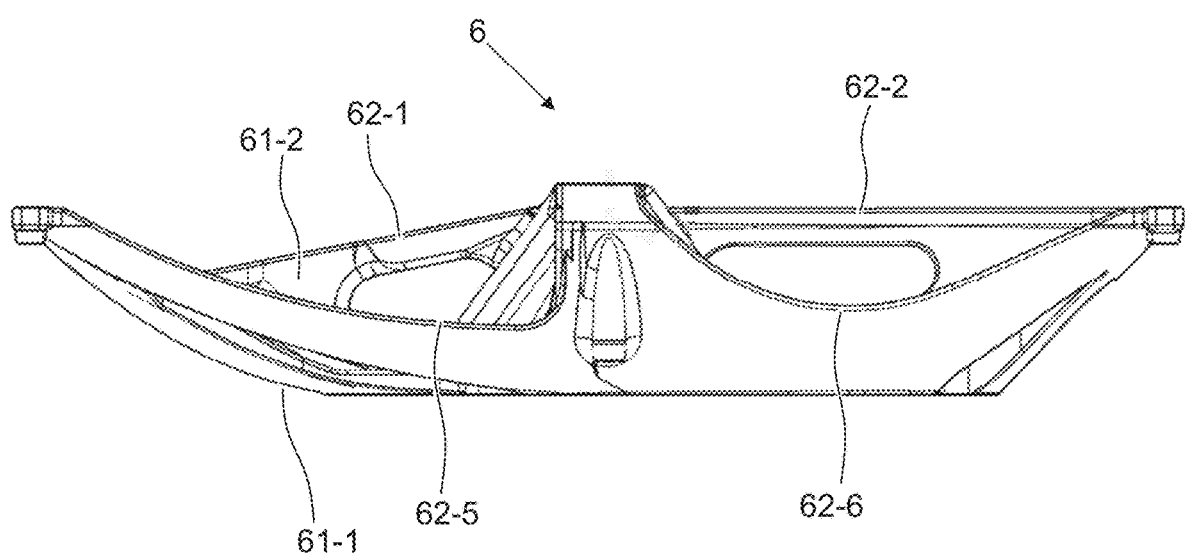
FIG. 8F shows a bottom view of an intermediate frame of an electric vehicle according to a preferred embodiment of the present invention.
Figure 8F:
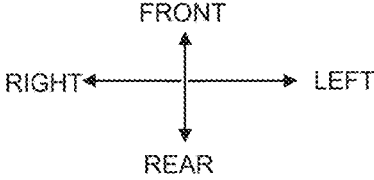

FIG. 7A shows a perspective left-front view of the intermediate frame 6, and FIG. 7B shows a perspective left-rear view of the intermediate frame 6. FIG. 8A shows a front view of the intermediate frame 6, FIG. 8B shows a rear view of the intermediate frame 6, FIG. 8C shows a left side view of the intermediate frame 6, FIG. 8D shows a right side view of the intermediate frame 6, FIG. 8E shows a top view of the intermediate frame 6, and FIG. 8F shows a bottom view of the intermediate frame 6.

In a preferred embodiment of the present invention, as shown, for example, in FIGS. 7A-8F, the intermediate frame 6 includes a main wall 61 with an exterior (rear) surface 61-1 and an interior (front) surface 61-2. The main wall 61 has a curved or rounded shape to distribute stress. The exterior surface 61-1 has a concave shape, and the interior surface 61-2 has a convex shape. The intermediate frame 6 includes an interior space that is defined by wall portions 62. The wall portions 62 can include a first upper wall portion 62-1, a second upper wall portion 62-2, a right wall portion 62-3, a left wall portion 62-4, a first lower wall portion 62-5, and a second lower wall portion 62-6. One or more of the wall portions 62 can be defined by an edge of the main wall 61.

According to a preferred embodiment of the present invention, for example, as shown in FIGS. 7A, 7B, 8A, and 8B, one or more bolting portions 67 can be provided along edges of the main wall 61. The bolting portions can include a first (upper-right) bolting portion 67-1, a second (upper-middle) bolting portion 67-2, a third (upper-left) bolting portion 67-3, a fourth (lower-right) bolting portion 67-4, a fifth (lower-middle) bolting portion 67-5, and a sixth (lower-left) bolting portion 67-6. That is, the intermediate frame 6 can include four bolting portions 67 at each of the four corners of the main wall 61 and two bolting portions at a middle portion of each of an upper edge and a lower edge of the main wall 61. Each of the bolting portions 67 can include one or more bolt holes, such that bolts can be inserted through the bolt holes to attach and secure the intermediate frame to battery housing 8.

According to a preferred embodiment of the present invention, for example, as shown in FIGS. 7A and 8A, the first upper wall portion 62-1 and the second upper wall portion 62-2 are spaced apart from each other by the second (upper-middle) bolting portion 67-2, and the first lower wall portion 62-5 and the second lower wall portion 62-6 are spaced apart from each other by the fifth (lower-middle) bolting portion 67-5.

According to a preferred embodiment of the present invention, at least one of the wall portions 62 is curved. For example, as shown in FIGS. 7A, 8A, and 8C-8F, each of the first upper wall portion 62-1, the right wall portion 62-3, the left wall portion 62-4, the first lower wall portion 62-5, and the second lower wall portion 62-6 has a curved shape. According to the shapes of the walls 61 and the wall portions 62, the intermediate frame 6 can have an asymmetrical shape in a plan view.

According to a preferred embodiment of the present invention, the intermediate frame 6 can also include one or more openings 63. As shown in FIGS. 7A and 7B, openings 63 can be provided in the main wall 61 and can be located along one or more of the first upper wall portion 62-1, the second upper wall portion 62-2, the right wall portion 62-3, the left wall portion 62-4, the first lower wall portion 62-5, and the second lower wall portion 62-6. The openings 63 can permit the passage of cables, coolant lines, refrigerant lines, oil lines, and the like, as described below with respect to FIGS. 10A and 10B.

In a preferred embodiment of the present invention, as shown, for example, in FIGS. 7B and 8B, the intermediate frame 6 can include a depression 64 on the exterior (rear) surface 61-1. The third motor housing portion 12-3 can be fitted to the depression 64, and at least a portion of an outer shape or perimeter of the depression 64 can match or follow a shape of a mounting face of the third motor housing portion 12-3. The intermediate frame 6 further includes a motor mount 65, which can be circumscribed by the depression 64. The fifth electric motor 22 can be mounted to the intermediate frame 6 at the motor mount 65, as shown in FIG. 10B. The motor mount 65 can include a shape that matches or follows a shape of a perimeter of the fifth electric motor 22. At least a portion of the outer shape or perimeter of the depression 64 or the shape of the motor mount 65 can at least partially match or follow a perimeter of a gearing, for example, the fifth gearing 23 or a reduction gear connected to the fifth electric motor 22.

Figure 9A:
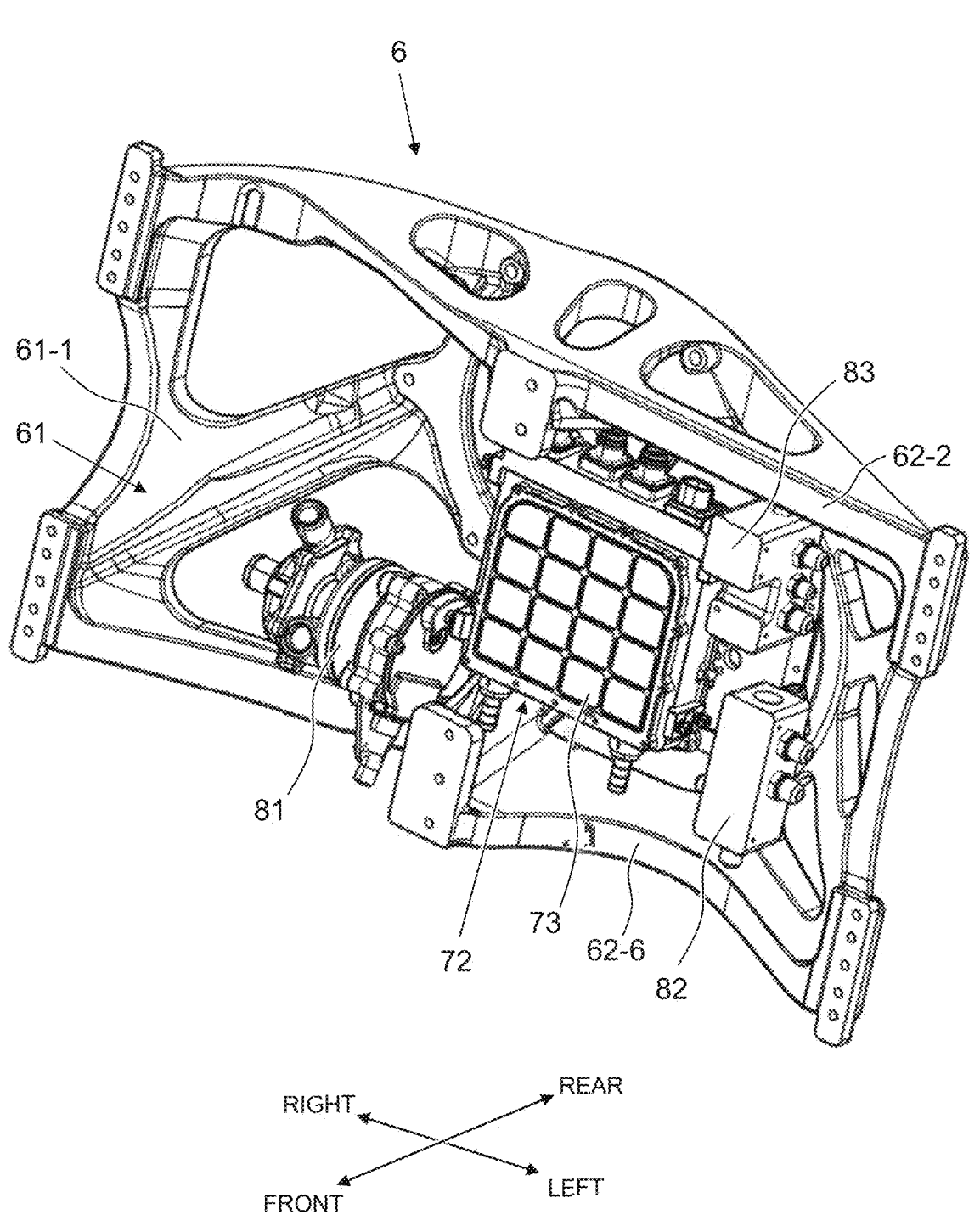
FIG. 9A shows a perspective left-front view of an intermediate frame housing components of an electric vehicle according to a preferred embodiment of the present invention.
Figure 9B:
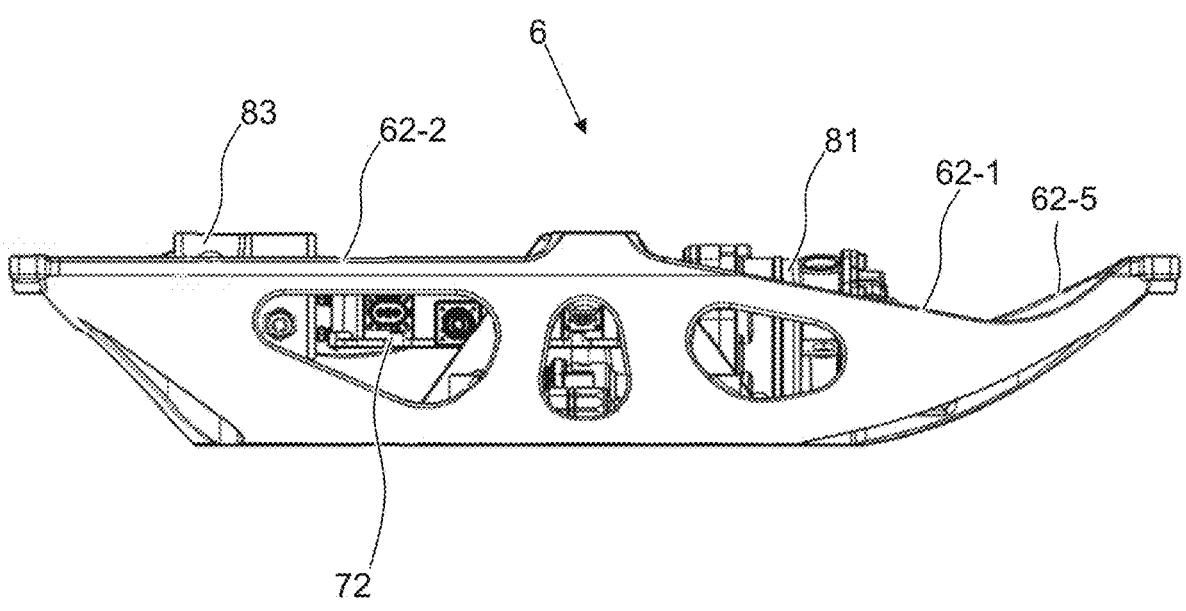
FIG. 9B shows a top view of an intermediate frame housing components of an electric vehicle according to a preferred embodiment of the present invention.
Figure 9B:
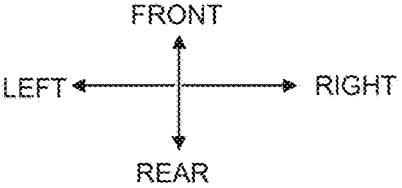

FIGS. 9A and 9B show a perspective left-front view and a top view of the intermediate frame 6 housing components of the vehicle 1.

In a preferred embodiment of the present invention, as shown, for example, in FIG. 9A, the intermediate frame 6 can house a converter 72, a pump 81, a first hydraulic manifold 82, and a second hydraulic manifold 83. Each of the converter 72, the pump 81, the first hydraulic manifold 82, and the second hydraulic manifold 83 can be partially or completely located within the space defined by the concave shape of the interior surface 61-1 of the main wall 61. For example, as shown in FIG. 9B, the converter 72 can be completely located within the space defined by the concave shape of the interior surface 61-1 of the main wall 61. However, the pump 81 can partially extend beyond each of the first upper wall portion 62-1 and the first lower wall portion 62-5, and the second hydraulic manifold 83 can partially extend beyond the second upper wall portion 62-2.

According to a preferred embodiment of the present invention, the converter 72 can include an electrical converter such as a DC-DC converter, for example, and the DC-DC converter can be a down-converter that converts a battery voltage of one or more batteries included in the battery housing 8 to a lower voltage. At least one surface of the converter 72 can be partially or completely covered by an isolation barrier 73, as shown in FIG. 9A. The isolation barrier 73 can be structured to include a flat or textured plate shape. The isolation barrier 73 can include an insulating material, for example, an electrically insulating material. Alternatively, or in addition, an isolation barrier can be provided that partially or completely spans between the second upper wall portion 62-2 and the second lower wall portion 62-6. In another preferred embodiment of the present invention, the converter 72 can be replaced with another electrical component.

According to a preferred embodiment of the present invention, the pump 81 can be a coolant pump. The first hydraulic manifold 82 can be provided to control a distribution of coolant, and the second hydraulic manifold 83 can be provided to control a return of the coolant. The first hydraulic manifold 82 and the second hydraulic manifold 83 can each include one or more direction control valves. As one example, the coolant can be water.

Figure 10A:
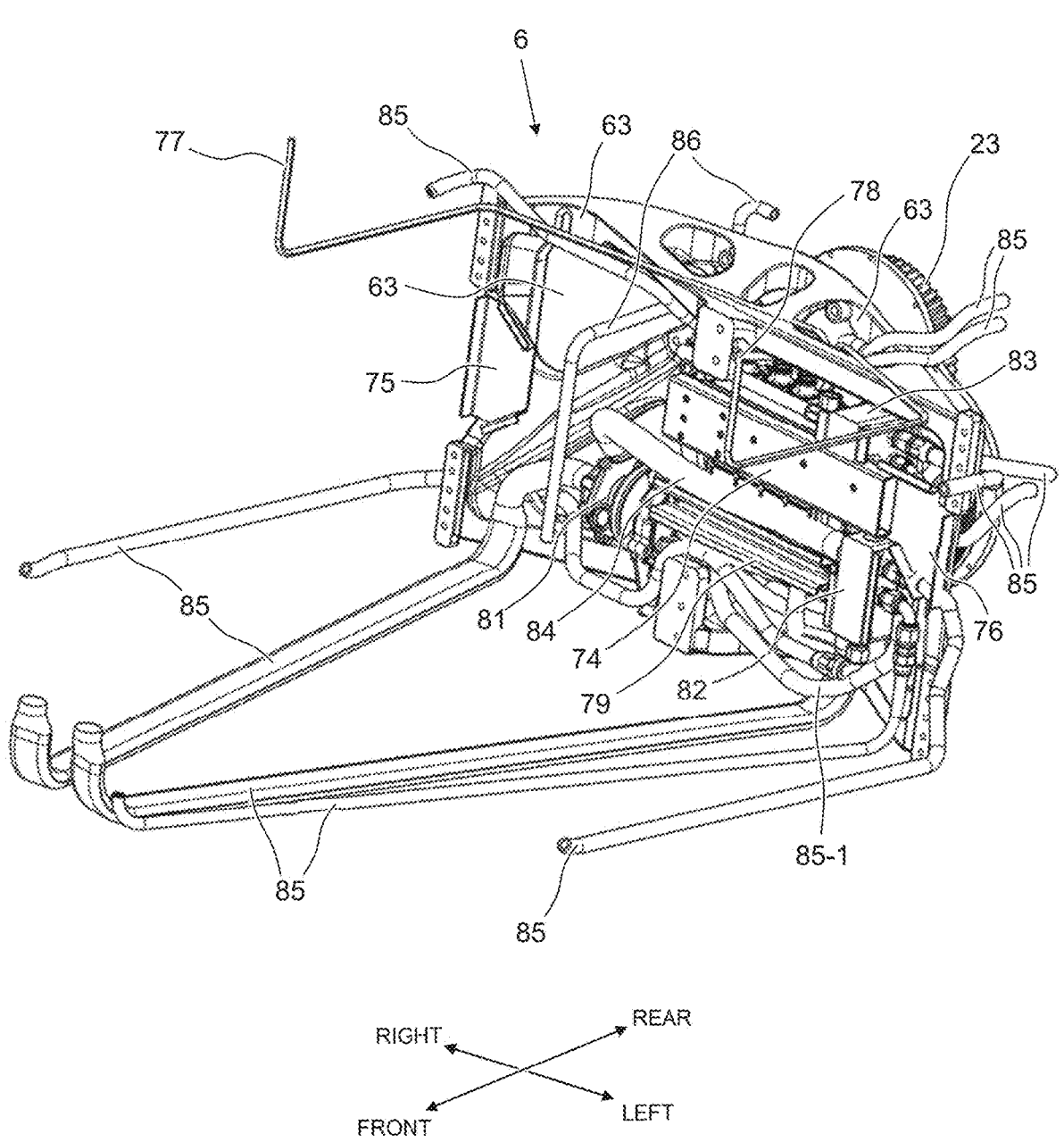
FIG. 10A shows a perspective left-front view of an intermediate frame housing components of an electric vehicle and connections to the components according to a preferred embodiment of the present invention.
Figure 10B:
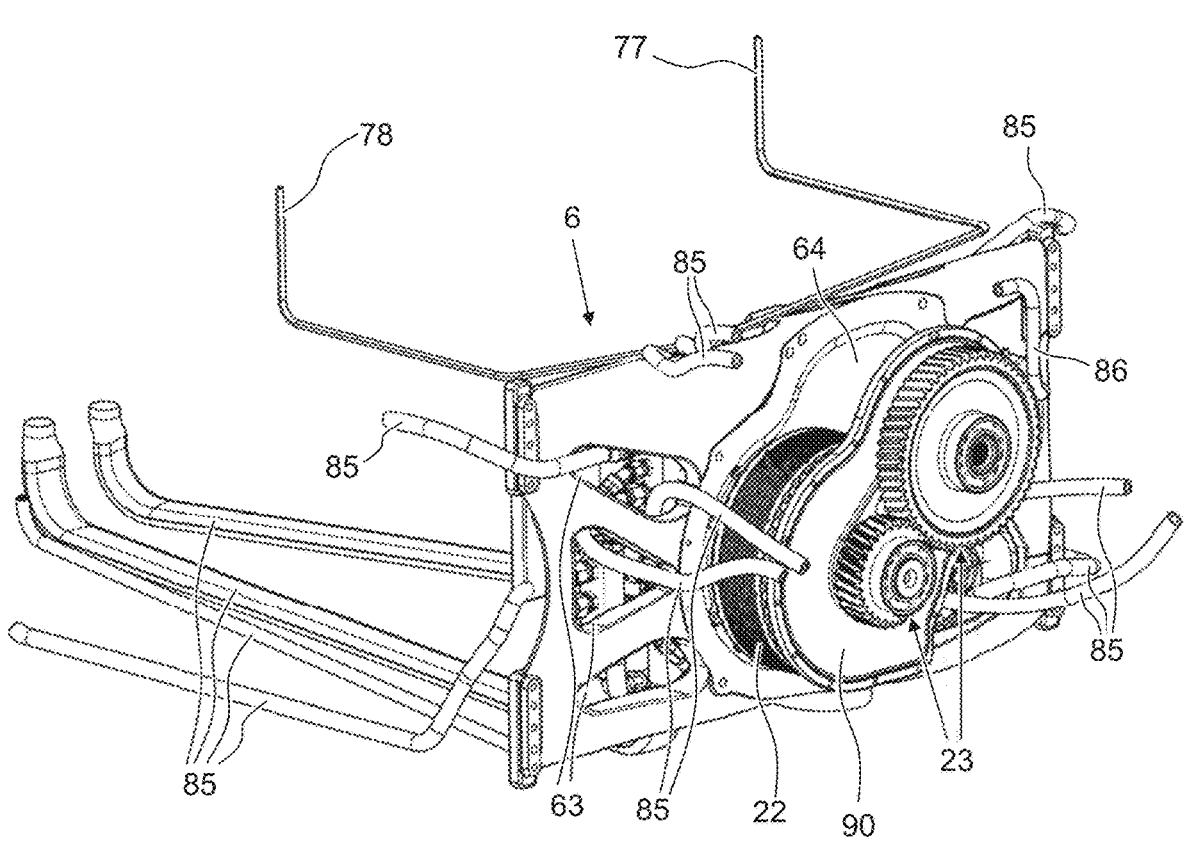
FIG. 10B shows a perspective left-rear view of an intermediate frame housing components of an electric vehicle and connections to the components according to a preferred embodiment of the present invention.
Figure 10B:
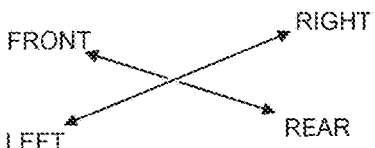

FIGS. 10A and 10B show a perspective left-front view and perspective left-rear view of connections to the components housed in the intermediate frame 6 of the vehicle 1.

In a preferred embodiment of the present invention, as shown, for example, in FIG. 10A, a duct channel 74 and covers 75 and 76 can be connected to or supported by the intermediate frame 6. The duct channel 74 can be provided in front of the converter 72, and the duct channel 74 can provide a passage for electrical cables or the like. The covers 75 and 76 can also provide protection for electrical cables or the like. According to a preferred embodiment of the present invention, the duct channel 74 and the covers 75 and 76 guide electrical cables or battery strings. The intermediate frame 6 can also be provided with a bracket 79, as shown in FIG. 10A. The bracket 79 can fix and secure the converter 72 within the intermediate frame 6.

In a preferred embodiment of the present invention, as shown, for example, in FIGS. 10A and 10B, first and second electrical cables 77 and 78 can pass through one of the openings 63 of the intermediate frame 6. The first electrical cable 77 can be a positive (+) connection from the converter 72 to a power distribution unit or the like. The second electrical cable 78 can be a negate (−) connection from the converter 72 to a power distribution unit or the like. Additional electrical cables can be located in and/or pass through the intermediate frame 6. For example, one or more of the openings 63 of the intermediate frame 6 can provide a passage for an electrical cable connected between one of the inverters 13 and one of the third electric motor 18, the fourth electric motor 20, the fifth electric motor 22, and the sixth electric motor 24.

In a preferred embodiment of the present invention, as shown, for example, in FIG. 10A, the intermediate frame 6 can house a supply coolant line 84 that supplies coolant from the pump 81 to the first hydraulic manifold 82. A plurality of inlet, outlet, return, and/or distribution coolant lines 85 can be connected to one or more of the pump 81, the first hydraulic manifold 82, and the second hydraulic manifold 83. One or more of the coolant lines 85 can pass through one or more of the openings 63 of the intermediate frame 6. At least one of the coolant lines 85-1 can be provided to supply coolant to the converter 72. As one example, the coolant can be water.

According to a preferred embodiment of the present invention, one or more further coolant or refrigerant lines 86 can pass through one or more of the openings 63 of the intermediate frame 6 without being directly connected to any of the pump 81, the first hydraulic manifold 82, and the second hydraulic manifold 83. For example, the one or more further coolant or refrigerant lines 86 can be connected between a heat exchanger and a component to be cooled.

In a preferred embodiment of the present invention, as shown, for example, in FIG. 10B, the fifth electric motor 22 is mounted to the intermediate frame 6 at the motor mount 65 (shown in FIGS. 7B and 8B). The fifth electric motor 22 is connected to the fifth gearing 23, and the fifth gearing 23 can drive an electric vehicle component, for example, a power take-off (PTO) component. As shown in FIG. 10B, a plate 90 at least partially cover the fifth electric motor 22. The plate 90 can be provided between the fifth electric motor 22 and the fifth gearing 23. The plate 90 can define a bearing block or a bearing carrier.

Figure 11A:
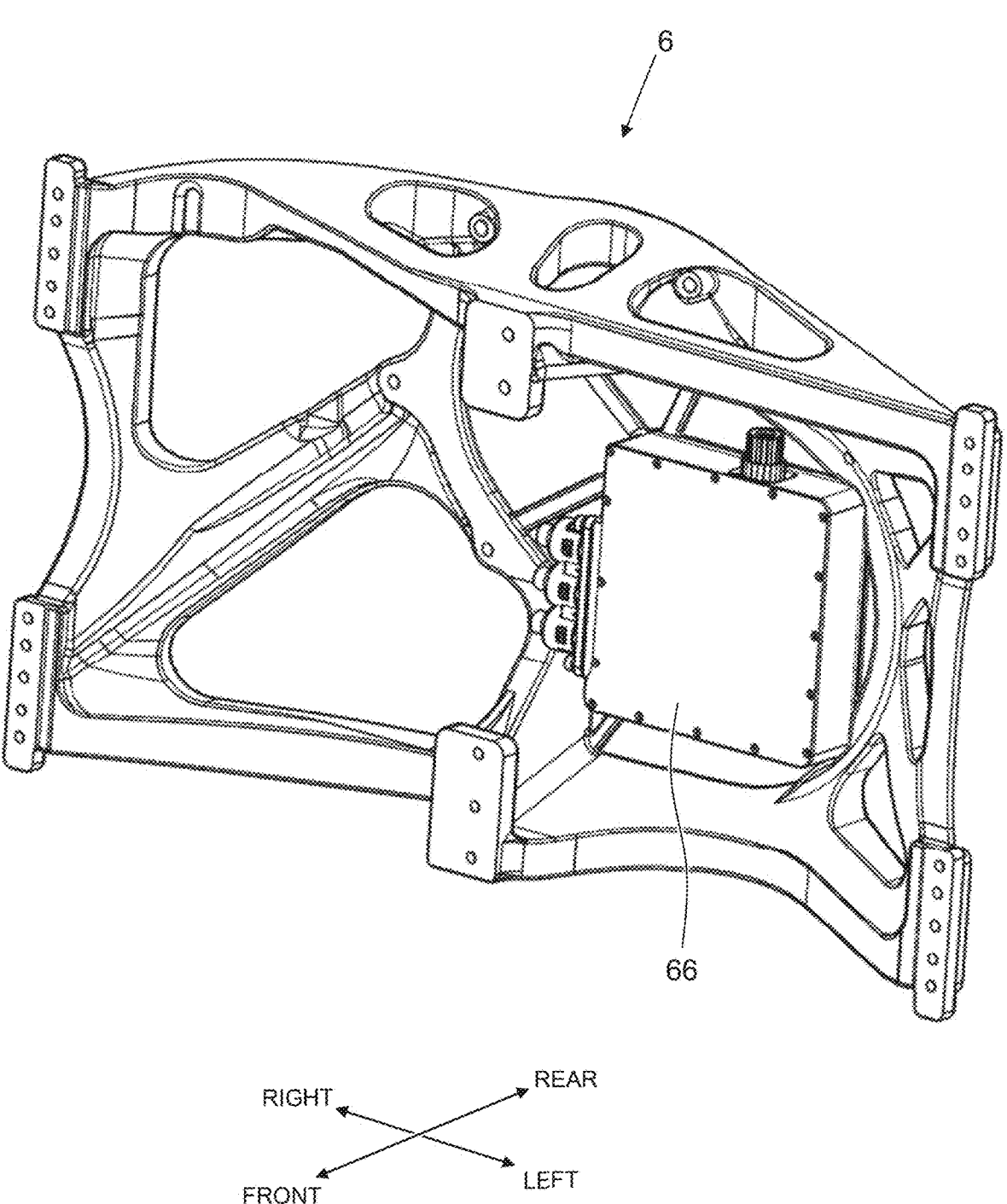
FIG. 11A shows a perspective left-front view of an intermediate frame of an electric vehicle that includes a motor cover according to a preferred embodiment of the present invention.
Figure 11B:
FIG. 11B shows a front view of an intermediate frame of an electric vehicle that includes a motor cover according to a preferred embodiment of the present invention.
Figure 11B:
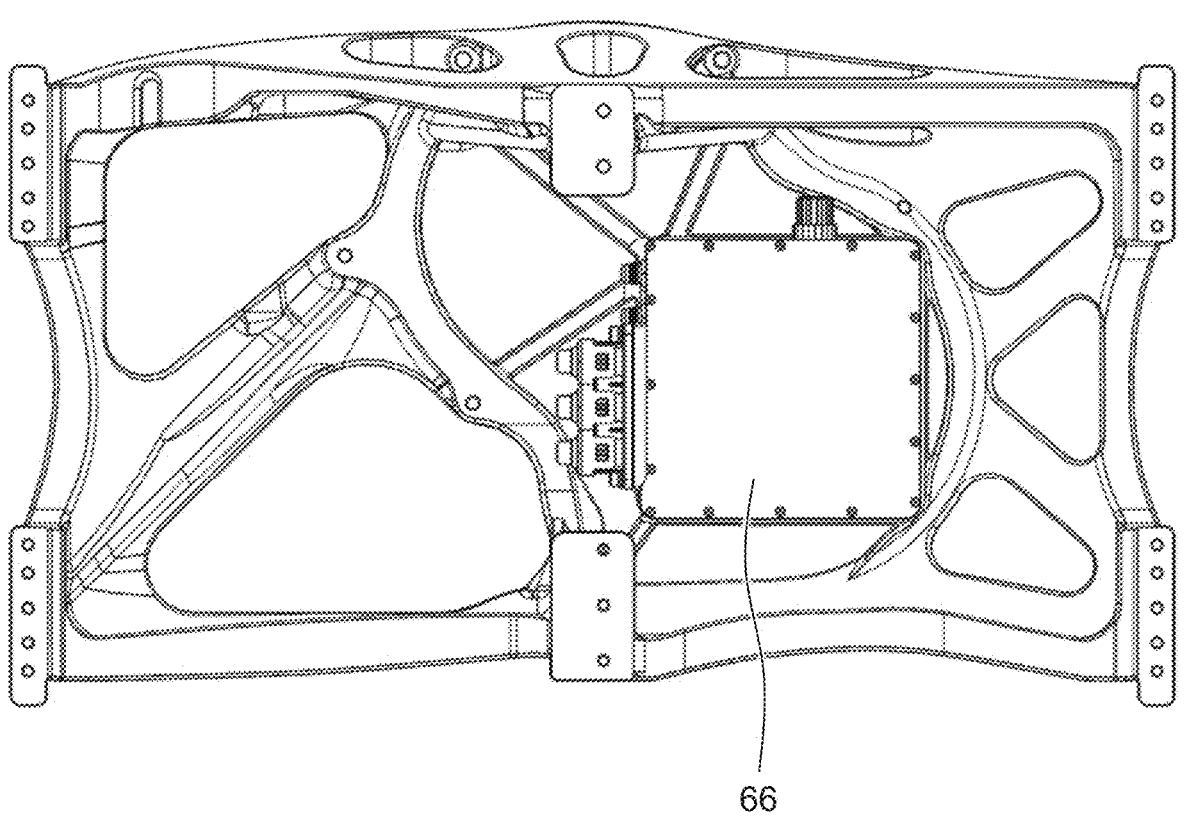
Figure 11B:
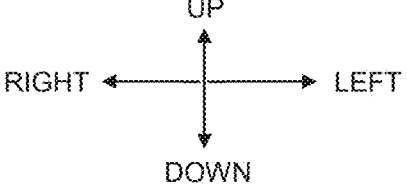

FIGS. 11A and 11B show a perspective left-front view and a front view of a motor cover 66 housed within the intermediate frame 6.

In a preferred embodiment of the present invention, as shown, for example, in FIGS. 11A and 11B, the motor cover 66 can be located on the interior (front) surface 61-2 of the main wall 61 to cover a portion of the motor mount 65 that is located at the interior (front) surface 61-2 of the main wall 61. The motor cover 66 can isolate and protect the converter 72 from the fifth electric motor 22 and from mounting components for the fifth electric motor 22.

Figure 12A:
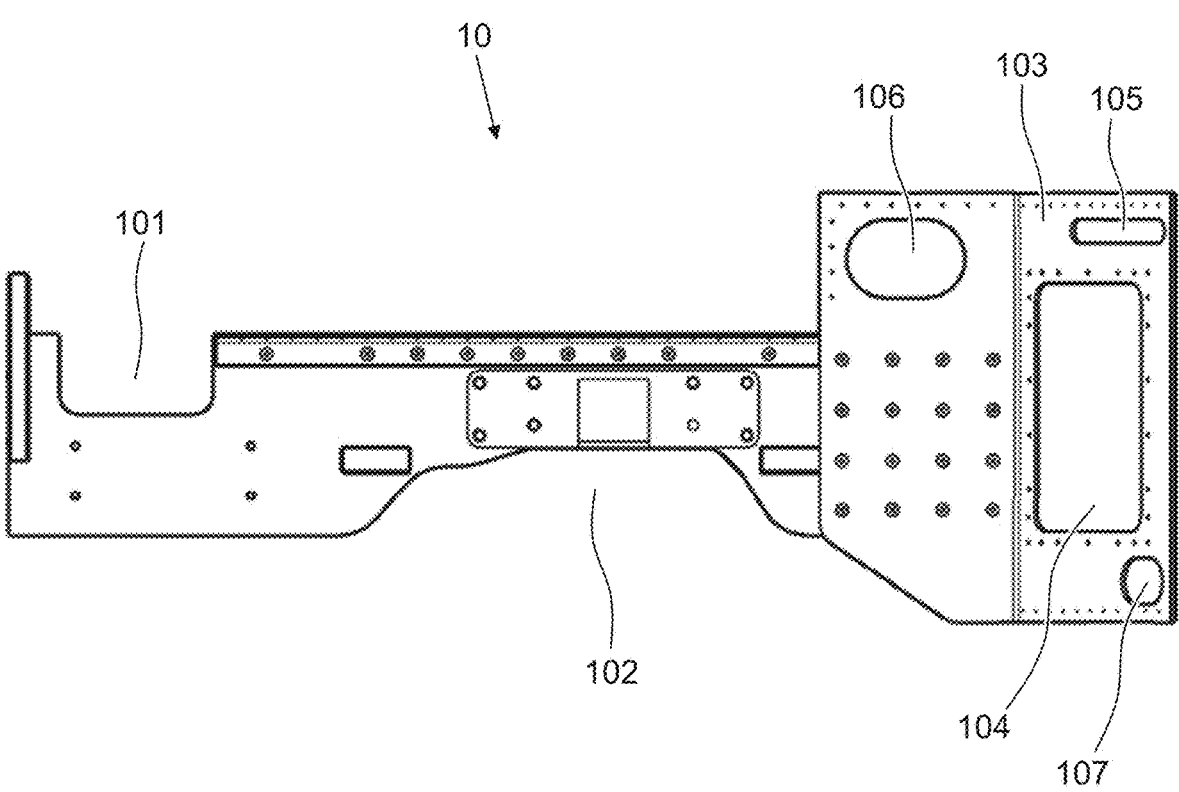
FIG. 12A shows a left side view of a front frame of an electric vehicle according to a preferred embodiment of the present invention.
Figure 12A:
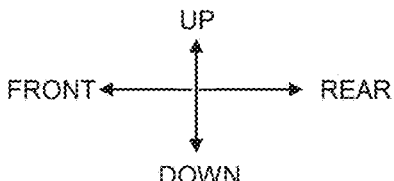
Figure 12B:
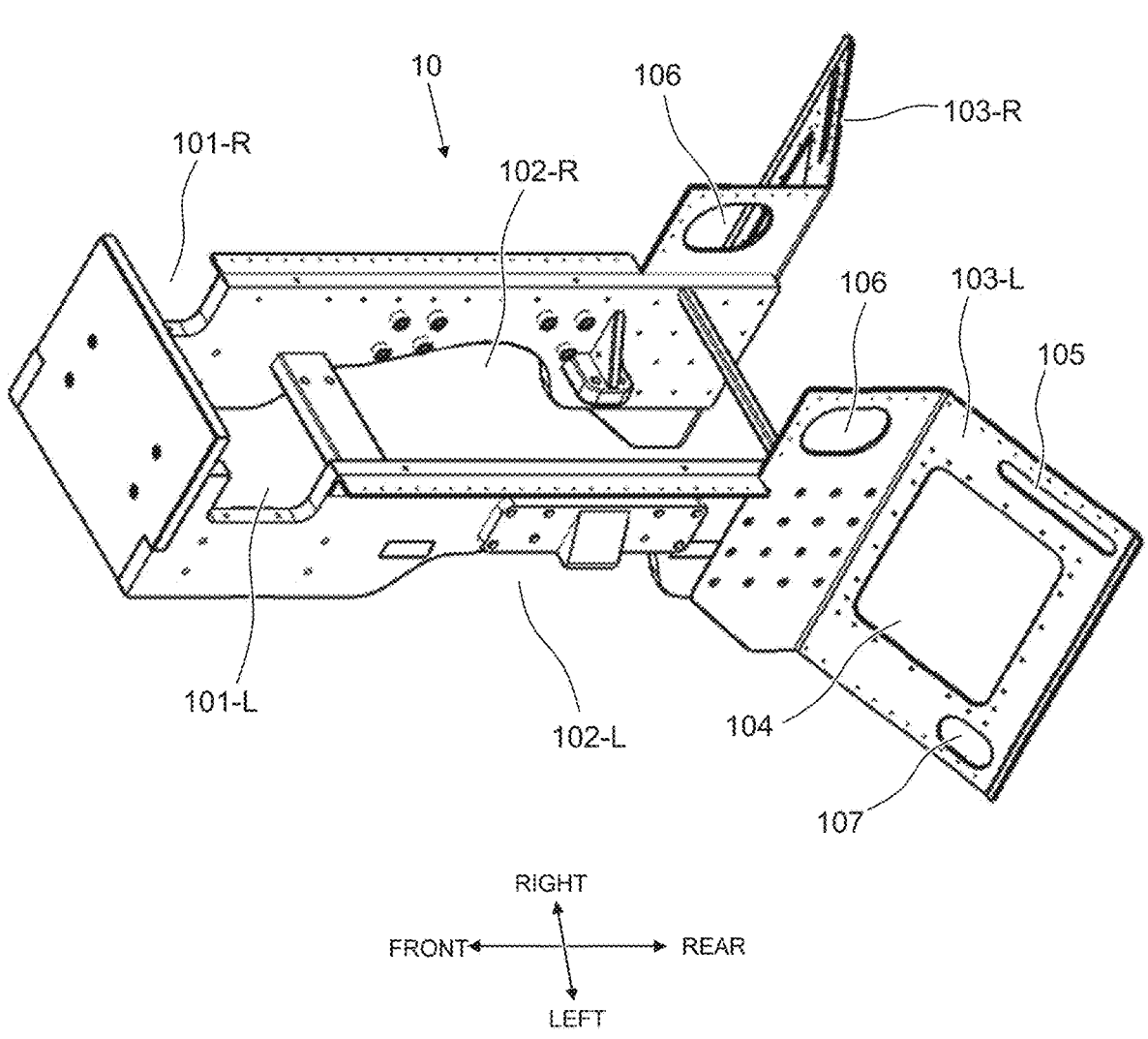
FIG. 12B shows a perspective left-front view of a front frame of an electric vehicle according to a preferred embodiment of the present invention.
Figure 12C:
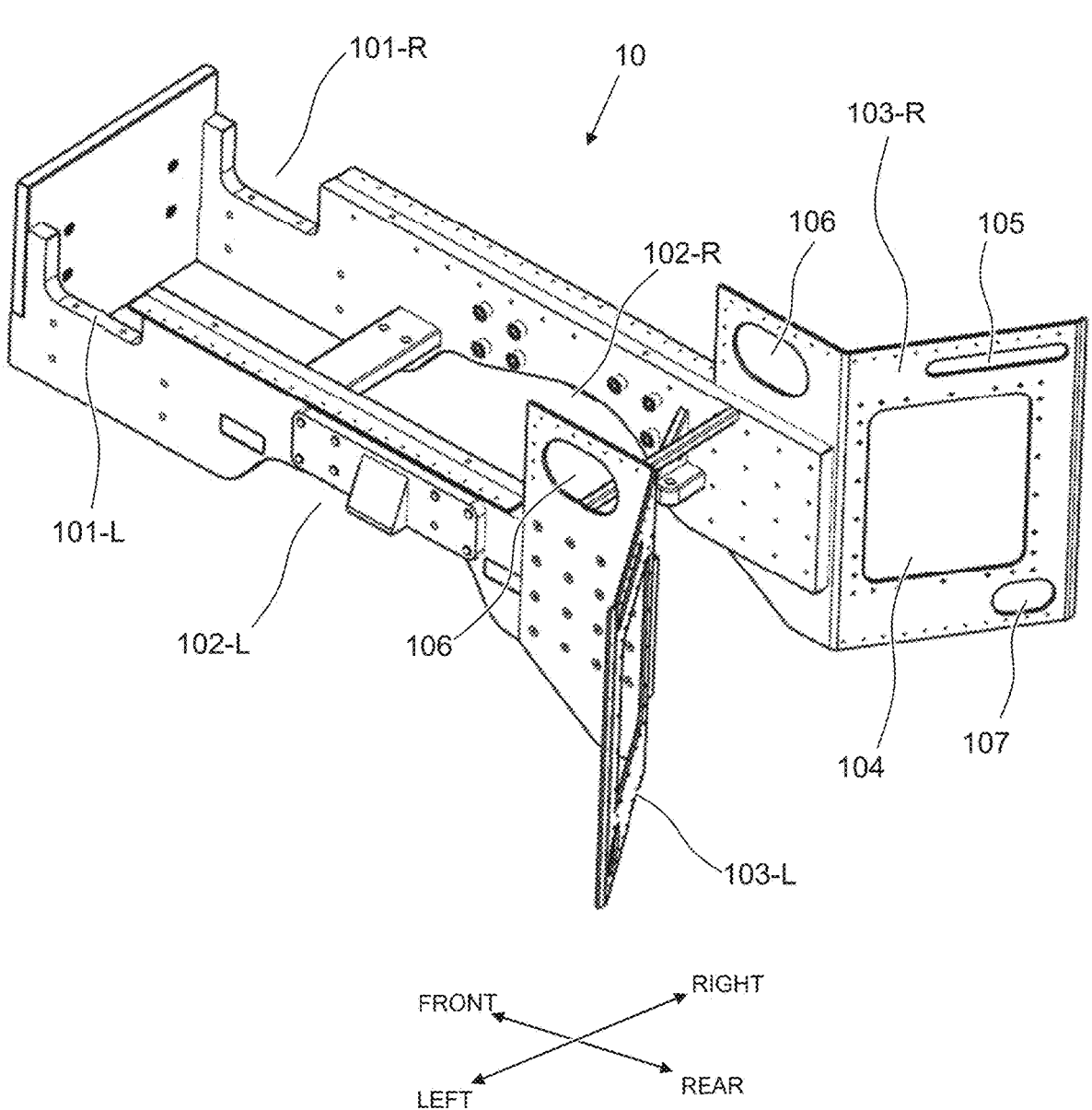
FIG. 12C shows a perspective left-rear view of a front frame of an electric vehicle according to a preferred embodiment of the present invention.
Figure 12D:
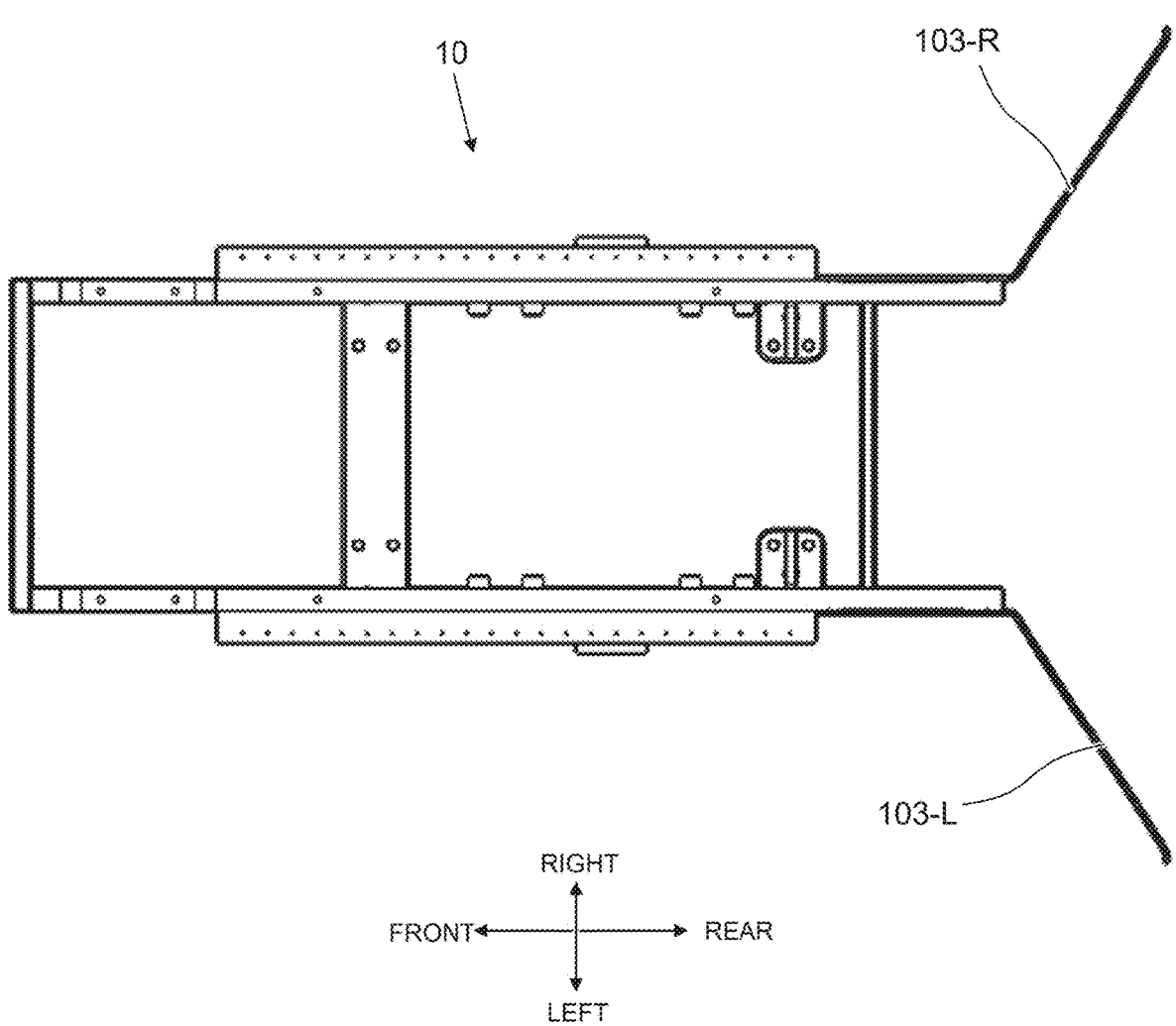
FIG. 12D shows a top view of a front frame of an electric vehicle according to a preferred embodiment of the present invention.
Figure 13:
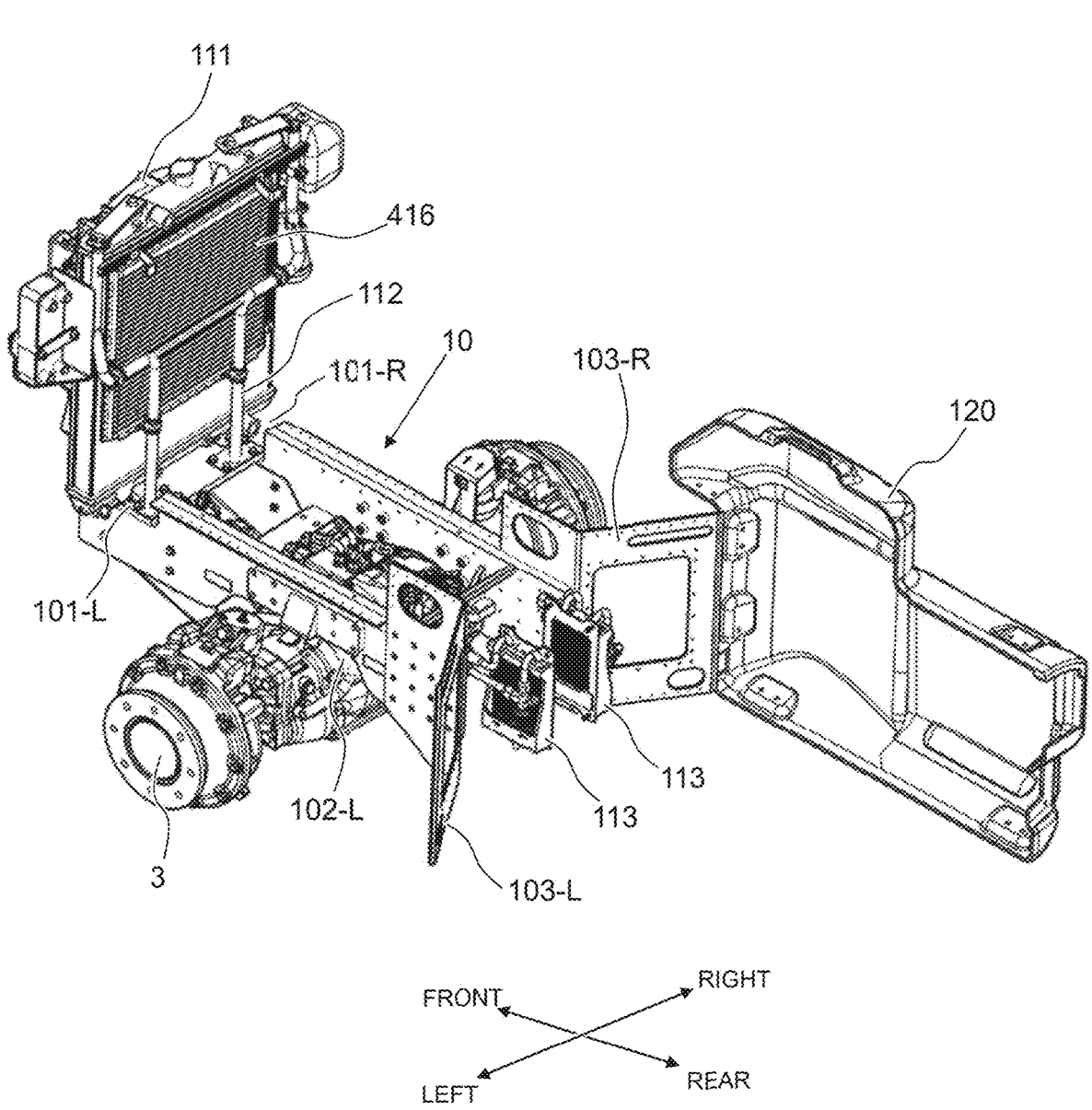
FIG. 13 shows a perspective left-rear view of a front frame of an electric vehicle and components provided with the front frame according to a preferred embodiment of the present invention.
Figure 14A:
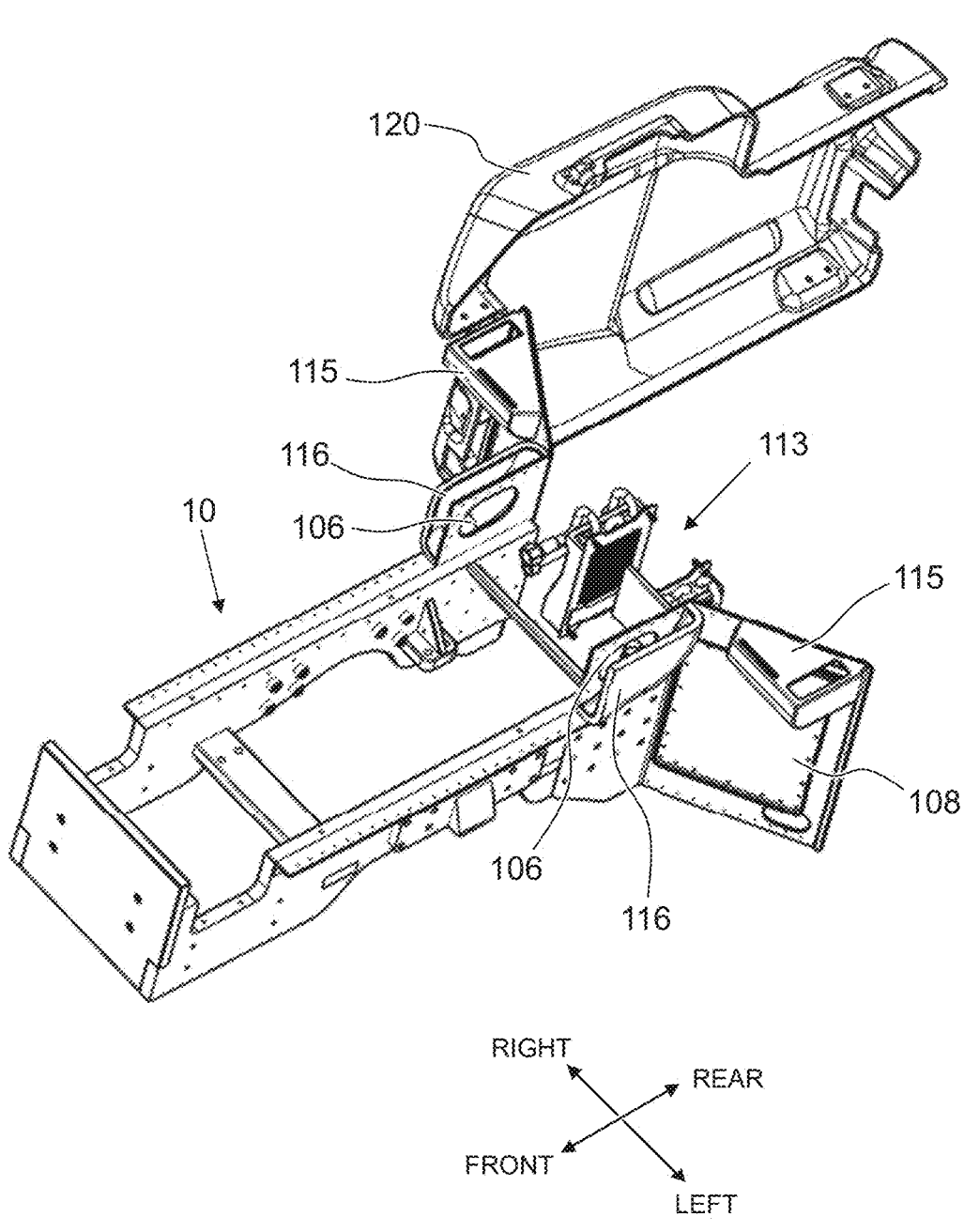
FIG. 14A shows a perspective left-front view of a front frame and air ducts of an electric vehicle according to a preferred embodiment of the present invention.
Figure 14B:
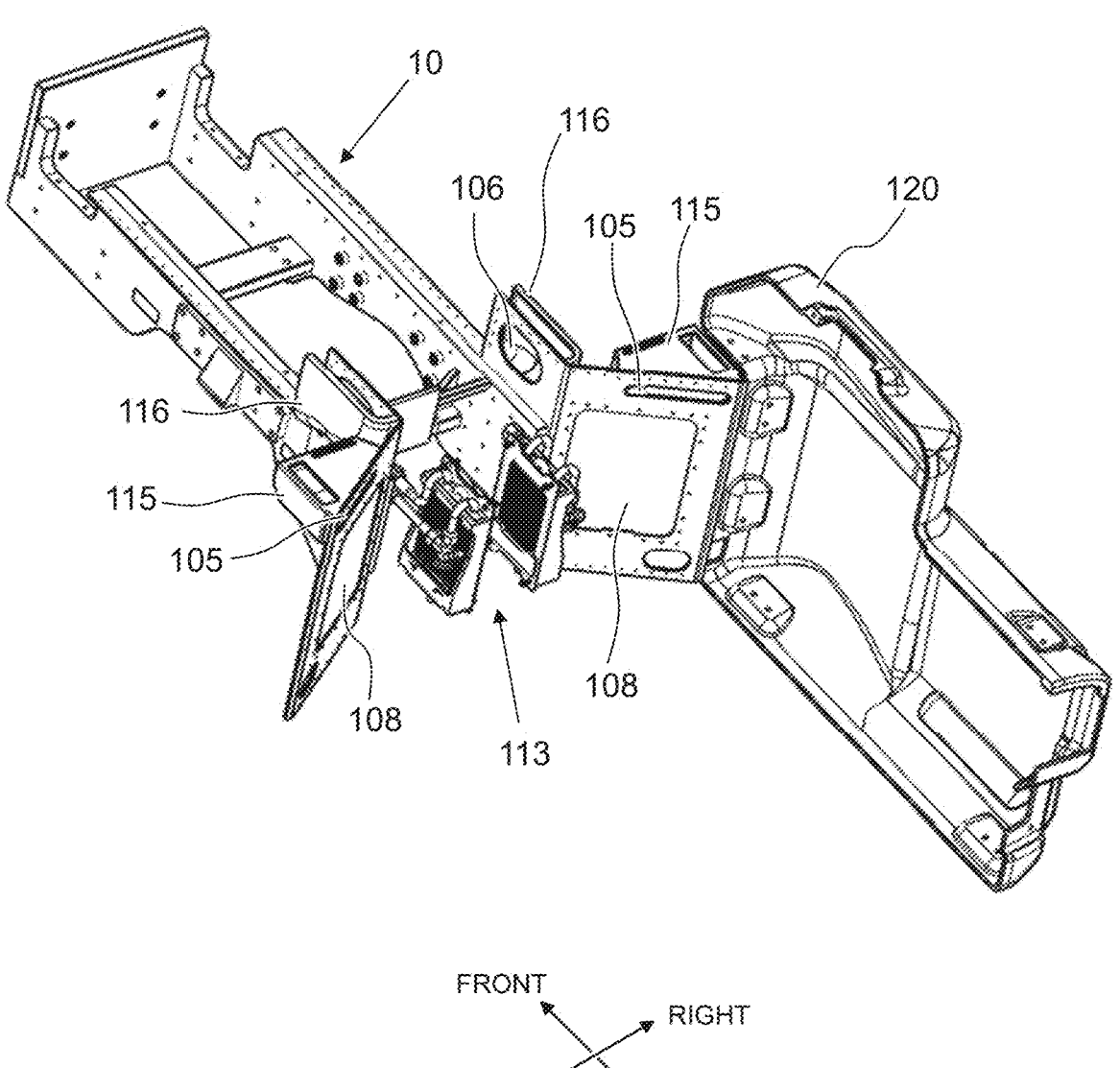
FIG. 14B shows a perspective left-rear view of a front frame and air ducts of an electric vehicle according to a preferred embodiment of the present invention.

FIG. 12A shows a left side view of the front frame 10, FIG. 12B shows a perspective left-front view of the front frame 10, FIG. 12C shows a perspective left-rear view of the front frame 10, and FIG. 12D shows a top view of the front frame 10. FIG. 13 shows a perspective left-rear view of the front frame 10 and components provided with the front frame 10. FIGS. 14A and 14B show, respectively, a perspective left-front view and a perspective left-rear view of the front frame 10 and additional components provided with the front frame 10.

In a preferred embodiment of the present invention, as shown, for example, in FIGS. 12A to 12C, the front frame 10 includes at least a first recessed portion 101, a second recessed portion 102, and a slanted portion 103.

The first recessed portion 101 includes a first recessed portion 101-R provided on a right side of the front frame 10 and a first recessed portion 101-L provided on a left side of the front frame 10, as shown in FIGS. 12B, 12C, and 13, for example. The first recessed portion 101 can receive and support one or more components of the vehicle 1, for example, a cooling structure of the vehicle 1. According to a preferred embodiment of the present invention, the first recessed portion 101 can receive a fan 111, as shown in FIG. 13, for example. The fan 111 can be mounted to the front frame 10 by one or more posts 112 that attach to the front frame 10 at the first recessed portion 101.

The second recessed portion 102 includes a second recessed portion 102-R provided on the right side of the front frame 10 and a second recessed portion 102-L provided on the left side of the front frame 10, as shown in FIGS. 12B and 12C. The second recessed portion 102 can receive one or more components of the vehicle 1. According to a preferred embodiment of the present invention, the second recessed portion 102 can receive the front axle 3, as shown in FIG. 13, and the front frame 10 can be supported by the front axle 3 at the second recessed portion 102.

The slanted portion 103 includes a slanted portion 103-R provided on the right side of the front frame 10 and a slanted portion 103-L provided on the left side of the front frame 10, as shown in FIGS. 12B to 12D and 13. The slanted portion 103 is angled away from a main body of the front frame 10. Specifically, the slanted portion 103-R provided on the right side of the front frame 10 extends in a rear-right direction of the vehicle 1, and the slanted portion 103-L provided on the left side of the front frame 10 extends in a rear-left direction of the vehicle 1.

The slanted portion 103 includes a first opening 104, a second opening 105, and a third opening 106, as shown in FIGS. 12A to 12C. The slanted portion 103 can also include a fourth opening 107.

The first opening 104 is preferably larger than each of the second opening 105, the third opening 106, and the fourth opening 107. Accordingly, the first opening 104 can provide an access point to interior components of the vehicle 1. The first opening 104 can be covered by a removable plate 108, as shown in FIGS. 14A and 14B.

The second opening 105 can define a portion of a first air channel. As shown in FIGS. 14A and 14B, the second opening 105 can communicate with a first air duct 115. The first air duct 115 can also be connected to a first opening in the battery housing 8. According to a preferred embodiment of the present invention, the first air duct 115 is mounted to the slanted portion 103, and the first air duct 115 completely covers or circumscribes the first opening 105.

The third opening 106 can define a portion of a second air channel. As shown in FIGS. 14A and 14B, the third opening 106 can communicate with a second air duct 116. The second air duct 116 can also be connected to a second opening in the battery housing 8. According to a preferred embodiment of the present invention, the second air duct 116 completely covers or circumscribes the third opening 106.

The fourth opening 107 can permit the passage of cables, coolant lines, refrigerant lines, oil lines, and the like. According to a preferred embodiment of the present invention, one or more high voltage cables can pass through the fourth opening 107.

In a preferred embodiment of the present invention, as shown, for example, in FIGS. 13, 14A, and 14B, one or more center evaporators 113 can be at least partially housed within the front frame 10. The center evaporators 113 can be located directly between the slanted portion 103-R provided on the right side of the front frame 10 and the slanted portion 103-L provided on the left side of the front frame 10.

In a preferred embodiment of the present invention, as shown, for example, in FIGS. 1A to 1D, 1F, 1G, 13, 14A, and 14B, the vehicle 1 can include one or more side housings 120. As shown in FIGS. 13, 14A, and 14B, the side housing 120 can be located adjacent to, or directly connected with, the slanted portion 103 of the front frame 10. Although FIGS. 13, 14A, and 14B only show a single side housing 120 provided with the slanted portion 103-R on the right side of the front frame 10, a further side housing 120 can similarly be provided with the slanted portion 103-L on the left side of the front frame 10. According to a preferred embodiment of the present invention as shown, for example, in FIGS. 14A and 14B, the first air duct 115 can be located adjacent to, or directly connected with, the side housing 120.

In a preferred embodiment of the present invention, as shown, for example, in FIGS. 4, 5A, 5B, 6A and 6B, the battery housing 8 at least partially surrounds the front frame 10. More specifically, the third battery housing portion 30, the fourth battery housing portion 32, and the fifth battery housing portion 34 can each be located above the front frame 10, and the fifth battery housing portion 34 can be mounted to an upper portion of the front frame 10. Each of the first battery housing portion 26 and the second battery housing portion 28 can be located at a rear portion of the front frame 10, in particular, rearward of the slanted portion 103 of the front frame 10. Each of the first battery housing portion 26 and the second battery housing portion 28 can be connected with the slanted portion 103 of the front frame 10. An outer edge of each of the first battery housing portion 26 and the second battery housing portion 28 can be aligned with an outer edge of the slanted portion 103 of the front frame 10.

Figure 15A:
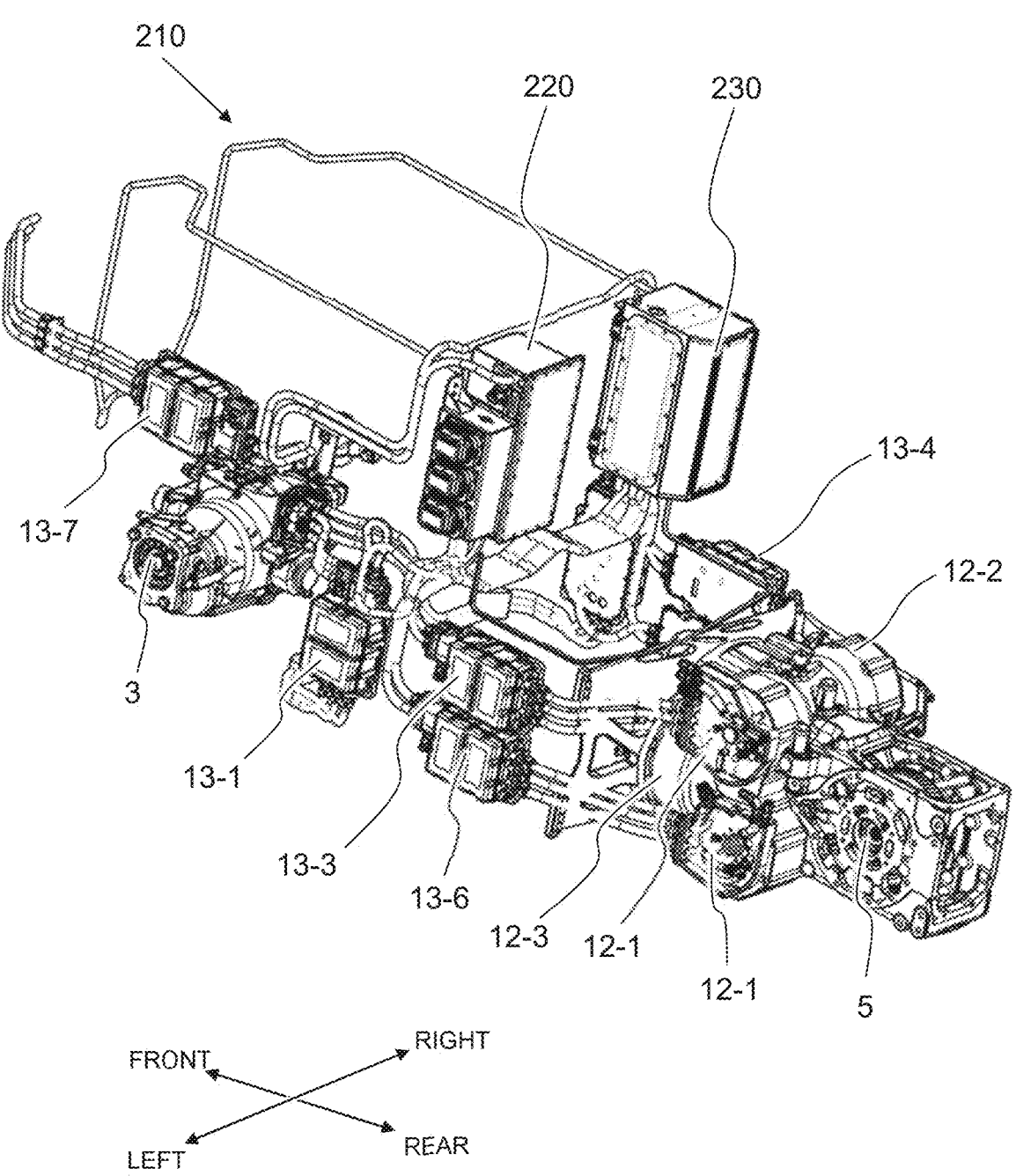
FIG. 15A shows a perspective left-rear view of a wiring harness of an electric vehicle according to a preferred embodiment of the present invention.
Figure 15B:
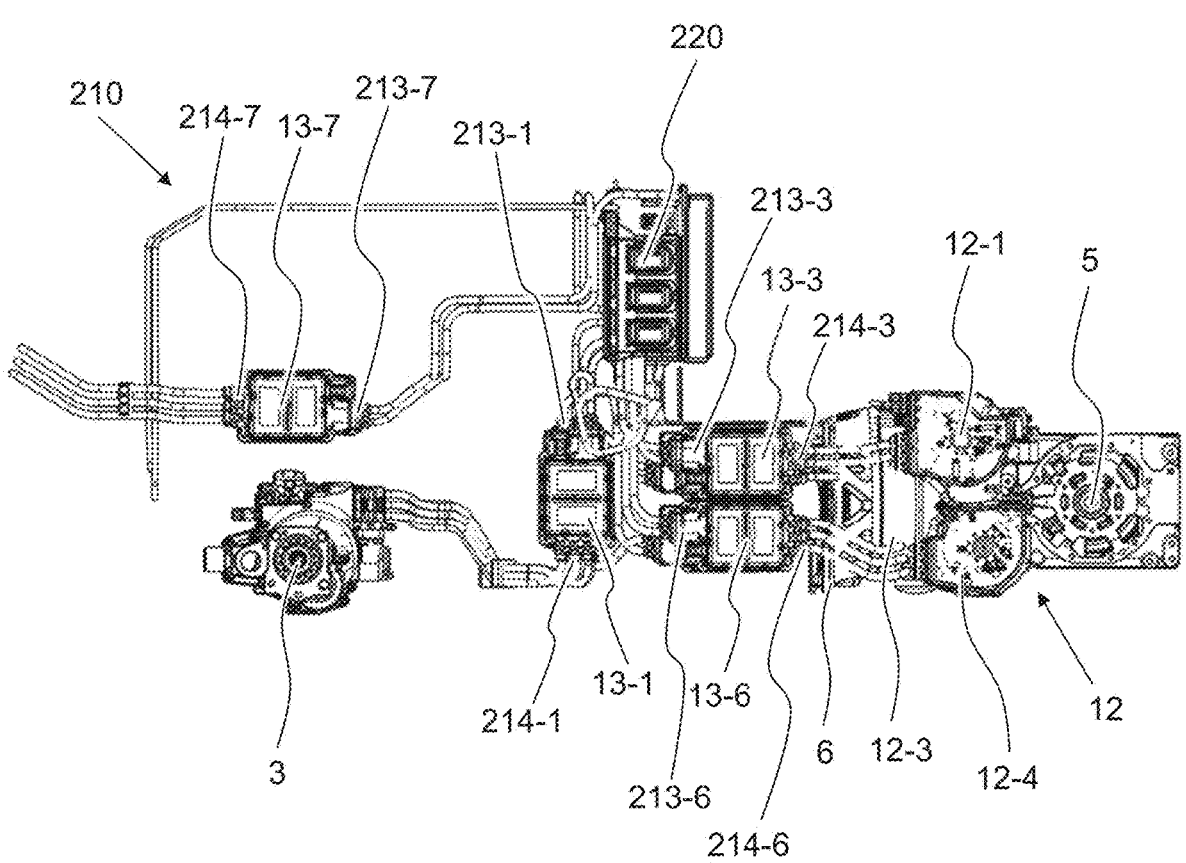
FIG. 15B shows a left side view of a wiring harness of an electric vehicle according to a preferred embodiment of the present invention.
Figure 15C:
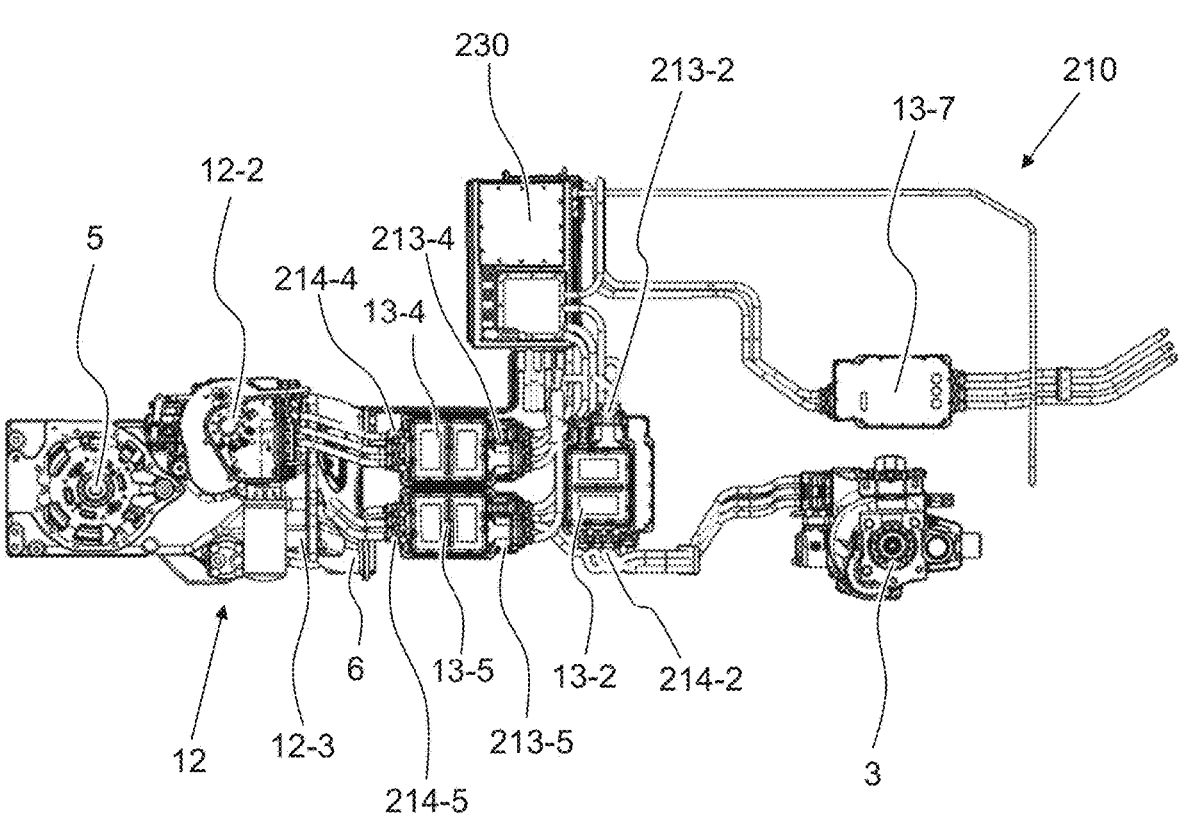
FIG. 15C shows a right side view of a wiring harness of an electric vehicle according to a preferred embodiment of the present invention.
Figure 15D:
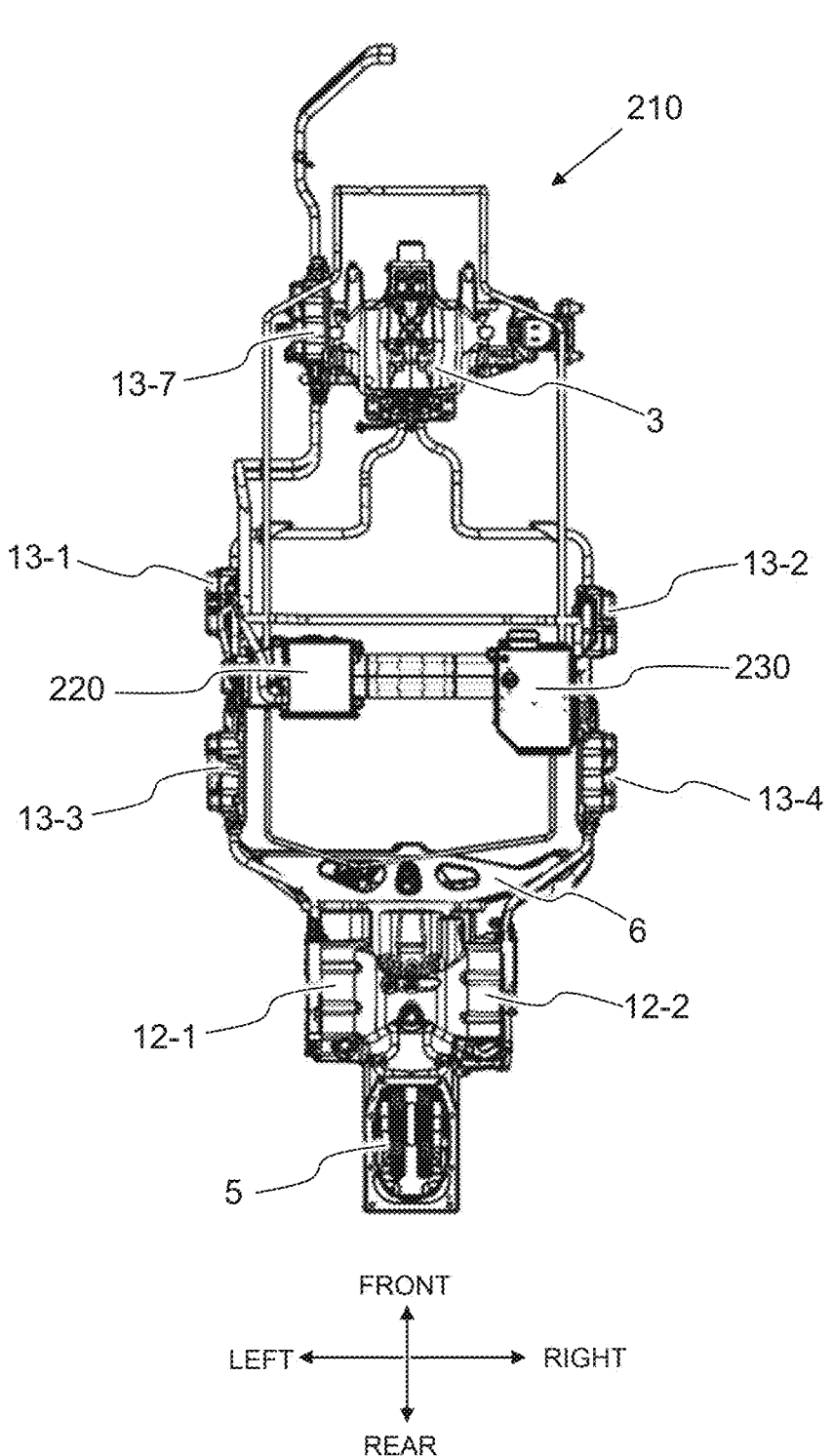
FIG. 15D shows a top view of a wiring harness of an electric vehicle according to a preferred embodiment of the present invention.

FIG. 15A shows a perspective left-rear view of a wiring harness 210 of the vehicle 1. FIGS. 15B and 15C show left and right side views of the wiring harness 210, and FIG. 15D shows a top view of the wiring harness 210.

According to a preferred embodiment of the present invention, as shown, for example, in FIGS. 15A to 15D, the vehicle 1 can include a wiring harness 210 to provide electrical power distribution paths to and from each of the inverters 13. The wiring harness 210 can include an input 213 and an output 214 for each of the inverters 13.

According to a preferred embodiment of the present invention, as shown, for example, in FIGS. 15A to 15D, the vehicle 1 can include at least one power distribution unit (PDU). According to a preferred embodiment of the present invention, the vehicle 1 can include a first PDU 220 (e.g., a positive PDU) and a second PDU 230 (e.g., a negative PDU). Each of the first PDU 220 and the second PDU 230 can be connected to each of the inverters 13 by the wiring harness 210.

According to a preferred embodiment of the present invention, as shown, for example, in FIG. 15B, the first inverter 13-1 can include an input 213-1 to receive power from the first PDU 220 and/or the second PDU 230. The first inverter 13-1 can also include an output 214-1 to output power to the first electric motor 14, which is housed in the left axle housing 3L.

According to a preferred embodiment of the present invention, as shown, for example, in FIG. 15C, the second inverter 13-2 can include an input 213-2 to receive power from the first PDU 220 and/or the second PDU 230. The second inverter 13-2 can also include an output 214-2 to output power to the second electric motor 16, which is housed in the right axle housing 3R.

According to a preferred embodiment of the present invention, as shown, for example, in FIG. 15B, the third inverter 13-3 can include an input 213-3 to receive power from the first PDU 220 and/or the second PDU 230. The third inverter 13-3 can also include an output 214-3 to output power to the third electric motor 18, which is housed in the first motor housing portion 12-1.

According to a preferred embodiment of the present invention, as shown, for example, in FIG. 15C, the fourth inverter 13-4 can include an input 213-4 to receive power from the first PDU 220 and/or the second PDU 230. The fourth inverter 13-4 can also include an output 214-4 to output power to fourth electric motor 20, which is housed in the second motor housing portion 12-2.

According to a preferred embodiment of the present invention, as shown, for example, in FIG. 15C, the fifth inverter 13-5 can include an input 213-5 to receive power from the first PDU 220 and/or the second PDU 230. The fifth inverter 13-5 can also include an output 214-5 to output power to the fifth electric motor 22, which is housed in the third motor housing portion 12-3.

According to a preferred embodiment of the present invention, as shown, for example, in FIG. 15B, the sixth inverter 13-6 can include an input 213-6 to receive power from the first PDU 220 and/or the second PDU 230. The sixth inverter 13-6 can also include an output 214-6 to output power to the sixth electric motor 24, which is housed in the fourth motor housing portion 12-4.

According to a preferred embodiment of the present invention, as shown, for example, in FIG. 15B, the seventh inverter 13-7 can include an input 213-7 to receive power from the first PDU 220 and/or the second PDU 230. The seventh inverter 13-7 can also include an output 214-7 to output power to a cooling structure, for example, the fan 111 shown in FIG. 13.

Figure 16A:
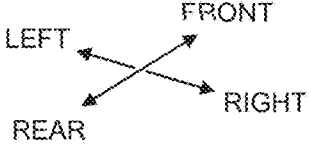
FIG. 16A shows a perspective right-rear view of an electric vehicle including a battery bracket according to a preferred embodiment of the present invention.
Figure 16B:
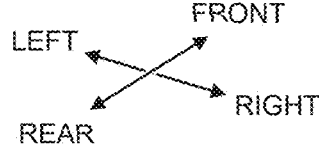
FIG. 16B shows a perspective right-rear view of an electric vehicle including a battery bracket according to a preferred embodiment of the present invention in which certain elements have been removed for illustrative purposes.
Figure 16C:
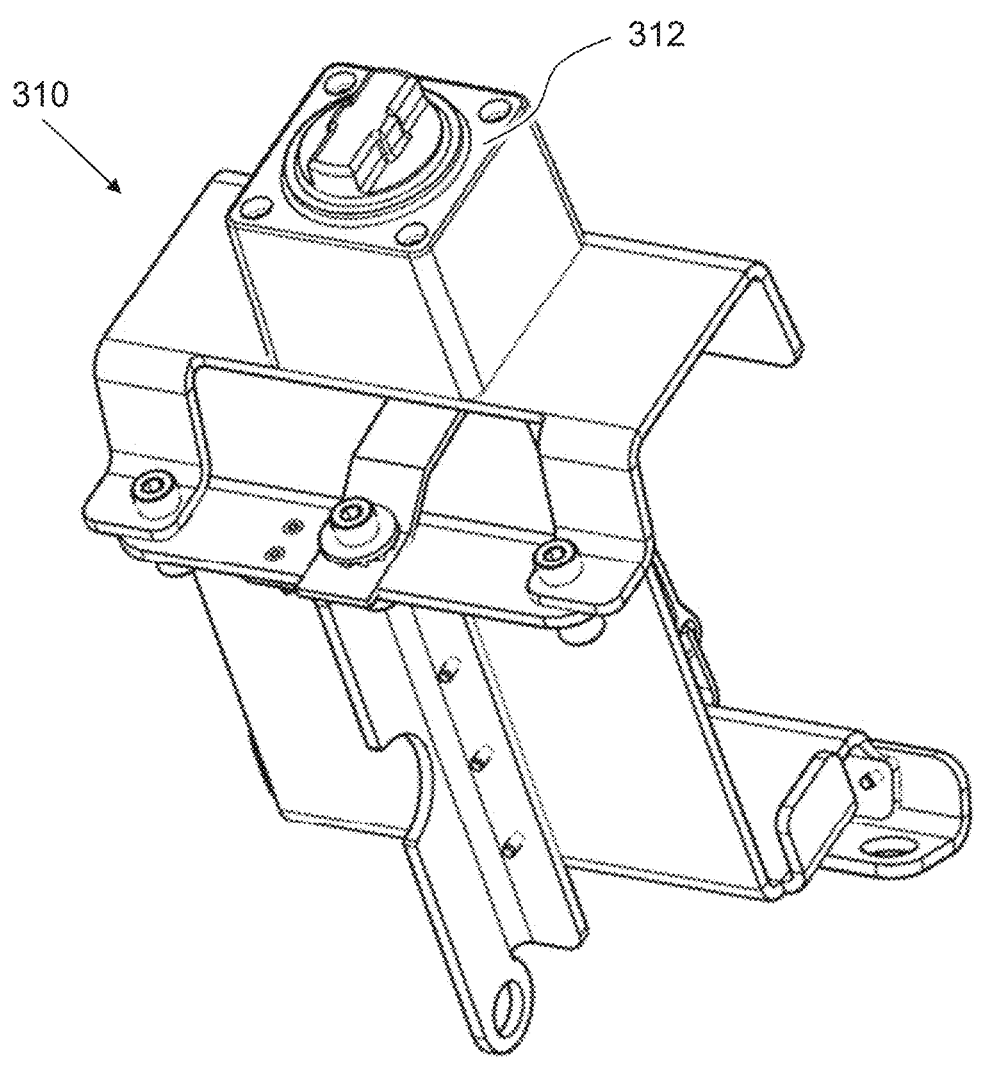
FIG. 16C shows a perspective right-rear view of a battery bracket according to a preferred embodiment of the present invention.
Figure 16C:
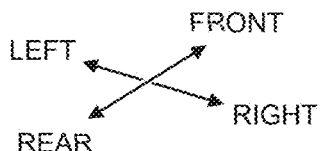

FIG. 16A shows a perspective right-rear view of a battery bracket 310 included in the vehicle 1. FIG. 16B is an enlarged view of FIG. 16A, and certain elements have been removed from FIG. 16B for illustrative purposes. FIG. 16C shows a perspective right-rear view of the battery bracket 310.

According to a preferred embodiment of the present invention, as shown, for example, in FIGS. 16A and 16B, the battery bracket 310 can be located behind a seat 320 of the vehicle 1. According to a preferred embodiment of the present invention, as shown, for example, in FIG. 16C, a disconnect switch 312 can be provided with the battery bracket 310 to provide easy disconnection of a battery housed by the battery bracket 310.

According to a preferred embodiment of the present invention, as shown, for example, in FIG. 16B, the vehicle 1 can include a further battery 315 (shown by dashed lines) that is mounted in the vehicle by the battery bracket 310. That is, battery bracket 310 can hold and secure the further battery 315. Accordingly, the vehicle 1 can include a battery that is not housed by the battery housing 8. The further battery 315 can be, for example, a 12 V battery.

According to a preferred embodiment of the present invention, as shown, for example, in FIGS. 16A and 16B, the vehicle 1 can include one or more control levers 330. The one or more control levers 330 can include a hydraulic control lever, for example. As shown in FIGS. 16A and 16B, the one or more control levers 330 can be located at a right side of the vehicle 1, that is, at a right side of the seat 320. Accordingly, the one or more control levers 330 can be provided at a same side of the vehicle 1 as the second inverter 13-2, the fourth inverter 13-4, and the fifth inverter 13-5.

Figure 17A:
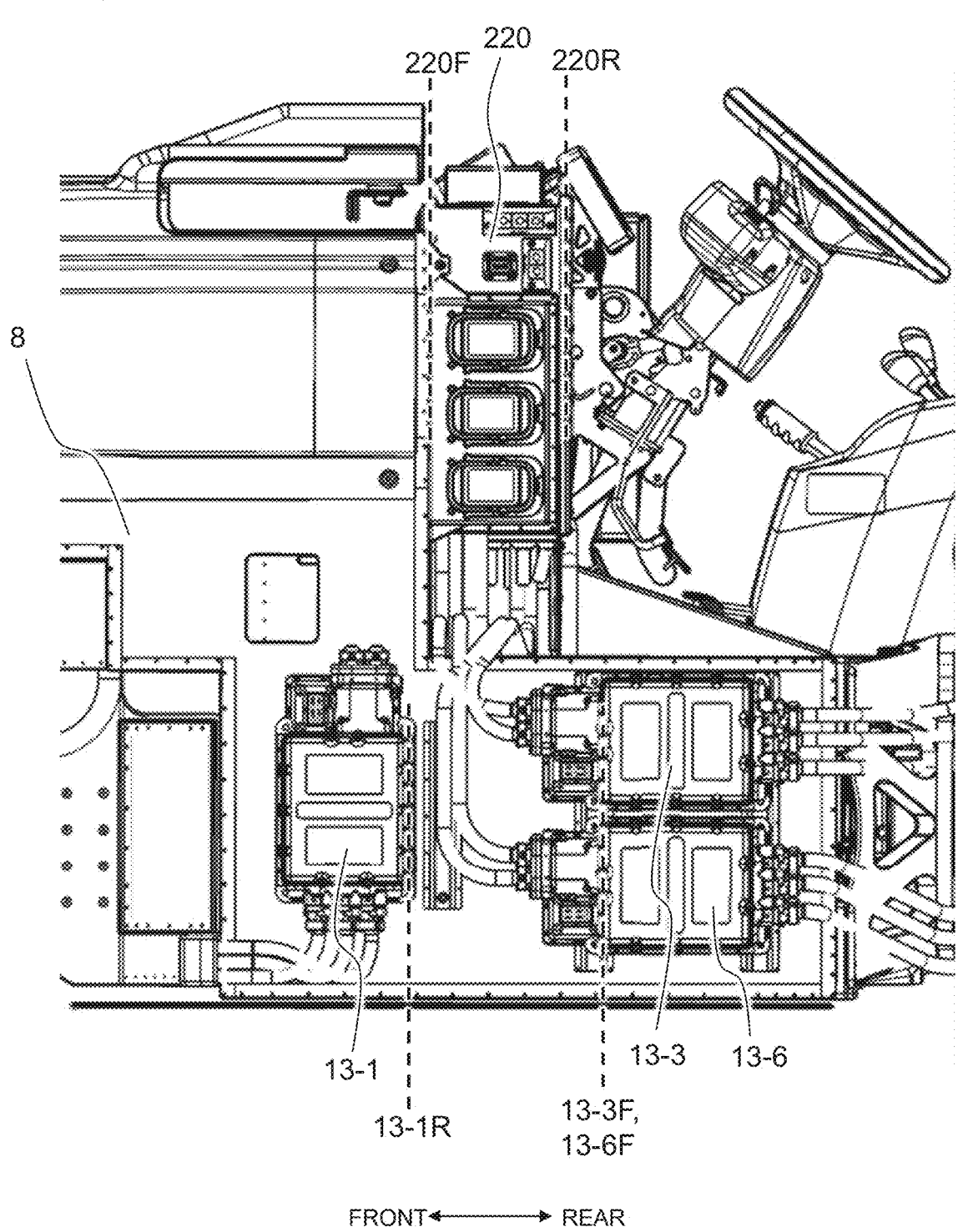
FIG. 17A shows a left side view of an electric vehicle including a power distribution unit according to a preferred embodiment of the present invention.
Figure 17B:
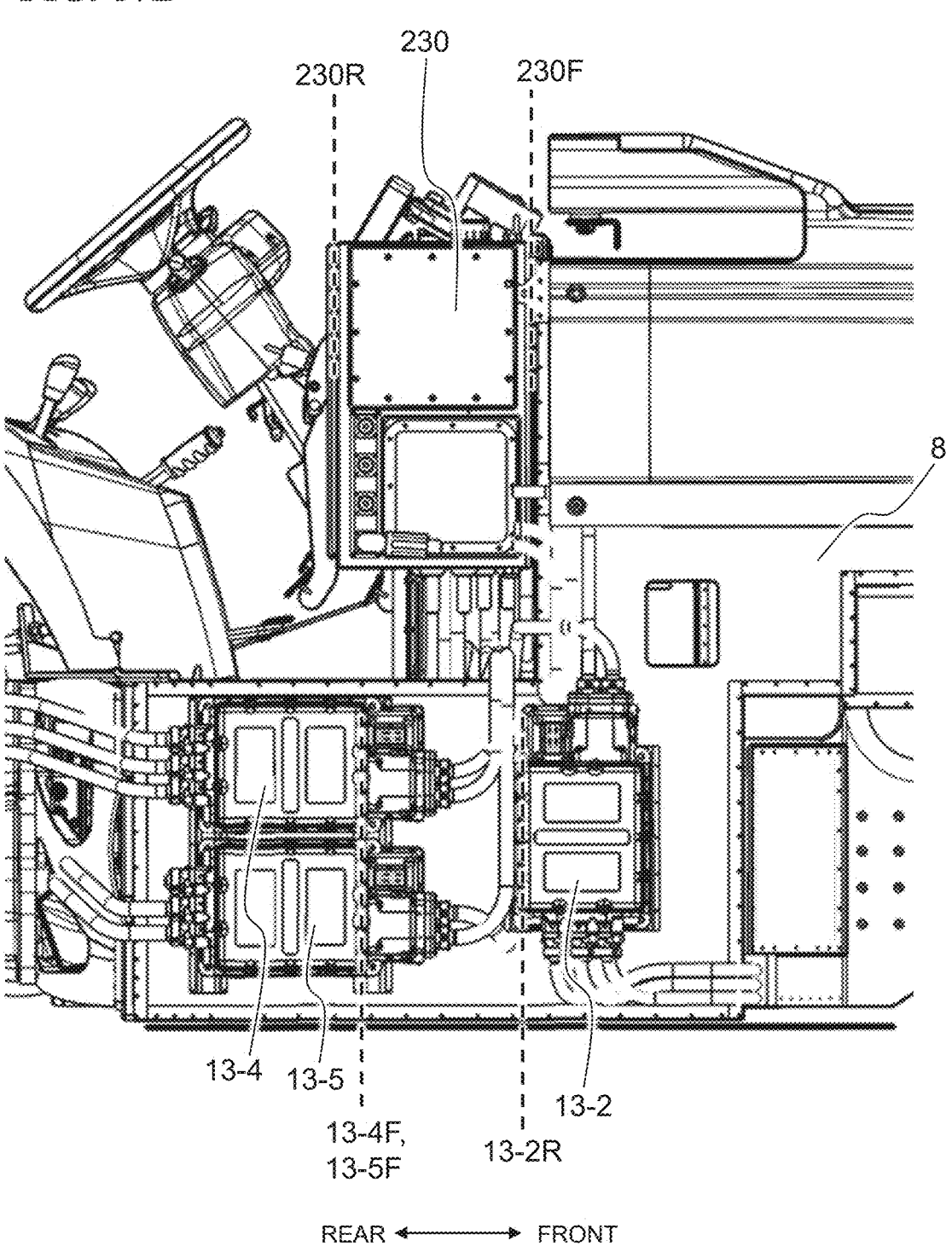
FIG. 17B shows a right side view of an electric vehicle including a power distribution unit according to a preferred embodiment of the present invention.

FIG. 17A shows a left side view of a location of the first PDU 220 according to a preferred embodiment of the present invention. FIG. 17B shows a right side view of a location of the second PDU 230 according to a preferred embodiment of the present invention.

According to a preferred embodiment of the present invention, as shown, for example, in FIG. 17A, a foremost surface 220F of the first PDU 220 can be located rearward of the rearmost surface 13-1R of the first inverter 13-1. In addition, a rearmost surface 220R of the first PDU 220 can be located forward of a foremost surface 13-3F of the third inverter 13-3 and a foremost surface 13-6F of the sixth inverter 13-6. Accordingly, the first PDU 220 can be located so as to not overlap, in a vertical direction, any of the inverters 13.

According to a preferred embodiment of the present invention, as shown, for example, in FIG. 17B, a foremost surface 230F of the second PDU 230 can be located forward of the rearmost surface 13-2R of the second inverter 13-2. In addition, a rearmost surface 230R of the second PDU 230 can be located forward of the foremost surface 13-4F of the fourth inverter 13-4 and a foremost surface 13-5F of the fifth inverter 13-5. Accordingly, the second PDU 230 can be located so at to partially overlap, in a vertical direction, one or more of the inverters 13.

According to a preferred embodiment of the present invention, the first PDU 220 can be a negative PDU, and the second PDU 230 can be a positive PDU. Each of the first PDU 220 and the second PDU 230 can be located at a rear portion of the battery housing 8. In particular, the first PDU 220 can be located at a rear surface of the third battery housing portion 30, and the second PDU 230 can be located at a rear surface of the fourth battery portion 32.

Figure 18A:
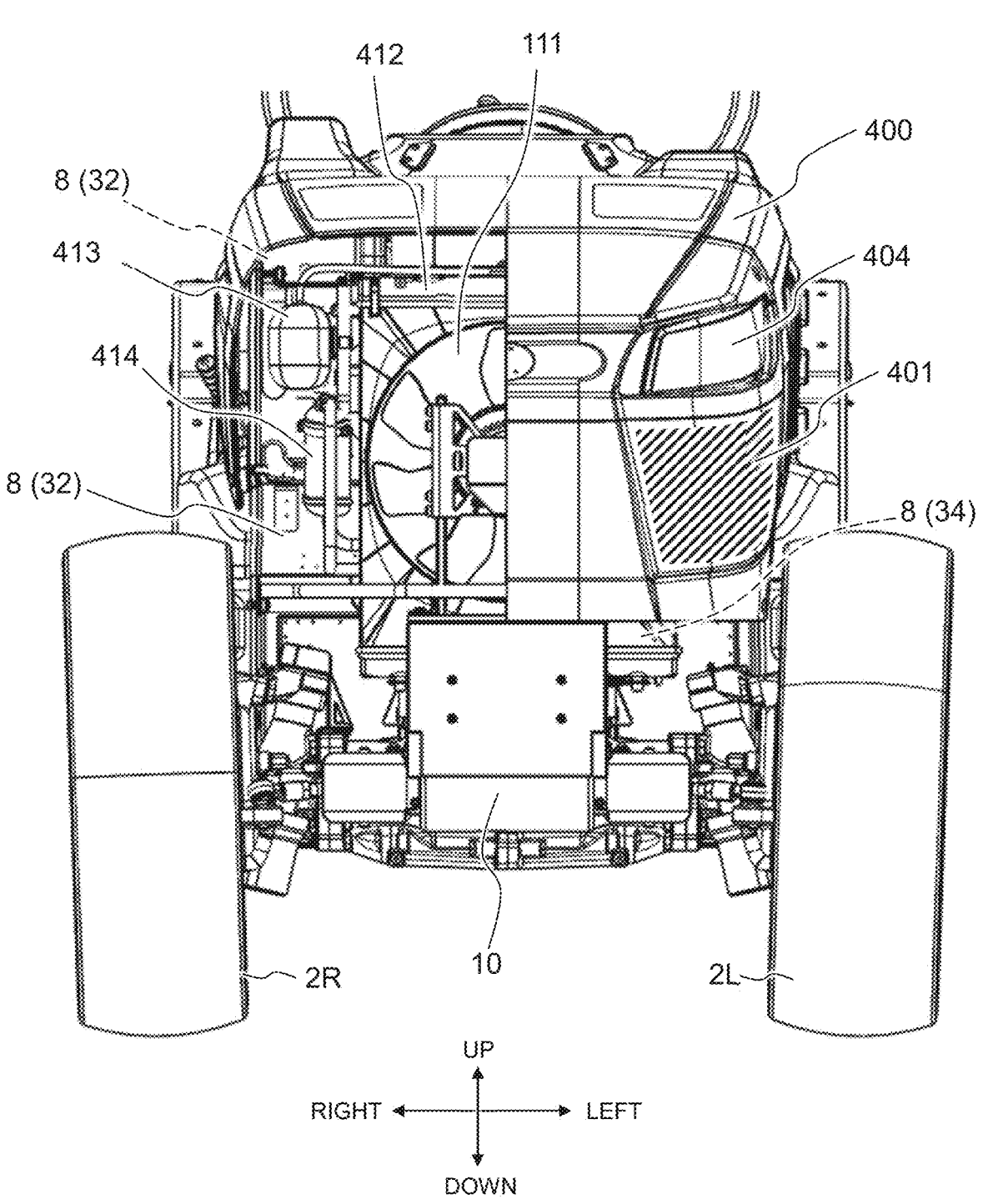
FIG. 18A shows a front view of an electric vehicle according to a preferred embodiment of the present invention with an outer cover partially removed.
Figure 18B:
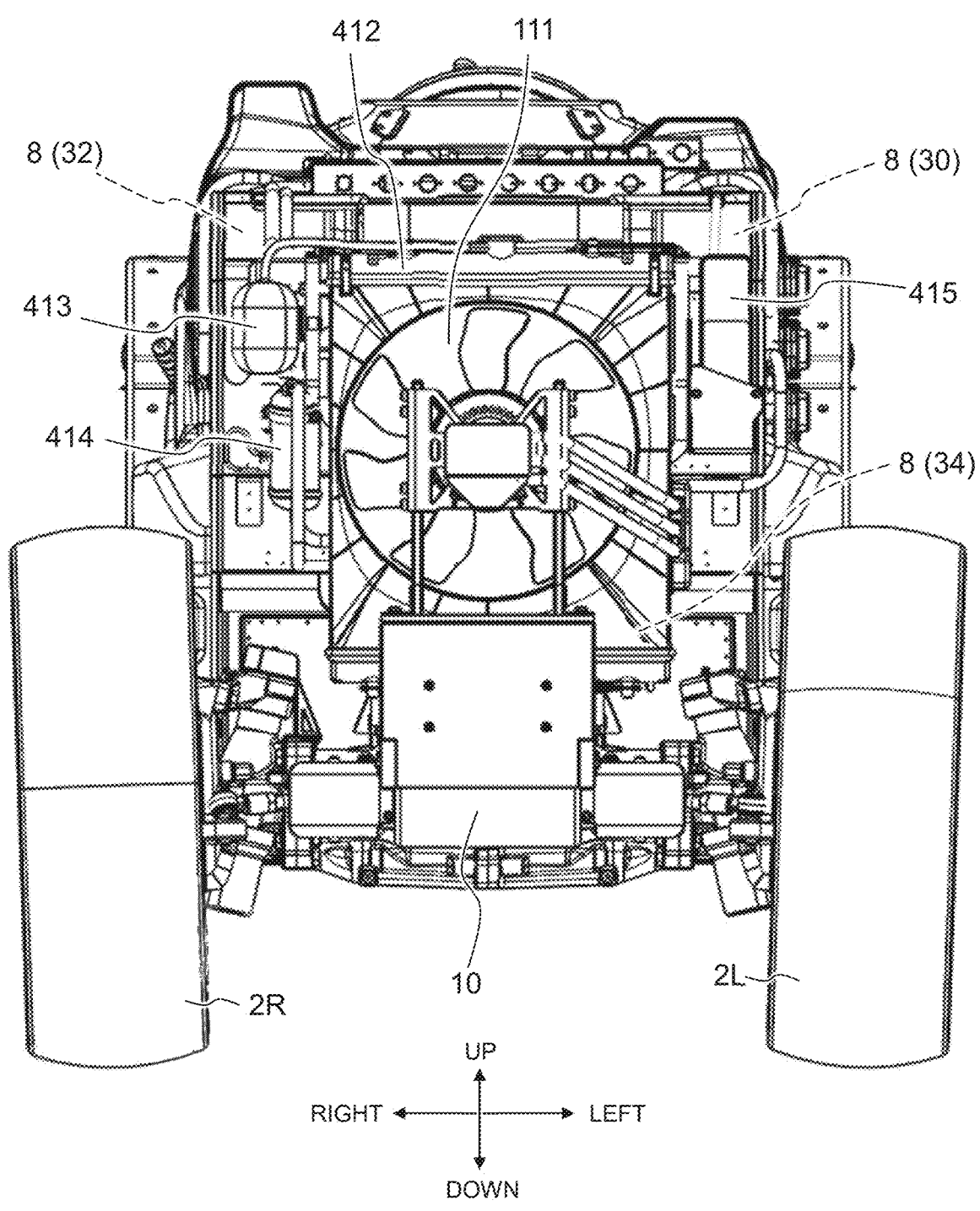
FIG. 18B shows a front view of an electric vehicle according to a preferred embodiment of the present invention with an outer cover completely removed.
Figure 18C:
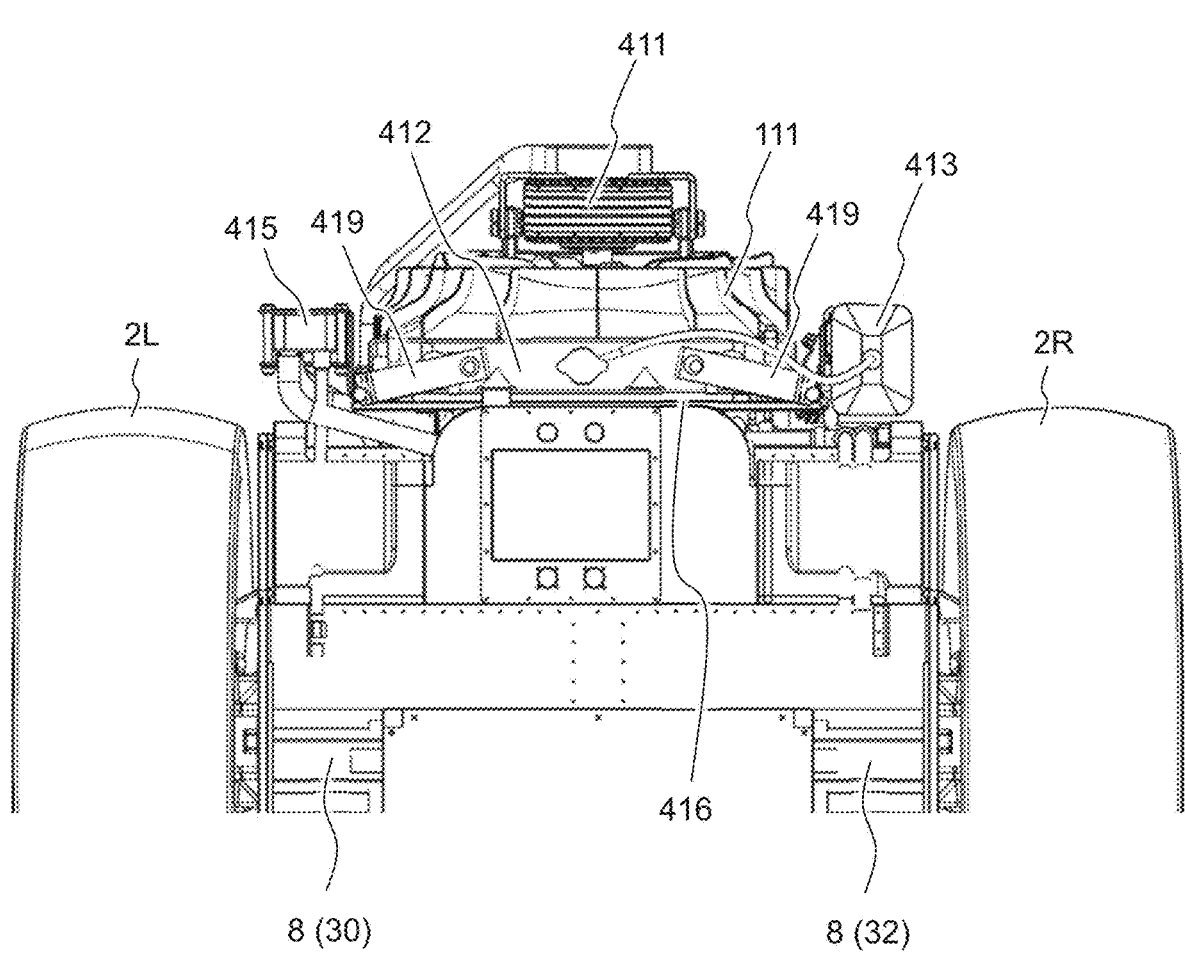
FIG. 18C shows a top view of an electric vehicle according to a preferred embodiment of the present invention with an outer cover completely removed.
Figure 18C:
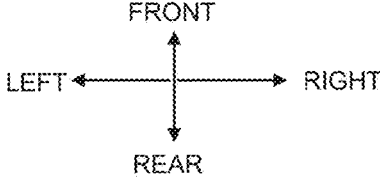

FIG. 18A shows a front view of the vehicle 1 with an outer cover 400 partially removed. FIGS. 18B and 18C show front and top views of the vehicle 1 with the outer cover 400 completely removed.

According to a preferred embodiment of the present invention, as shown, for example, in FIG. 18A, the vehicle 1 can include an outer cover 400. The outer cover 400 can define a hood or bonnet of the vehicle 1.

According to a preferred embodiment of the present invention, as shown, for example, in FIGS. 18A to 18C, the vehicle 1 can include cooling components that are mounted at a front surface of the battery housing 8. In particular, the cooling components can be mounted at a front surface of at least one of the third battery housing portion 30, the fourth battery housing portion 32, and the fifth battery housing portion 34 of the battery housing 8. The cooling components can be mounted to the battery housing 8 by one or more mounting brackets 419, as shown in FIG. 18C. Alternatively or in addition, the cooling components can be mounted to the front frame 10 by the one or more posts 112 that attach to the front frame 10 at the first recessed portion 101, as shown in FIG. 13.

The cooling components can include air cooling components and liquid cooling components. The air cooling components can include the fan 111, a drier 414, and a condenser 416. The liquid cooling components can include a radiator 412, a surge tank 413, and a heat exchanger 415. As shown in FIG. 18C, a fan motor 411 can be mounted at a front surface of the fan 111, and the fan motor 411 can receive electric power from the seventh inverter 13-7. The fan 111 can be, for example, a radiator/condenser fan. The heat exchanger 415 can be, for example, an oil heat exchanger/cooler.

According to a preferred embodiment of the present invention, as shown, for example, in FIG. 18C, the fan 111 is located forward of the radiator 412 in the front-rear direction of the vehicle 1. According to a preferred embodiment of the present invention, as shown, for example, in FIG. 18C, the radiator 412 is located forward of the condenser 416 in the front-rear direction of the vehicle 1.

Figure 19A:
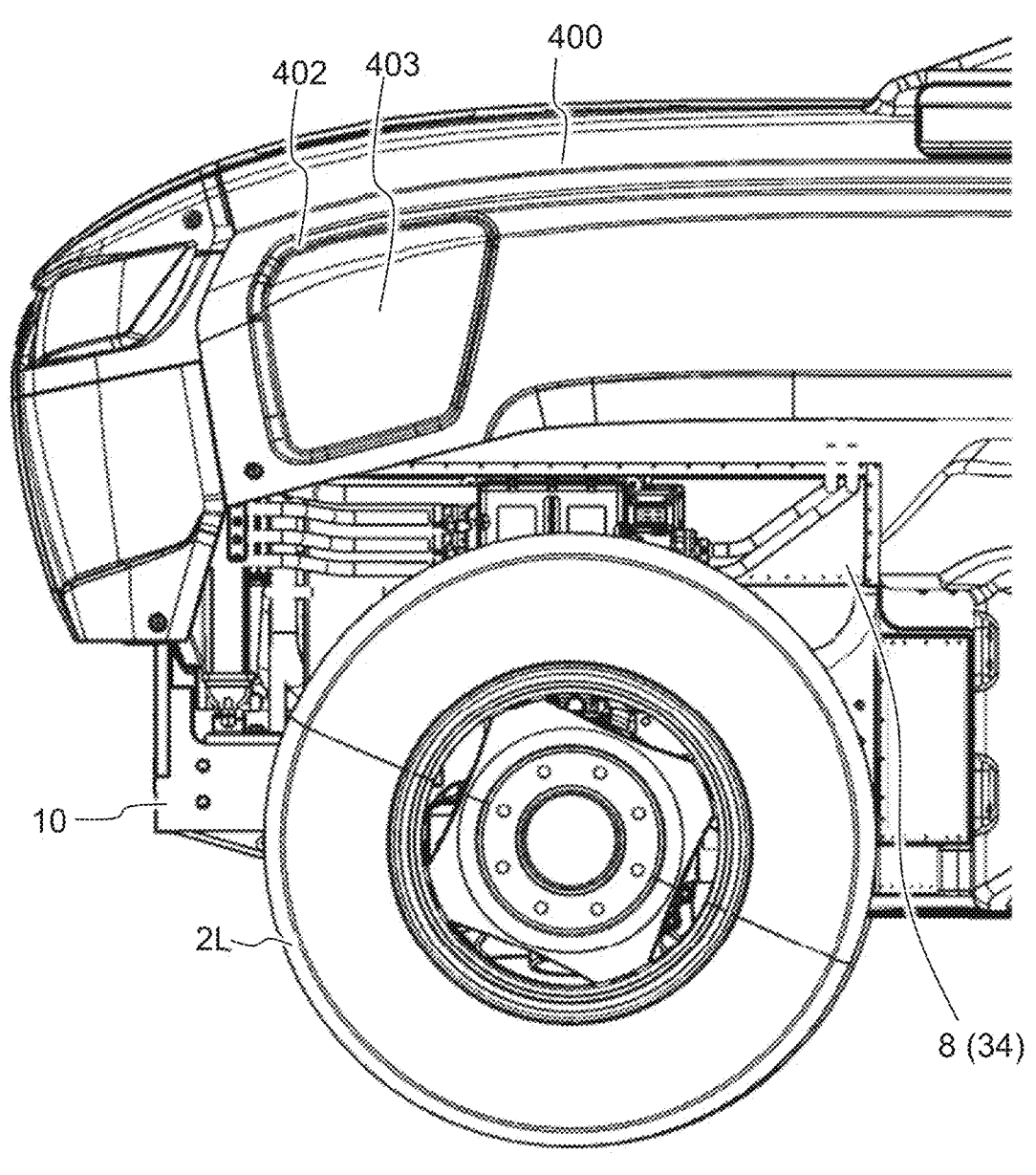
FIG. 19A shows a left side view of an electric vehicle including a side opening with a cover according to a preferred embodiment of the present invention.
Figure 19B:
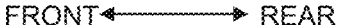
FIG. 19B shows a left side view of an electric vehicle including a side opening with a cover removed according to a preferred embodiment of the present invention.

FIGS. 19A and 19B show a left side view of a side opening 402 of the vehicle 1.

According to a preferred embodiment of the present invention, for example, as shown in FIGS. 19A and 19B, at least one side opening 402 can be provided in the outer cover 400. For example, a side opening 402 can be provided at each of a left side and a right side of the outer cover 400.

According to a preferred embodiment of the present invention, for example, as shown in FIG. 19A, the side opening 402 can be covered by the opening cover 403. According to a preferred embodiment of the present invention, the opening cover 403 is structured to permit air to flow through the side opening 402. The opening cover 403 can be, for example, a mesh panel.

The opening cover 403 is not shown in FIG. 19B for illustrative purposes. According to a preferred embodiment of the present invention, for example, as shown in FIG. 19B, a foremost edge 402F of the side opening 402 can be located forward of a foremost surface 8F of the battery housing 8. The foremost surface 8F of the battery housing can be defined by a foremost surface of the third battery housing portion 30 and/or a foremost surface of the fourth battery housing portion 32.

According to a preferred embodiment of the present invention, the side opening 402 can provide an inlet path for air to the cooling components, such as the fan 111, the radiator 412, and the condenser 416.

According to a preferred embodiment of the present invention, the vehicle 1 can also include one or more front openings provided in a front surface of the outer cover 400. The one or more front openings can provide an outlet path for air from the cooling components, such as the fan 111, the radiator 412, and the condenser 416. The one or more front openings can be provided only at the front surface of the outer cover 400 or may partially extend onto side surface(s) of the outer cover 400. According to a preferred embodiment of the present invention, for example, as shown in FIGS. 1E and 18A, front openings 401 can be provided below headlights 404 of the vehicle 1.

According to a preferred embodiment of the present invention, as shown, for example, in FIGS. 2 to 4, the third battery housing portion 30 and the fourth battery housing portion 32 are adjacent to each other in a width direction of the vehicle 1, and the fifth battery housing portion 34 is located below the third battery housing portion 30 and the fourth battery housing portion 32. Accordingly, an upper portion of the battery housing 8 (including the third battery housing portion 30 and the fourth battery housing portion 32) can overlap and extend beyond a lower portion of the battery housing 8 (including the fifth battery housing portion 34) in the width direction of the vehicle 1. That is, the battery housing 8 can be provided in a "T" shape with void spaces located at side surfaces of the fifth battery housing portion 34. These void spaces can at least partially overlap, in a front view of the vehicle 1, with one or more cooling components such as the fan 111, the radiator 412, and the condenser 416. Furthermore, these void spaces can be located adjacent to the openings 402 in the outer cover 400, and these void spaces can be aligned with further opening(s) provided at a front surface of the outer cover 400.

Figure 20A:
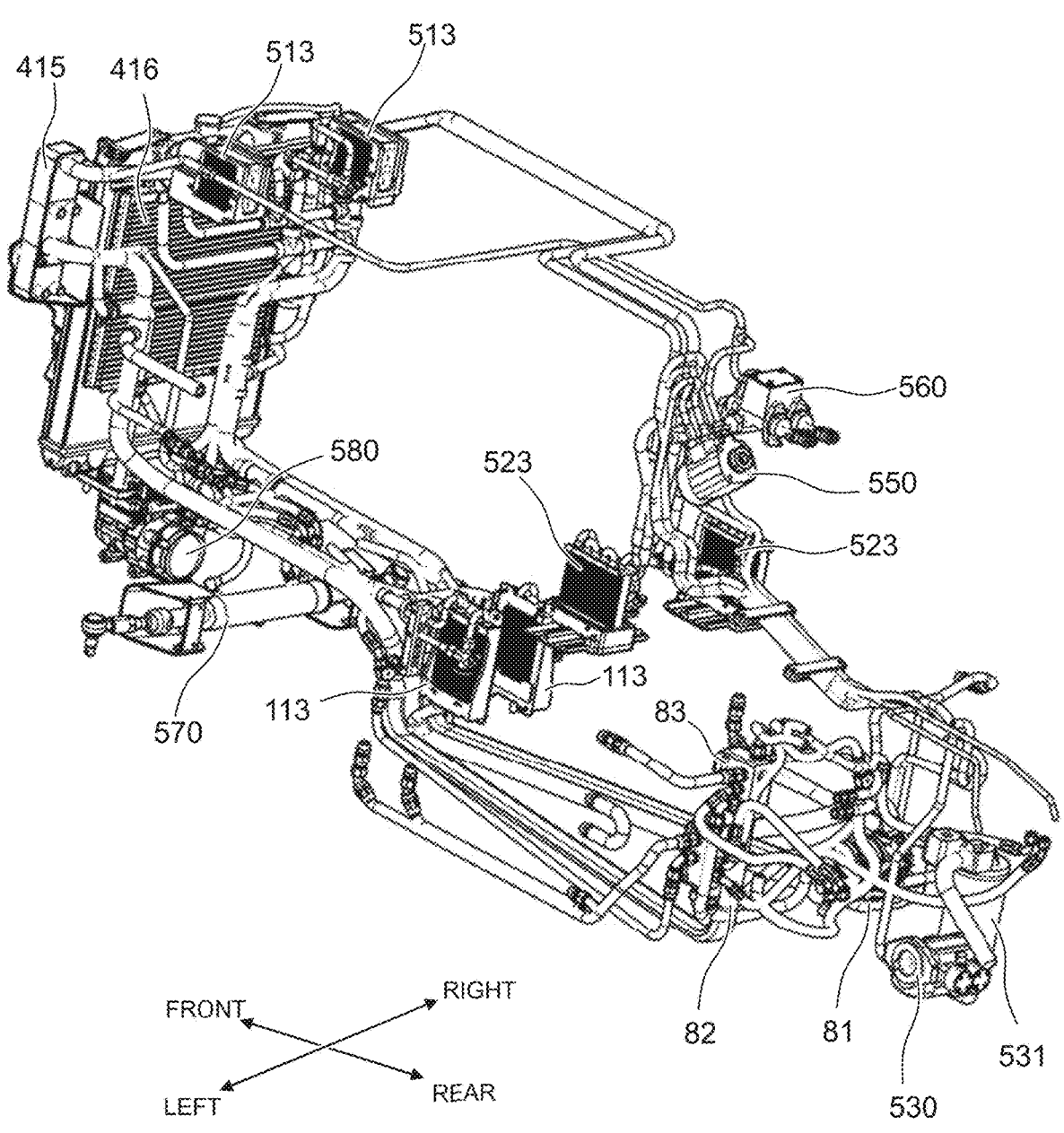
FIG. 20A shows a perspective left-rear view of cooling and hydraulic paths of an electric vehicle according to a preferred embodiment of the present invention.
Figure 20B:
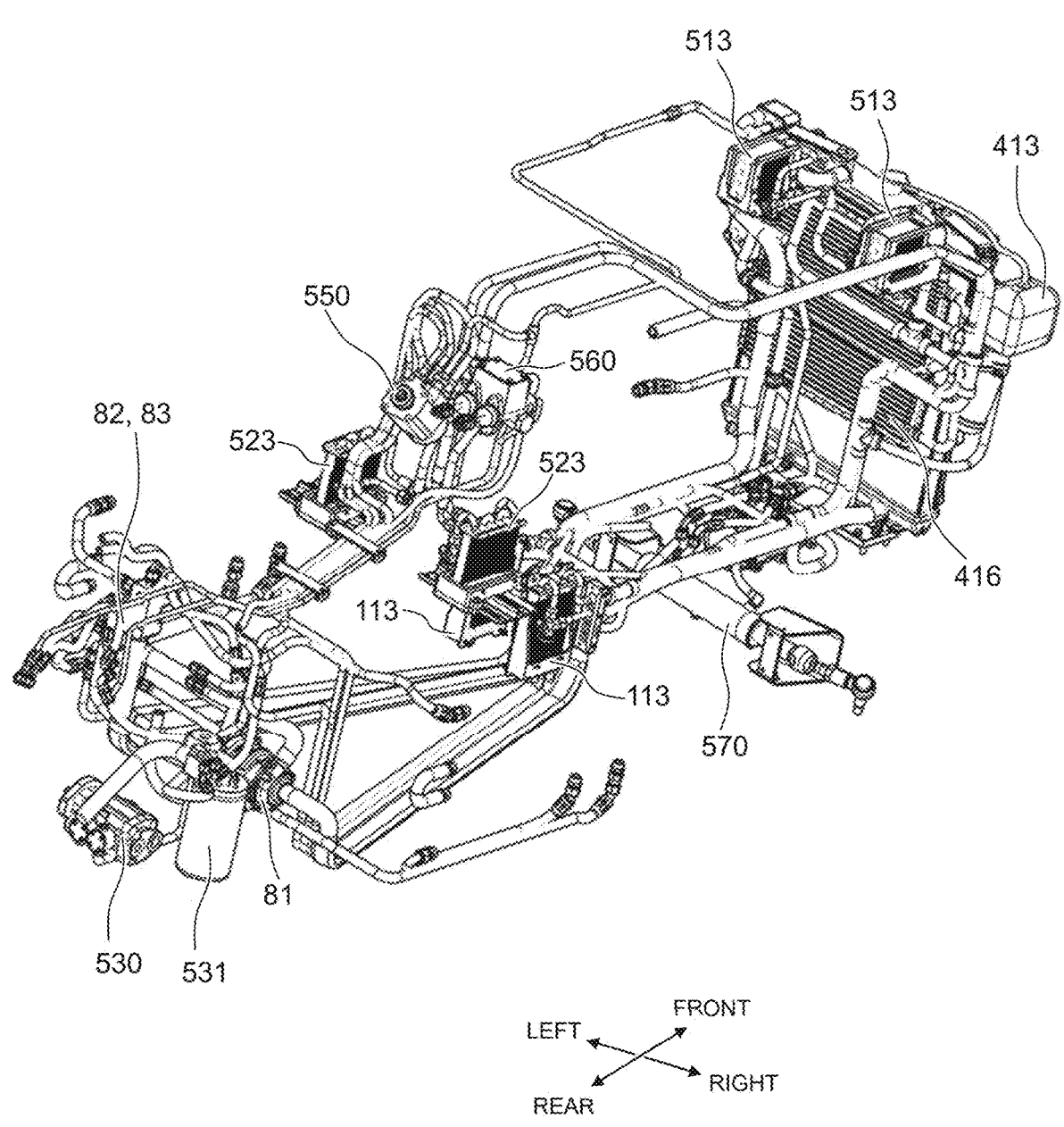
FIG. 20B shows a perspective right-rear view of cooling and hydraulic paths of an electric vehicle according to a preferred embodiment of the present invention.
Figure 20C:
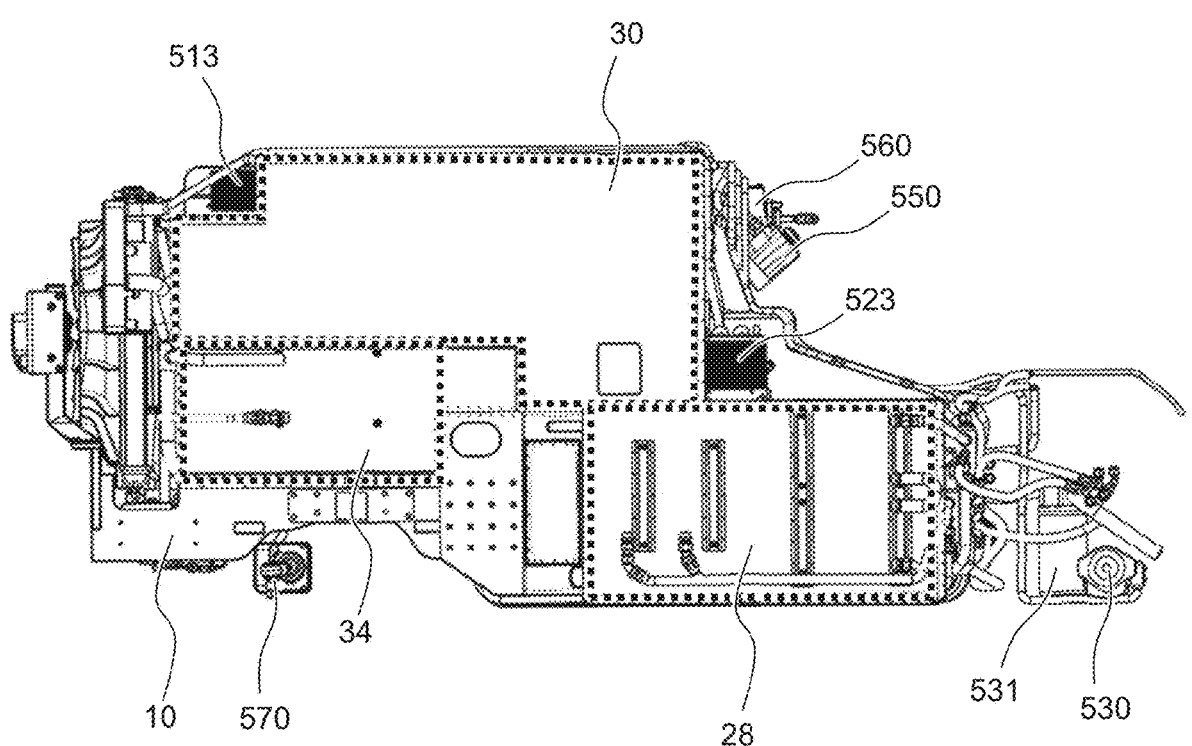
FIG. 20C shows a left side view of a battery housing according and cooling and hydraulic paths of an electric vehicle according to a preferred embodiment of the present invention.

FIG. 20A shows a perspective left-rear view of cooling and hydraulic paths of the vehicle 1. FIG. 20B shows a perspective right-rear view of cooling and hydraulic paths of the vehicle 1. FIG. 20C shows a left side view of the battery housing 8.

In a preferred embodiment of the present invention, as shown, for example, in FIGS. 13, 14A, 14B, and 20A to 20C one or more center evaporators 113 can be at least partially housed within the front frame 10.

In a preferred embodiment of the present invention, as shown, for example, in FIGS. 20A to 20C, one or more forward evaporators 513 can be located at an upper forward portion of the battery housing 8. In particular, the one or more forward evaporators can be provided at a front surface of the third battery housing portion 30 and/or the fourth battery housing portion 32.

In a preferred embodiment of the present invention, as shown, for example, in FIGS. 20A to 20C, one or more rear evaporators 523 can be located at a lower rear portion of the battery housing 8. In particular, the one or more rear evaporators 523 can be provided at a rear surface of the third battery housing portion 30 and/or the fourth battery housing portion 32, and at an upper surface of the first battery housing portion 26 and/or the second battery housing portion 28. In a preferred embodiment of the present invention, the rear evaporators 523 can be housed within, or located below, a dashboard of the vehicle 1.

As described above with respect to FIG. 9A, the intermediate frame 6 can house a pump 81, a first hydraulic manifold 82, and a second hydraulic manifold 83. According to a preferred embodiment of the present invention, the pump 81 can be a coolant pump. The first hydraulic manifold 82 can be provided to control a distribution of coolant, and the second hydraulic manifold 83 can be provided to control a return of the coolant. The first hydraulic manifold 82 and the second hydraulic manifold 83 can each include one or more direction control valves. As one example, the coolant can be water.

In a preferred embodiment of the present invention, as shown, for example, in FIGS. 20A to 20C, a hydraulic pump 530 and hydraulic filter 531 can be located at a rear portion of the vehicle 1, that is, to the rear of the battery housing 8 and the intermediate frame 6.

In a preferred embodiment of the present invention, as shown, for example, in FIGS. 20A to 20C, a hydraulic system of the vehicle 1 can include a hydraulic steering controller 550, a hydraulic brake controller 560, and a hydraulic steering rack 570. The hydraulic steering controller 550, the hydraulic brake controller 560, and the hydraulic steering rack 570 can be connected by one or more oil lines to enable to driver of the vehicle 1 to control steering and braking of the vehicle 1.

In a preferred embodiment of the present invention, one or more oil lines can be connected to a drivetrain gearing of the vehicle 1.

In a preferred embodiment of the present invention, as shown, for example, in FIG. 20A, a compressor 580 can be provided below the cooling components, such as the fan 111, the radiator 412, the surge tank 413, the drier 414, the heat exchanger 415, and the condenser 416. The compressor 580 can be housed within the front frame 10. The compressor 580 can be, for example, an air compressor.

In a preferred embodiment of the present invention, as shown, for example, in FIGS. 20A and 20B, a flow of coolant in the vehicle 1 can pass from the pump 81, to the inverters 13 and motor housing portions 12, and then to the radiator 412. That is, coolant output from the pump 81 can be provided as an intake to cool the inverters 13 and electric motors 14, 16, 18, 20, 22, and 24. After cooling the inverters 13 and electric motors 14, 16, 18, 20, 22, and 24, the coolant can then be received by the radiator 412 before returning to the pump 81.

In a preferred embodiment of the present invention, as shown, for example, in FIGS. 1A to 1D and 1F to 1H, a plurality of charge ports 430 can be provided at a rear portion of an outer cover 400 of the vehicle 1. The plurality of charge ports 430 can include charge ports 430L provided at a left side of the outer cover 400 and charge ports 430R provided at a right side of the outer cover 400. The outer cover 400 can define a hood or bonnet of the vehicle 1.

Figure 21A:
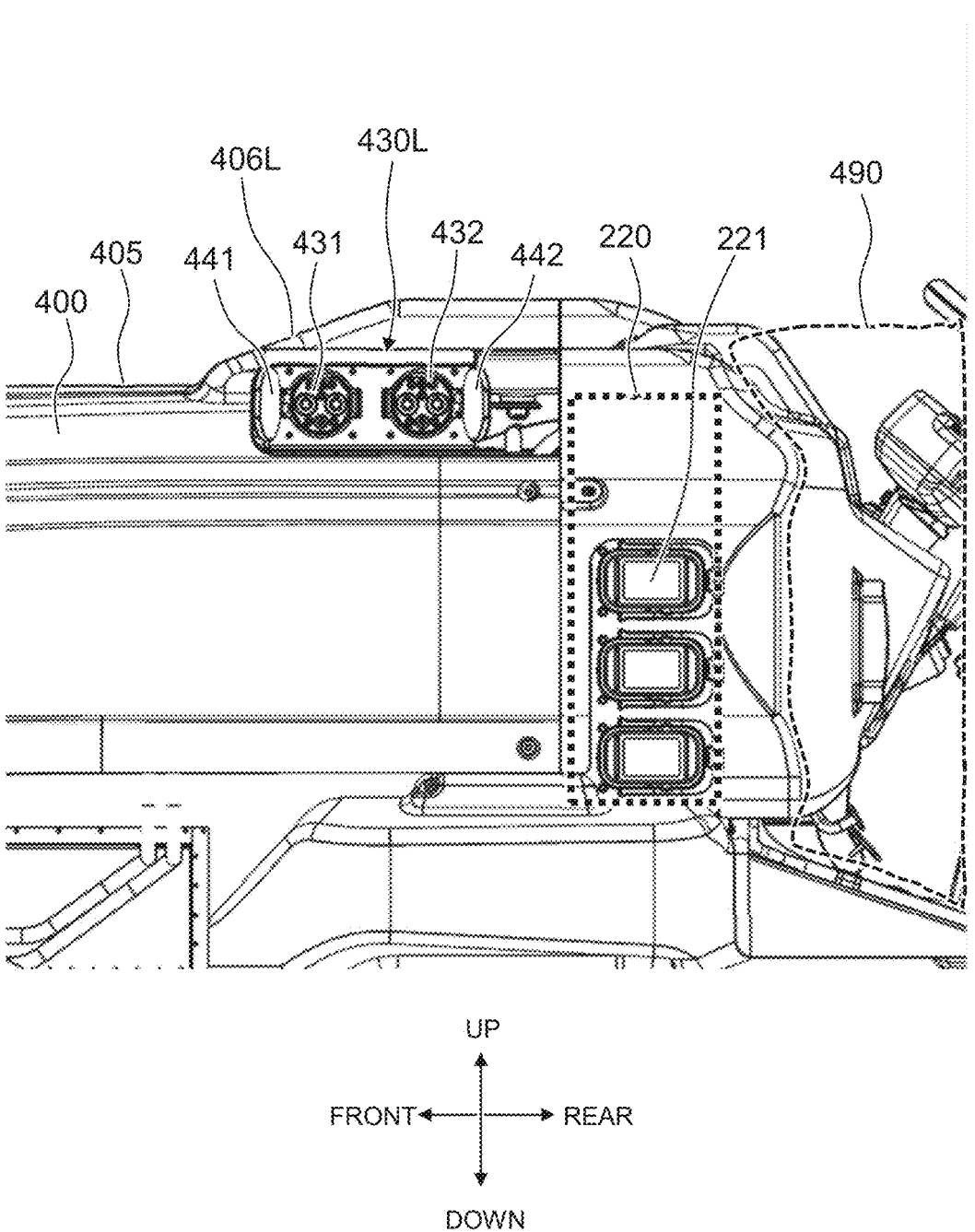
FIG. 21A shows an enlarged left side view of an electric vehicle and charge ports according to a preferred embodiment of the present invention.

FIG. 21A shows an enlarged left side view of the charge ports 430L provided at the left side of the outer cover 400.

In a preferred embodiment of the present invention, as shown, for example, in FIG. 21A, the charge ports 430L provided at the left side of the outer cover 400 can include a first charge port 431 and a second charge port 432. The first charge port 431 can be provided with a port cover 441, which is shown in an open state in FIG. 21A. Similarly, the second charge port 431 can be provided with a port cover 442, which is shown in an open state in FIG. 21A.

In a preferred embodiment of the present invention, as shown, for example, in FIG. 21A, the charge ports 430L provided at the left side of the outer cover 400 can extend above a main upper surface 405 of the outer cover 400 in an up-down direction of the vehicle 1. That is, at least a portion of each of the first charge port 431 and the second charge port 432 can be located higher than the main upper surface 405 of the outer cover 400. The outer cover 400 can be provided with a sloped surface 406L that extends over at least the first charge port 431. The sloped surface 406L can also extend at least partially over the second charge port 432.

According to a preferred embodiment of the present invention, as shown, for example, in FIG. 21A, each of the charge ports 430L can be located forward of the first PDU 220 in a front-rear direction of the vehicle 1.

According to a preferred embodiment of the present invention, as shown, for example, in FIG. 21A, each of the charge ports 430L can be located forward of a manual service disconnect plug 221 in the front-rear direction of the vehicle 1. The manual service disconnect plug 221 can be located on a left side of the vehicle 1. The manual service disconnect plug 221 can disconnect battery connection(s) of the batteries housed within the battery housing 8 of the vehicle 1. As shown in FIG. 21A, the manual service disconnect plug 221 can overlap with the first PDU 220 in the front-rear direction of the vehicle 1.

According to a preferred embodiment of the present invention, as shown, for example, in FIGS. 1A, 1C, and 21A, the vehicle 1 can include a body opening 490 and a step 491 to aid a driver or operating of the vehicle 1 in entering or exiting the vehicle. The body opening 490 and the step 491 can be located on a left side of the vehicle 1.

According to a preferred embodiment of the present invention, as shown, for example, in FIGS. 1A, 1C, and 21A, each of the first charge port 431, the second charge port 432, the manual service disconnect plug 221, the body opening 490, and the step 491 can be located on a left side of the vehicle 1.

Figure 21B:
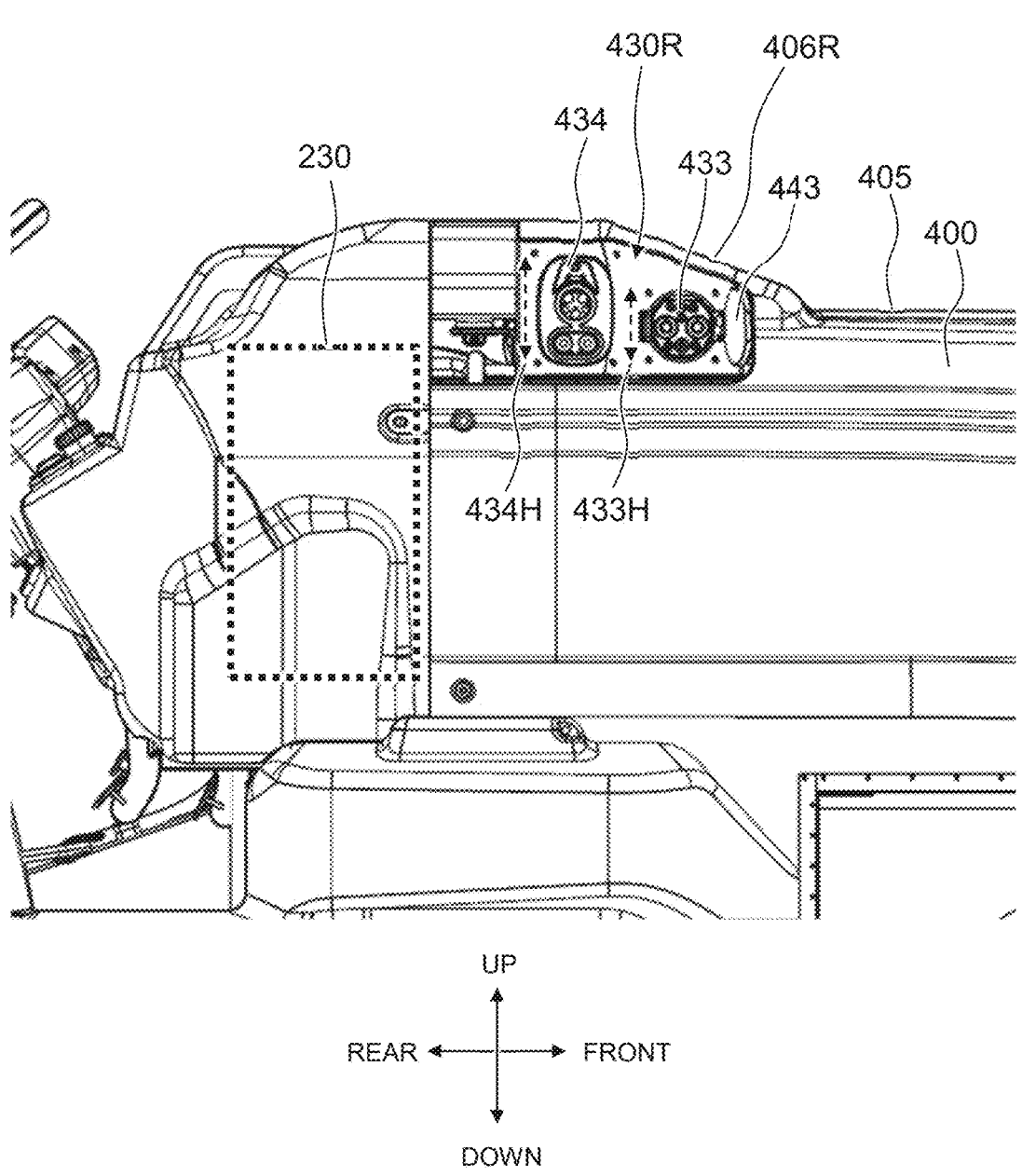
FIG. 21B shows an enlarged right side view of an electric vehicle and charge ports according to a preferred embodiment of the present invention.

FIG. 21B shows an enlarged right side view of the charge ports 430R provided at the right side of the outer cover 400.

In a preferred embodiment of the present invention, as shown, for example, in FIG. 21B, the charge ports 430R provided at the right side of the outer cover 400 can include a third charge port 433 and a fourth charge port 434. The third charge port 433 can be provided with a port cover 443, which is shown in an open state in FIG. 21B. The fourth charge port 434 can be provided with a port cover (not shown).

In a preferred embodiment of the present invention, as shown, for example, in FIG. 21B, the charge ports 430R provided at the right side of the outer cover 400 can extend above a main upper surface 405 of the outer cover 400 in an up-down direction of the vehicle 1. That is, at least a portion of each of the third charge port 433 and the fourth charge port 434 can be located higher than the main upper surface 405 of the outer cover 400. The outer cover 400 can be provided with a sloped surface 406R that extends over at least the third charge port 433. The sloped surface 406L can also extend at least partially over the fourth charge port 434.

In a preferred embodiment of the present invention, as shown, for example, in FIGS. 1F, 1G, 21A, and 21B, the charge ports 430R can be located below an upper edge 492U of a steering wheel 492 of the vehicle 1. The charge ports 430L can also be located below the upper edge 492U of the steering wheel 492. Furthermore, even if a tilt angle of the steering wheel 492 is able to be changed, the charge ports 430R and 430L are still preferably located lower than the upper edge 492U of the steering wheel 492.

In a preferred embodiment of the present invention, as shown, for example, in FIGS. 1F, 1G, 21A, and 21B, the charge ports 430R can be located above an upper edge 404U of the headlights 404 of the vehicle 1. The charge ports 430L can also be located above the upper edge 404U of the headlights 404. Furthermore, even if a tilt angle of the steering wheel 492 is able to be changed, the charge ports 430R and 430L are still preferably located lower than the upper edge 492U of the steering wheel 492.

In a preferred embodiment of the present invention, as shown, for example, in FIGS. 1F and 1G, the hood 400 of the vehicle 1 includes a centerline 400CL located between a front surface 400F and a rear surface 400R of the hood 400 in the front-rear direction of the vehicle 1. The charge ports 430R and 430L can be located between the centerline 400CL and the rear surface 400R of the hood in the front-rear direction of the vehicle 1.

According to the above-described features regarding the location of the charge ports 430R and 430L, the vehicle 1 is able to avoid impairing the visibility of a driver or operator of the vehicle 1. In addition, the vehicle 1 is able to provide easy installation operability of a front loader of the vehicle 1.

According to a preferred embodiment of the present invention, as shown, for example, in FIG. 21B, each of the charge ports 430R can be located forward of the second PDU 230 in a front-rear direction of the vehicle 1.

According to a preferred embodiment of the present invention, as shown, for example, in FIG. 1H, the charge ports 430L provided at a left side of the outer cover 400 can be located symmetrically about a centerline CL of the vehicle 1 with respect to the charge ports 430R provided at a right side of the outer cover 400. That is, the first charge port 431 can be located symmetrically about the centerline CL with respect to the third charge port 433, and the second charge port 432 can be located symmetrically about the centerline CL with respect to the fourth charge port 434.

According to a preferred embodiment of the present invention, as shown, for example, in FIG. 21B, in an up-down direction of the vehicle 1, a height 433H of the third charge port 433 can be shorter than a height 434H of the fourth charge port 434. Furthermore, the fourth charge port 434 can be located closer to the steering wheel 492 and a driver's or operator's seat of the vehicle 1 than the third charge port 433.

Figure 22A:
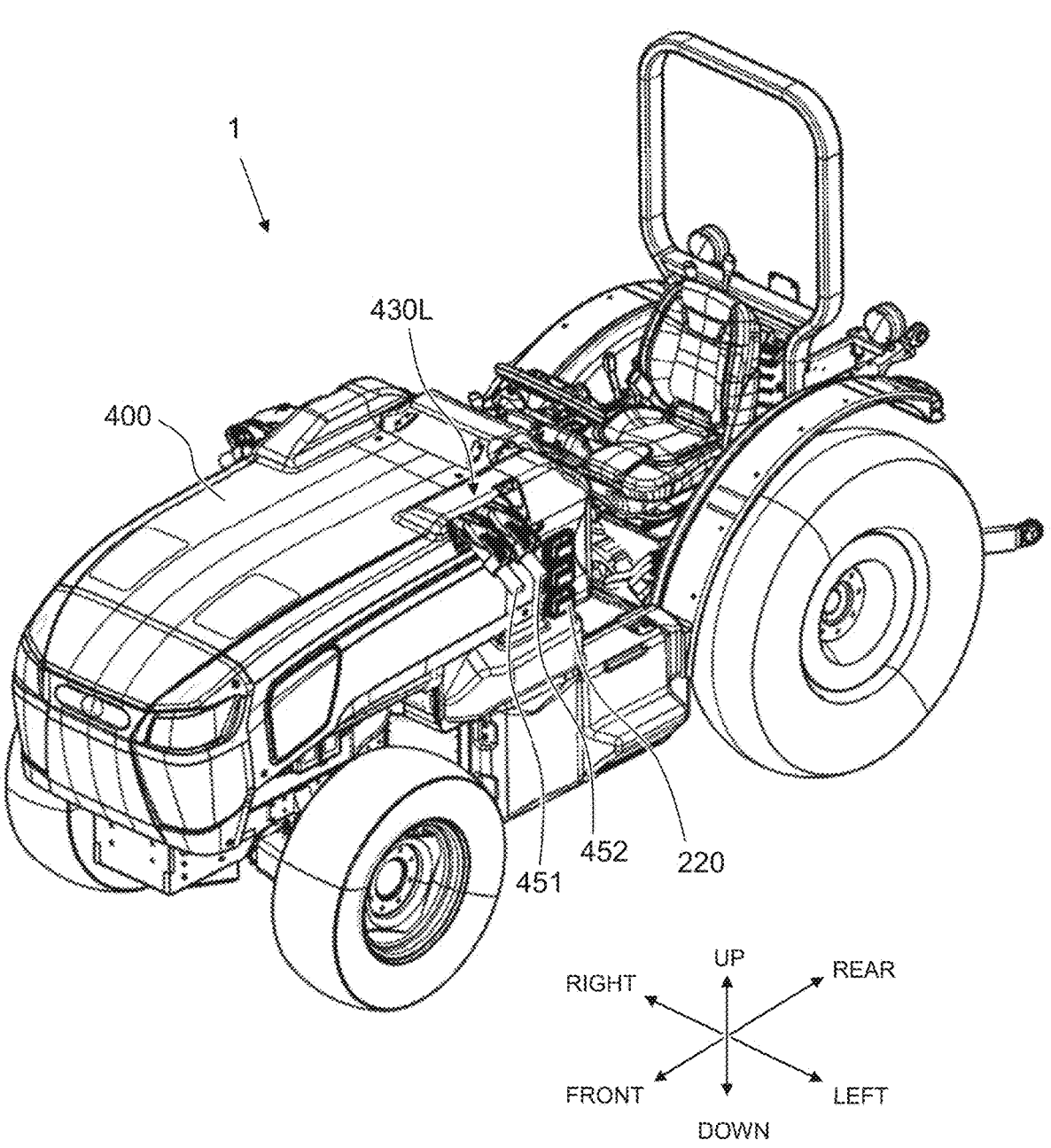
FIG. 22A shows a perspective left-front view of an electric vehicle and charging cable connections according to a preferred embodiment of the present invention.
Figure 22B:
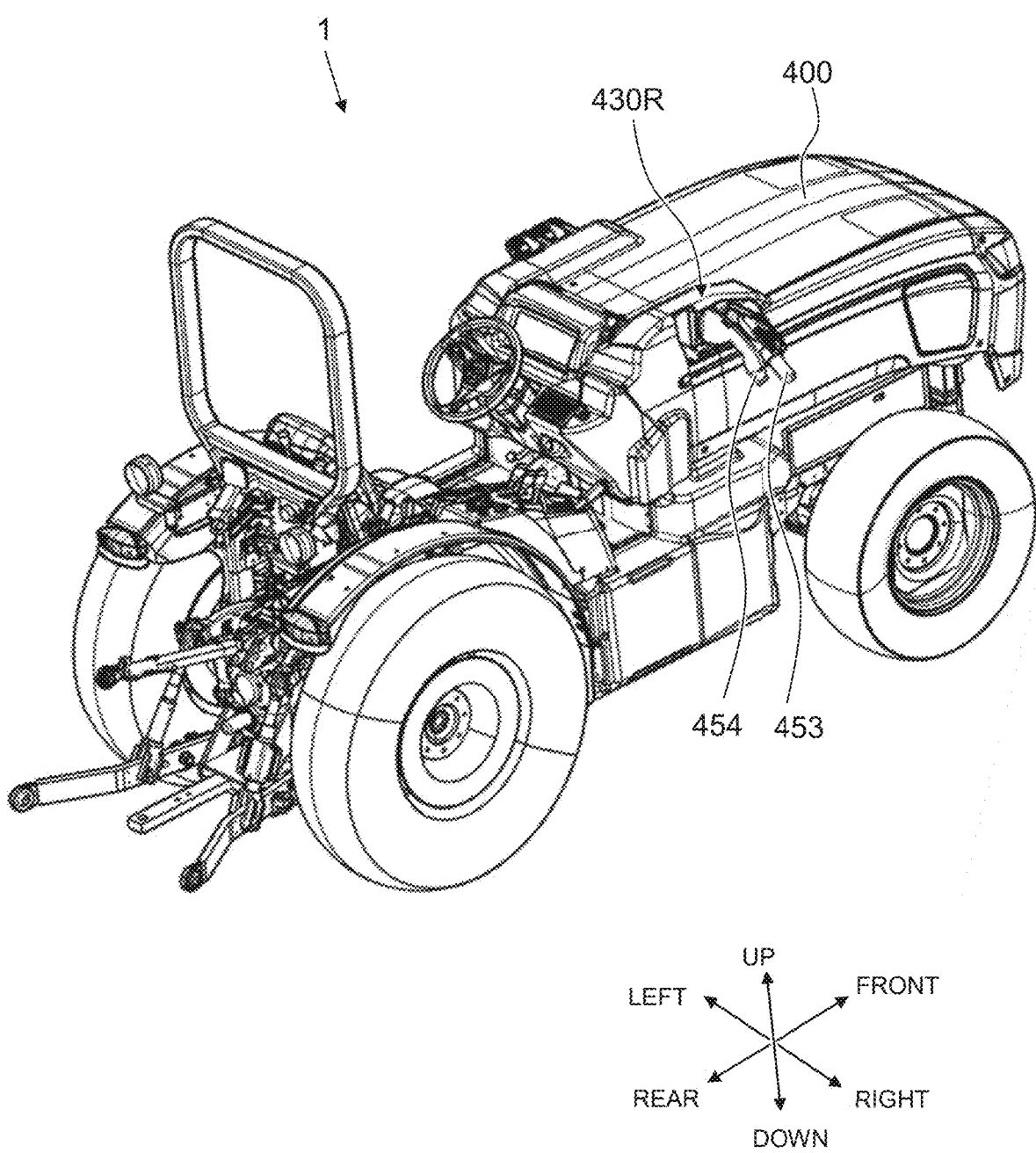
FIG. 22B shows a perspective right-rear view of an electric vehicle and charging cable connections according to a preferred embodiment of the present invention.
Figure 23A:
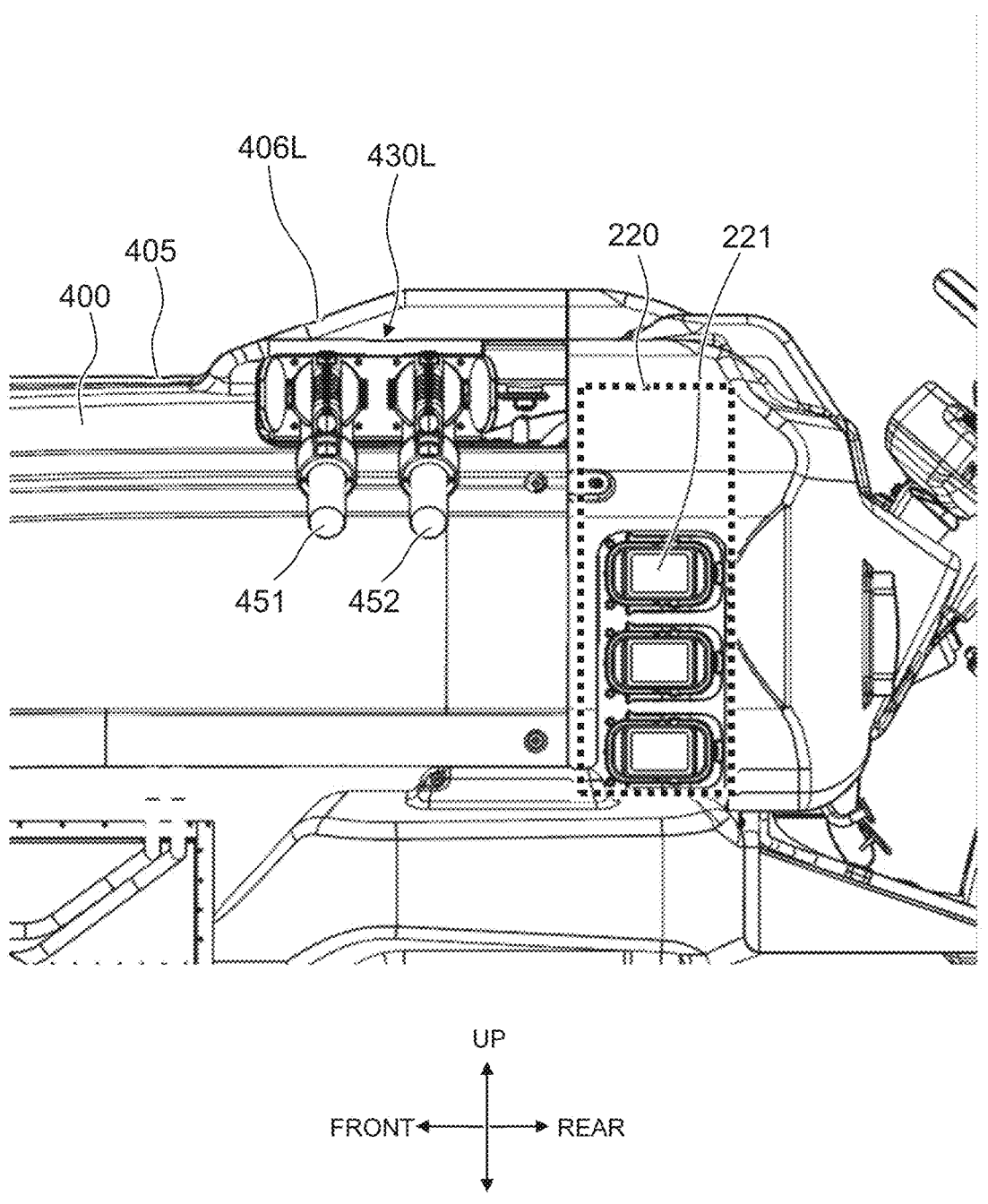
FIG. 23A shows an enlarged left side view of an electric vehicle and charging cable connections according to a preferred embodiment of the present invention.
Figure 23B:
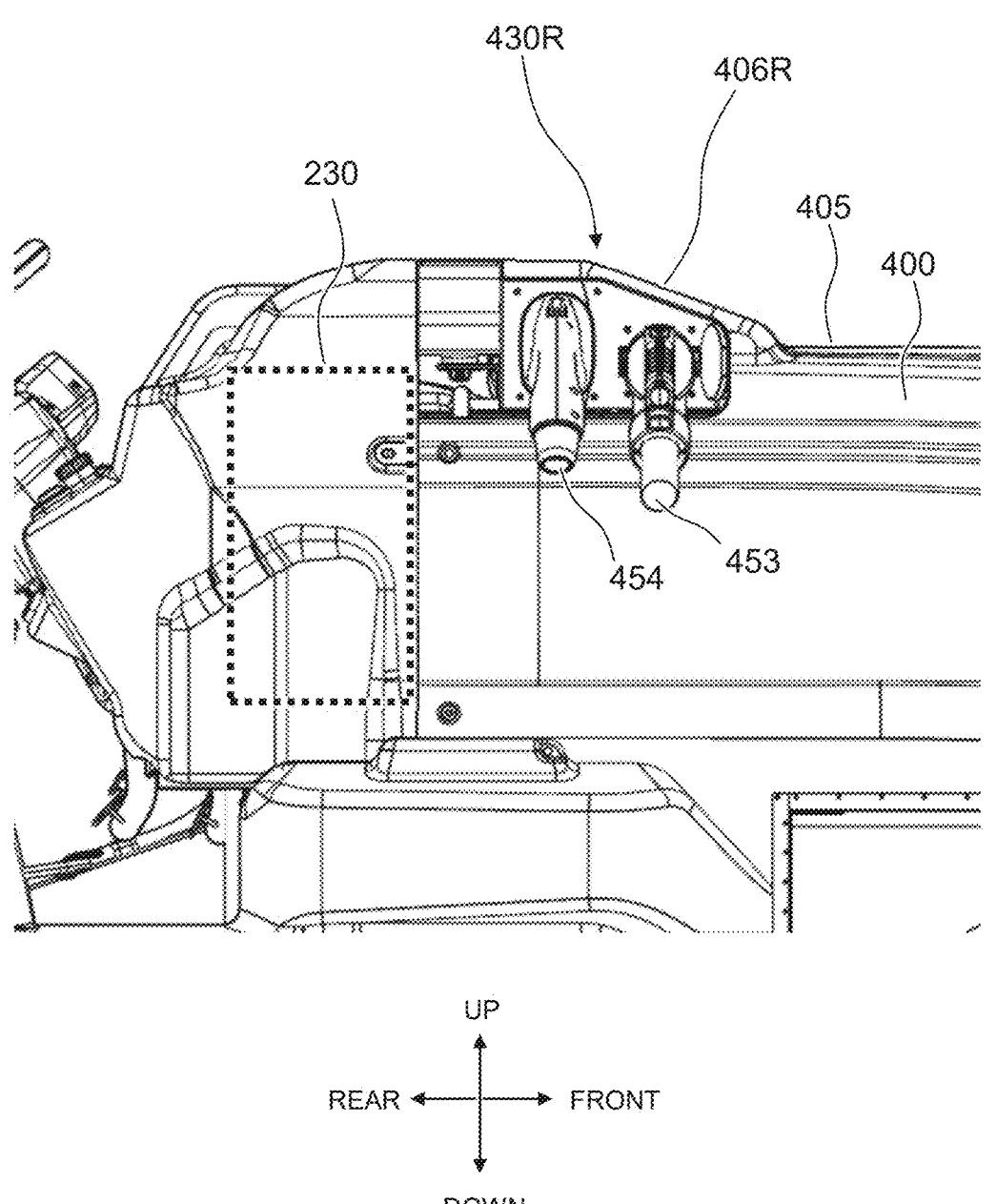
FIG. 23B shows an enlarged right side view of an electric vehicle and charging cable connections according to a preferred embodiment of the present invention.

FIGS. 22A and 22B show, respectively, left-front and right-rear perspective views of charging cable connections attached to the vehicle 1. FIGS. 23A and 23B show, respectively, enlarged left and right side views of the charging cable connections attached to the vehicle 1.

In a preferred embodiment of the present invention, as shown, for example, in FIGS. 22A and 23A, a first charging cable connection 451 can be connected to the first charge port 431, and a second charging cable connection 452 can be connected to the second charge port 432. In a preferred embodiment of the present invention, as shown, for example, in FIGS. 22B and 23B, a third charging cable connection 453 can be connected to the third charge port 433, and a fourth charging cable connection 454 can be connected to the fourth charge port 434. Each of the first charging cable connection 451, the second charging cable connection 452, the third charging cable connection 453, and the fourth charging cable connection 454 can be connected to an external power source to charge the batteries housed within the battery housing 8 of the vehicle 1.

In a preferred embodiment of the present invention, one or more of the first charge port 431, the second charge port 432, and the third charge port 433 can be a DC charge port. Accordingly, each of the first charging cable connection 451, the second charging cable connection 452, the third charging cable connection 453, and the fourth charging cable connection 454 can be connected to an external DC power source. Preferably, one or more of the first charge port 431, the second charge port 432, and the third charge port 433 is compatible with DC fast charging or DC rapid charging. As one example, one or more of the first charge port 431, the second charge port 432, and the third charge port 433 can be compatible with the GB/T charging standard.

In a preferred embodiment of the present invention, the fourth charge port 434 can be an AC charge port or a combination of an AC charge port and a DC charge port. Accordingly, the fourth charging cable connection 454 can be connected to an external AC power source or an external DC power source. As one example, the fourth charge port 434 can be compatible with the Combined Charging System (CCS) Combo 1 (CCS1) standard.

In a preferred embodiment of the present invention, one or more of the first charge port 431, the second charge port 432, the third charge port 433, and the fourth charge port 434 can function as a discharge port. That is, the vehicle 1 be used to provide electrical power to other devices by discharging electrical power from one or more of the first charge port 431, the second charge port 432, the third charge port 433, and the fourth charge port 434.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:

a chassis;

a battery housing to house a plurality of battery modules, the battery housing being supported by the chassis;

a liquid cooling system including a pump, a radiator, and a fan; and at least one electric motor;

at least one inverter; wherein the at least one inverter is electrically connected to the plurality of battery modules and the at least one electric motor;

the pump is attached to a back surface of the battery housing;

the radiator and the fan are attached on a front surface of the battery housing;

the at least one inverter is attached to a side surface of the battery housing that faces a width direction of the electric work vehicle;

the at least one inverter and the at least one electric motor are mounted between the fan and the pump in a front-rear direction of the electric work vehicle;

the pump outputs coolant to cool the at least one electric motor and the at least one inverter;

after passing to the at least one electric motor and the at least one inverter, the coolant is received by the radiator; and after passing to the radiator, the coolant returns to the pump.

2. The electric work vehicle according to claim 1, wherein the fan is operable to direct air in a forward direction.

3. The electric work vehicle according to claim 1, wherein the radiator and the fan are supported by posts mounted to the chassis.

4. The electric work vehicle according to claim 1, wherein the radiator and the fan are supported by brackets mounted to the battery housing.

5. The electric work vehicle according to claim 1, wherein the liquid cooling system includes a surge tank on the front surface of the battery housing.

6. The electric work vehicle according to claim 5, wherein the surge tank located at a side of the fan in the width direction of the electric work vehicle.

7. The electric work vehicle according to claim 1, further comprising:

a first coolant line to distribute the coolant from the liquid cooling system;

and a second coolant line to return the coolant to the liquid cooling system.

8. The electric work vehicle according to claim 7, wherein:

the first coolant line is connected to a distribution hydraulic manifold, and the second coolant line is connected to a return hydraulic manifold.

9. The electric work vehicle according to claim 8, wherein a pressure drop in the first coolant line is equal or substantially equal to a pressure drop in the second coolant line.

10. The electric work vehicle according to claim 1, wherein the liquid cooling system includes a heat exchanger attached to the front surface of the battery housing.

11. The electric work vehicle according to claim 10, wherein the heat exchanger is located at a side of the fan in the width direction of the electric work vehicle.

12. The electric work vehicle according to claim 10, wherein the heat exchanger is an oil heat exchanger.

13. The electric work vehicle according to claim 12, wherein the oil heat exchanger is connected to at least one hydraulic oil line.

14. The electric work vehicle according to claim 12, further comprising at least one oil line connected to a steering system of the electric work vehicle.

15. The electric work vehicle according to claim 12, further comprising at least one oil line connected to a braking system of the electric work vehicle.

16. The electric work vehicle according to claim 12, further comprising at least one oil line connected to a drivetrain gearing of the electric work vehicle.

17. The electric work vehicle according to claim 1, further comprising:

a condenser, wherein the radiator is located between the condenser and the fan.

18. The electric work vehicle according to claim 17, wherein the fan is located forward of the condenser in the front-rear direction of the electric work vehicle.

19. The electric work vehicle according to claim 17, wherein the condenser is located between the battery housing and the radiator.

20. The electric work vehicle according to claim 1, wherein:

the liquid cooling system includes a surge tank and a heat exchanger, and the surge tank and the heat exchanger are located on opposite sides of the fan in the width direction of the electric work vehicle.

* * * * *